(12) United States Patent
Kanda et al.

(10) Patent No.: US 7,652,709 B2
(45) Date of Patent: Jan. 26, 2010

(54) IMAGE FORMING DEVICE, IMAGE OUTPUT DEVICE, IMAGE PROCESSING SYSTEM, IMAGE RETRIEVING METHOD, IMAGE QUALITY DETERMINING METHOD AND RECORDING MEDIUM

(75) Inventors: Megumi Kanda, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 948 days.

(21) Appl. No.: 10/902,269

(22) Filed: Jul. 30, 2004

(65) Prior Publication Data

US 2005/0219367 A1 Oct. 6, 2005

(30) Foreign Application Priority Data

| Jul. 31, 2003 | (JP) | ............................ P2003-204537 |
| Aug. 8, 2003 | (JP) | ............................ P2003-290825 |

(51) Int. Cl.
H04N 5/222 (2006.01)

(52) U.S. Cl. .............................. 348/333.02; 348/207.2; 348/231.2; 348/231.3

(58) Field of Classification Search ............. 348/333.02
See application file for complete search history.

(56) References Cited

U.S. PATENT DOCUMENTS

| 5,739,924 | A | * | 4/1998 | Sano | ............................ 358/487 |
| 6,516,154 | B1 | * | 2/2003 | Parulski et al. | ............... 396/287 |
| 6,718,075 | B1 | * | 4/2004 | Yamamoto | ................... 382/305 |
| 7,349,119 | B2 | * | 3/2008 | Tsukioka | .................... 358/1.18 |
| 2003/0063321 | A1 | * | 4/2003 | Inoue et al. | .................. 358/302 |
| 2006/0017820 | A1 | * | 1/2006 | Kim | ......................... 348/231.2 |
| 2007/0014542 | A1 | * | 1/2007 | Poulsen | ...................... 386/107 |

FOREIGN PATENT DOCUMENTS

| JP | 2000-209467 A | 7/2000 |
| JP | 2000-224525 A | 8/2000 |
| JP | 2000-224625 A | 8/2000 |
| JP | 2002-187329 S | 7/2002 |
| JP | 2002-189585 A | 7/2002 |
| JP | 2003-153179 A | 5/2003 |
| JP | 2003-204504 A | 7/2003 |
| JP | 2003-333381 A | 11/2003 |
| JP | 2004-070421 A | 3/2004 |
| JP | 2005-020226 A | 1/2005 |

* cited by examiner

*Primary Examiner*—Jason Chan
*Assistant Examiner*—Cynthia Calderon
(74) *Attorney, Agent, or Firm*—Sughrue Mion, PLLC

(57) ABSTRACT

An image search method for searching image data includes the steps of searching identifying information for identifying the image data by using search information, informing the image data including the identifying information in correspondence with the search information, and causing a user to select image data to be executed a predetermined processing from the informed image data.

1 Claim, 29 Drawing Sheets

FIG. 3A
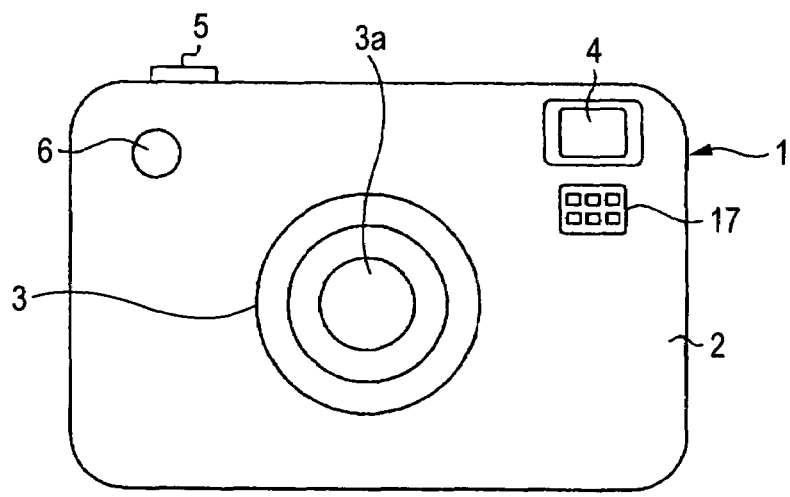
FIG. 3B
FIG. 3C
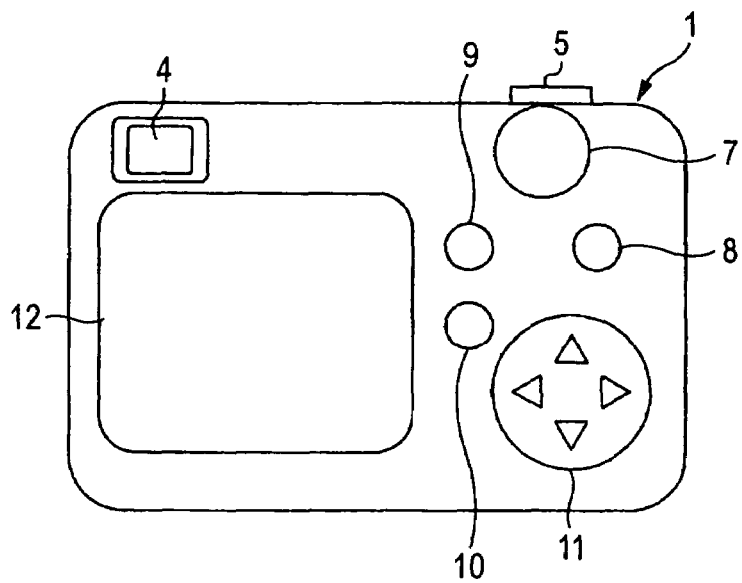
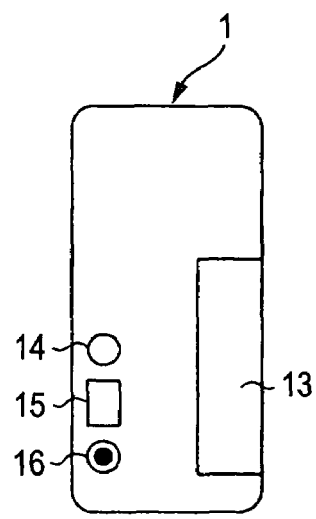

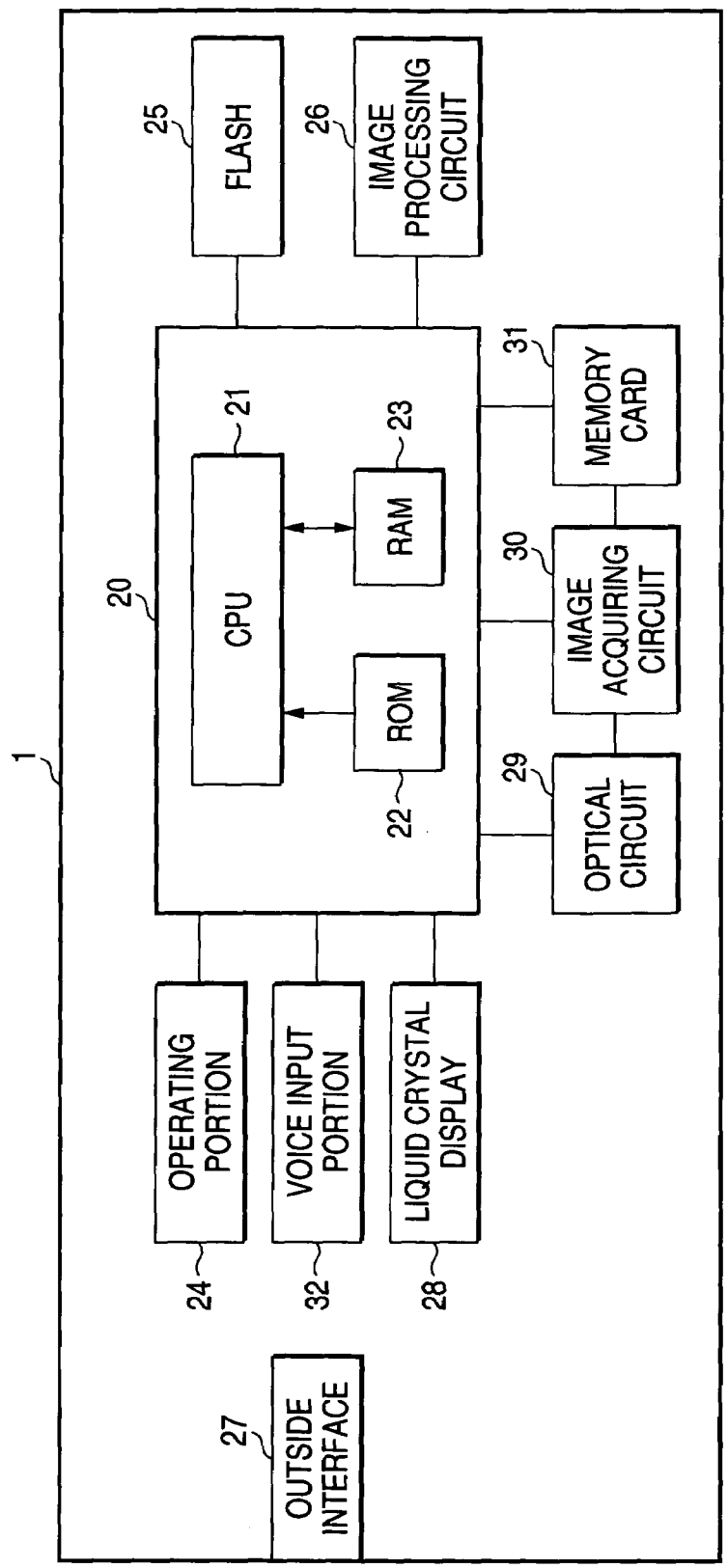

AVERAGE VALUE OF
EDGE AMOUNTS: LARGE

AVERAGE VALUE OF
EDGE AMOUNTS: SMALL

Eave: AVERAGE VALUE EDGE AMOUNT

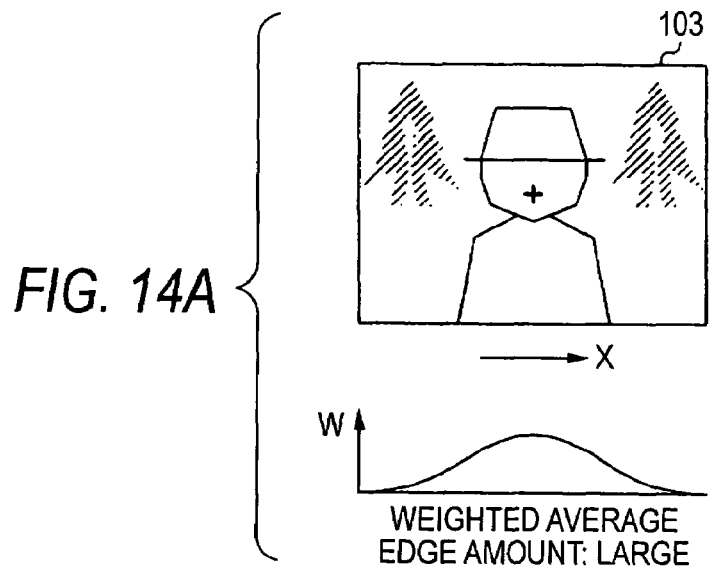
FIG. 14A
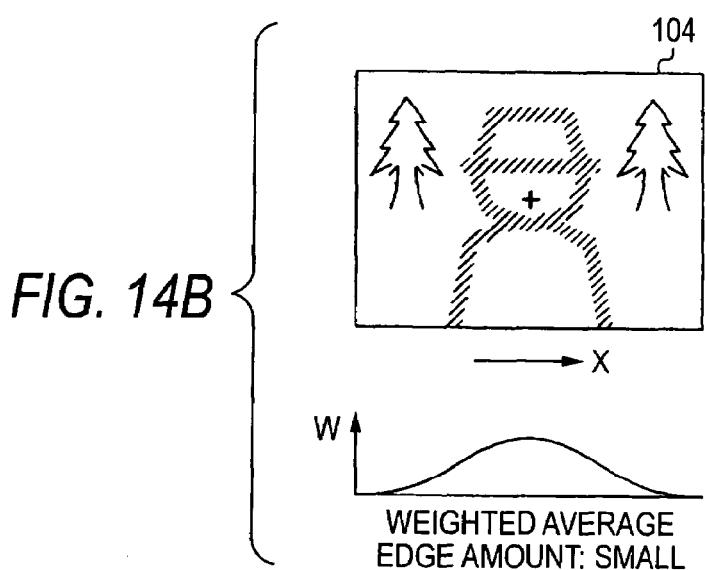
FIG. 14B
FIG. 14C
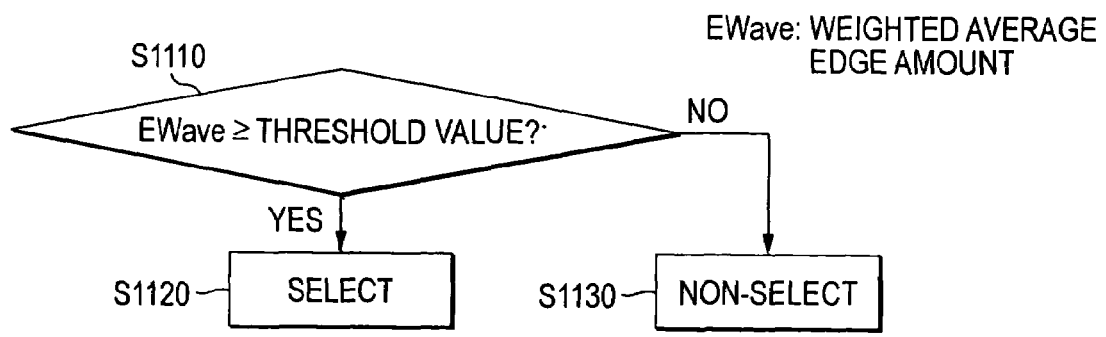

BRIGHTNESS: HIGH
AVERAGE BRIGHTNESS
VALUE: HIGH

BRIGHTNESS: PROPER
AVERAGE BRIGHTNESS
VALUE: PROPER

BRIGHTNESS: LOW
AVERAGE BRIGHTNESS
VALUE: SMALL

Bave: AVERAGE BRIGHTNESS VALUE
Bth1: LOWER LIMIT VALUE WITHIN PROPER RANGE
Bth2: UPPER LIMIT VALUE WITHIN PROPER RANGE

TIME PERIOD OF
RECEIVED LIGHT: SHORT

TIME PERIOD OF
RECEIVED LIGHT: LONG

Et: TIME PERIOD OF RECEIVED LIGHT

| DATE | TIME | PHOTO NUMBER | DETER-MINATION |
|---|---|---|---|
| 2003.5.3 | 12:32PM | 135 | OK |
| 2003.5.7 | 6:15PM | 136 | NG |
| 2003.5.12 | 10:05M | 137 | OK |

IMAGE FORMING DEVICE, IMAGE OUTPUT DEVICE, IMAGE PROCESSING SYSTEM, IMAGE RETRIEVING METHOD, IMAGE QUALITY DETERMINING METHOD AND RECORDING MEDIUM

BACKGROUND OF THE INVENTION

The present invention relates to an image forming device, an image output device, an image processing system, an image retrieving method, an image quality determining method and a recording medium includes a function of determining whether an image quality of image data taken and formed by, for example, a digital still camera is suitable for being subjected to a predetermined processing.

Image data formed by an image forming apparatus is outputted from an image outputting apparatus in accordance with a request of a user. As an image outputting apparatus, there is known, for example, CRT, LCD, a printer, a projector, a television receiver or the like and as an image forming apparatus, there is known, for example, a digital still camera (DSC), a digital video camera (DVC) or the like (refer to, for example, JP-A-2000-209467). When an image of an object is taken by a digital still camera, a taken image is made to constitute image data to store to, for example, a memory card. Further, the image data stored to the memory card is made to be able to output directly to an image outputting apparatus of a printer, a television screen or the like. It is general that when image data is transmitted from a digital still camera to an image outputting apparatus, the image is displayed on a liquid crystal display provided to the digital still camera and a user confirms the image.

However, in recent years, a capacity of a memory card used in a digital camera tends to increase and therefore, an amount of a number of sheets of image data stored to the memory card becomes large and it is difficult for a user to select a desired image when the image stored to the memory card is outputted to an image outputting apparatus. Because when the image stored to the memory card is selected, the desired image is searched by successively displaying images on the image crystal display, however, since the number of sheets is large, time and labor are taken for confirming the images sheet by sheet. Further, when a plurality of sheets of images are displayed on a liquid crystal monitor, time of searching images can be shorten, however, since a display screen for each sheet of the image is reduced, firmness of selection is lowered and the operation becomes difficult.

Also, reentry, image data formed by an image forming apparatus is outputted from an image outputting apparatus in accordance with a request of a user. As an image outputting apparatus, there is known, for example, CRT, LCD, a printer, a projector, a television receiver or the like and as an image forming apparatus, there is known, for example, a digital still camera (DSC), a digital video camera (DVC) or the like (refer to, for example, JP-A-2000-209467).

An image can directly be outputted from a digital still camera to an image outputting apparatus, for example a printer, a television screen or the like. Further, it is general that when the image data is transmitted from the digital still camera to the image outputting apparatus, the image is displayed on a liquid crystal display provided to the digital still camera and a user confirms the image.

However, according to the small-sized liquid crystal monitor belonging to the digital still camera, it is difficult for the user to determine whether the taken image is provided with an image quality suitable for printing. Because when the monitor is small, both a fine image and a rough image look to be the same for human eyes. Further, there is frequently a case in which even an image which is not intended to execute printing inherently must actually be outputted and therefore, there also poses a problem that sheet is wastefully consumed. Further, there also poses a problem that a considerable time period required for printing is taken in order to confirm acceptability of the image quality.

SUMMARY OF THE INVENTION

It is a first object of the invention to provide an image forming apparatus, an image outputting apparatus, an image processing system, an image search method, an image quality determining method and program recording medium capable of easily selecting a desired image from image data stored by a large amount.

Further, a second object of the invention is to provide an image forming apparatus, an image outputting apparatus, an image processing system, an image processing system, an image search method, an image quality determining method and program recording medium capable of selecting image data which may be subjected to a predetermined processing by determining whether an image quality of the image data is permitted to subject to the predetermined processing.

In order to solve the above-described problem, the invention described in (1) is an image forming apparatus including image forming unit for forming image data, the image forming apparatus including a searching unit for searching identifying information for identifying the image data, an informing unit for informing the image data in correspondence with the identifying information searched by the searching unit, and an image data selecting unit for making a user select image data for executing a predetermined processing from the image data informed by the informing unit to the user.

According to the image forming apparatus described in (1), the user can select a desired image data from the informed image data by searching the identifying information of the image data by the searching unit and informing the image data in correspondence with the search result. In this way, the image data is classified and informed for each identifying information and therefore, the user can efficiently select the image data. Therefore, the desired image can easily be selected from the image data stored in a large amount.

The invention described in (2) is an image forming apparatus including an image taking unit for taking an image and a memory for storing image data taken and formed by the image taking unit, the image forming apparatus including a search key inputting unit for inputting a search key to be related to the image data to store to the memory, a searching unit for searching the search key, an informing unit for informing the image data in correspondence with the search key searched by the searching unit to a user, and an image data selecting unit for making the user select image data for executing a predetermined processing from the image data informed by the informing unit.

According to the image forming apparatus described in (2), the memory is inputted with the search key to be related to the image data along with the image data of the taken image, the search key is searched by the searching unit and the image data in correspondence with the search result is informed. In this way, the image data is informed by being classified for each search key and therefore, the user can efficiently select the image data. Therefore, the desired image can easily be selected from the image data stored in a large amount.

The invention described in (3) including the search key inputting unit for inputting the search key searched by the searching unit, wherein the image data in correspondence with the search key designated by the search key inputting unit is informed to the user by the informing unit in the image forming apparatus described in (2).

According to the invention described in (3), the search key for searching by the searching unit can be designated by the search key inputting unit in addition to operation of the invention described in (2). Therefore, in the informing unit, the image data which is not needed is not informed and only the image data in correspondence with the desired search key is informed and therefore, the user can further efficiently select the image data.

The invention described in (4) is characterized in further including an image analyzing unit for analyzing the image data, a determining unit for determining a suitability of whether the image data is provided with an image quality suitable for outputting based on a result of analyzing the image data by the image analyzing unit, wherein a determination result of the determining unit is informed along with a search result of the searching unit by the informing unit in the image forming apparatus described in (2) or (3). Further, the "suitability of the image quality" mentioned here is not limited to two stages of suitable and unsuitable but includes a suitability for informing a degree of suitability by levels of three or more stages. The same goes with the invention as follows.

According to the invention described in (4), in addition to operation of the invention described in (2) or (3), the image data is analyzed by the image analyzing unit, it is determined whether the data is the image suitable for outputting and a result thereof is informed by the informing unit. Therefore, the user can select the image data by the image data selecting unit after knowing whether the image data is suitable for outputting the image.

The invention described in (5) is characterized in that the search key inputting unit is a voice inputting unit for inputting the search key by voice in the image forming apparatus described in any one of (2) through (4).

According to the invention described in (5), in addition to operation of the invention described in any one of (2) through (4), the search key is inputted by the voice.

The invention described in (6) is characterized in that the search key inputting unit is an operation inputting unit for inputting the search key on a screen by operating an input operating portion in the image forming apparatus described in any one of (2) through (4).

According to the invention described in (6), in addition to operation of the invention described in any one of (2) through (4), the search key can be inputted on the screen by operating the input operating portion.

The invention described in (7) is characterized in further including a transmitting portion for transmitting at least one sheet of the image data selected from the image data stored to the memory to an image outputting apparatus, and a control portion for transmitting the image data selected by the image data selecting unit from the transmitting portion to the image outputting apparatus in the invention described in any one of (2) through (6).

According to the invention described in (7), in addition to operation of the invention described in any one of (2) through (6), the image data selected by the image data selecting unit is outputted to the image outputting apparatus.

The invention described in (8) is characterized in that the informing unit is a displaying unit for displaying the search result by the searching unit on the screen in the image forming apparatus described in any one of (2) through (7).

According to the invention described in (8), in addition to operation of the invention described in any one of (2) through (7), the search result by the searching unit is informed to the user by being displayed on the screen of the displaying unit.

The invention described in (9) is characterized in that the displaying unit displays the search key in correspondence with the search result along with the search result in the image forming apparatus described in (8).

According to the invention described in (9), in addition to operation of the invention described in (8), the search key is displayed on the screen of the displaying unit along with the image of the search result and therefore, the user can select the image data after firmly recognizing what is the search key.

The invention described in (10) is characterized in an image forming apparatus including an image taking unit for taking an image and a memory for storing image data taken and formed by the image taking unit, the image forming unit including a search object inputting unit for inputting and designating a search object searched from the image data, an image searching unit for searching the search object by analyzing the image data, an informing unit for informing the image data in correspondence with a search result by the image searching unit to a user, and an image data selecting unit for making the user select image data for executing a predetermined processing from the image data informed by the informing unit.

According to the image forming apparatus described in (10), the search object inputted by the search object inputting unit is inputted, the image data is analyzed by the image analyzing unit and the search object is searched. Further, a user can select the desired image data from the informed image data by being informed of the image data in correspondence with the search result. In this way, in the informing unit, image data which is not needed is not informed and only the image data in correspondence with the desired search object is informed and therefore, the user can efficiently select the image data. Therefore, the desired image can easily be selected from image data stored in a large amount.

The invention described in (11) is characterized in that the image searching unit searches the search object by analyzing the image data in the image forming apparatus described in (10).

According to the invention described in (11), in addition to operation of the invention described in (10), the image data is analyzed and the search object is searched. Therefore, the desired image data can be searched by constituting the search object by the object the image of which is taken.

The invention described in (12) is characterized in that the image searching unit searches the search object by analyzing image forming history information formed to be related to the image data in forming the image data in the image forming apparatus described in (10).

According to the invention described in (12), in addition to operation of the invention described in (10), the identifying information of the search object is searched by analyzing the image forming history information formed by being related to the image data. Therefore, the desired image data can be searched by constituting the search object by information or the like in taking the image stored to the image forming history information.

The invention described in (13) is characterized in further including an image analyzing unit for analyzing the image data, a determining unit for determining a suitability of whether the image data is provided with an image quality suitable for outputting based on an analyzing result by the image analyzing unit, wherein a determination result of the determining unit is informed along with the search result of the image searching unit by the informing unit in the image forming apparatus described in any one of (10) through (12).

Further, the "suitability of the image quality" mentioned here is not limited to two stages of suitable and unsuitable but includes "suitability of the image quality" informing a degree of the suitability by levels of three or more stages. The same goes with the invention as follows.

According to the invention described in (13), in addition to operation of the invention described in any one of (10) through (12), the image data is analyzed by the image analyzing unit, it is determined whether the data is the image suitable for outputting and the result is informed by the informing unit. Therefore, the user can select the image data by the image data selecting unit after knowing whether the image data is the image suitable for outputting.

The invention described in (14) is characterized in further including a transmitting portion for transmitting at least one sheet of the image data selected from the image data stored to the memory to an image outputting apparatus, and a control portion for transmitting the image data selected by the image selecting unit from the transmitting portion to the image outputting apparatus in the image forming apparatus described in any one of (10) through (13).

According to the invention described in (14), in addition to operation of the invention described in any one of (10) through (13), the image data selected by the image data selecting unit is transmitted to the image outputting apparatus.

The invention described in (15) is characterized in that the informing unit is a displaying unit for displaying the search result by the image searching unit on a screen in the image forming apparatus described in any one of (10) through (14).

According to the invention described in (15), in addition to operation of the invention described in any one of (10) through (14), the search result by the searching unit is informed to the user by being displayed on the screen of the displaying unit.

The invention described in (16) is characterized in that the displaying unit displays the search object in correspondence with the search result along with the search result in the image forming apparatus described in (15).

According to the invention described in (16), in addition to operation of the invention described in (15), the search object is displayed on the screen of the displaying unit along with the image of search result and therefore, the user can select the image data after firmly recognizing what is the search object.

An image processing system described in (17) is characterized in including the image forming apparatus and the image outputting apparatus for receiving the image data transmitted from the transmitting portion of the image forming apparatus and outputting the image based on the received image data according to (7) or (14).

According to the invention described in (17), operation and effect similar to the invention described in (7) or (14) can be achieved.

The invention described in (18) is characterized in an image outputting apparatus including a slot for insertably and drawably mounting a memory medium, and a printing unit for reading image data from the memory medium inserted into the slot and printing an image based on the read image data, the image outputting apparatus including an identifying information designating unit for designating identifying information for identifying the image data, an identifying information searching unit for searching the identifying information by analyzing the image data inserted into the slot, an informing unit for informing a search result by the identifying information searching unit to a user, a selecting unit for selecting an instruction of whether a predetermined image data is permitted to be printed from the image data informed by the informing unit, and a control portion for making the printing unit operate to print the image based on the image data when the instruction of permitting to print the predetermined image data by the selecting unit is provided to the control portion.

According to the invention described in (18), the identifying information designated by the identifying information designating unit is searched from the image data stored to the memory medium inserted into the slot. Further, the image data in correspondence with the search result is informed to the user and the user can select image data which may be printed from the informed image data. In this way, in printing the image data stored to the memory medium mounted to the slot, only the image data in correspondence with the identifying information is informed by the informing unit, the image data which is not needed does not constitute an object of selection and is not informed and therefore, the user can efficiently select the image data. Therefore, the desired image can easily be selected from the image data stored in a large amount.

Further, in order to solve the above-described problems, the invention constitutes a gist thereof by an image forming apparatus having image forming device for forming image data, the image forming device including an image analyzing unit for analyzing the image data, a determining unit for determining acceptability of an image quality of the image data based on an analyzing result by the image analyzing unit, an informing unit for informing the acceptability of the image quality determined by the determining unit to a user, and a selecting unit for making the user select whether a predetermined processing may be executed with regard to the image data after informing the acceptability of the image quality by the informing unit. Further, the "acceptability of the image quality" mentioned here is not limited to two stages of acceptable and unacceptable but includes the "acceptability of the image quality" informing a degree of acceptability of the image quality and a degree of unacceptability thereof by levels of three or more of stages. The same goes with the invention shown below.

According thereto, the image data is analyzed by the image analyzing unit, the acceptability of the image quality of the image data is determined based on the result of analyzing the acceptability of the image quality and the determined acceptability of the image quality is informed to the user. The user can select whether the predetermined processing may be executed with regard to the image data as a selecting unit after informing the acceptability of the image quality by the informing unit. Therefore, the predetermined processing can be executed by selecting the image data permitted to execute the predetermined processing.

The invention constitutes a gist thereof by an image forming apparatus having an image acquiring unit for acquiring image data and having a transmitting portion for transmitting the image data to an image outputting apparatus for making the image outputting apparatus output an image based on the acquired image data, the image outputting apparatus including an image analyzing unit for analyzing the image data, a determining unit for determining a suitability of whether the image data is provided with an image quality suitable for outputting based on a result of analyzing the image data by the image analyzing unit, and a control portion for transmitting the image data determined to be provided with the image quality suitable for outputting by the determining unit from the transmitting portion to the image outputting apparatus. Further, the "suitability of the image quality" mentioned here is not limited to two stages of suitable and unsuitable but includes the "suitability of the image quality" informing a degree of the acceptability by levels of three of more stages. The same goes with the invention shown below.

According thereto, the image data is analyzed by the image analyzing unit, the suitability of whether the image data is provided with the image quality suitable for outputting is determined based on the result of analyzing the image data, and the image data determined to be provided with the image quality suitable for outputting is transmitted from the transmitting portion to the image outputting apparatus. Therefore, only the image provided with the image quality suitable for outputting can be outputted to the image outputting apparatus.

The invention constitutes a gist thereof by the image forming apparatus further including an informing unit for informing the suitability determined by the determining unit to a user, a selecting unit for making the user select whether the image data the suitability of which is informed is to be transmitted from the transmitting portion to the image outputting apparatus, wherein the control portion transmits the image data selected by the selecting unit from the transmitting portion to the image outputting apparatus.

According thereto, the suitability of whether the image data is provided with the image quality suitable for outputting determined by the determining unit is informed to the user. The user can select whether the image data is to be transmitted from the transmitting portion to the image outputting apparatus by the selecting unit after confirming the informed suitability of outputting. The image data selected to be permitted to output by the selecting unit is transmitted from the transmitting portion to the image outputting apparatus. Therefore, the user confirms the result of determining the suitability of the image quality and thereafter, the user can determine whether the image data is to be outputted and therefore, the image provided with the image quality suitable for outputting can be outputted to the image outputting apparatus and further, the image to be outputted can be selected after also adding the determination of the user.

The invention constitutes a gist thereof by an image forming apparatus having an image forming unit for forming image data and including a memory for storing the formed image data, the image forming apparatus including an image analyzing unit for analyzing the image data, a determining unit for determining an acceptability of an image quality of the image data based on a result of analyzing the image data by the image analyzing unit, a control portion for storing the image data the image quality of which is determined to be acceptable by the determining unit to the memory.

According thereto, the image data is analyzed by the image analyzing unit, the acceptability of the image quality of the image data is determined based on the result of analyzing the image data, and the image data determined to be provided with the acceptable image quality is stored to the memory. Therefore, only the image provided with the acceptable image quality can be outputted to the outputting apparatus.

The invention constitutes a gist thereof by the image forming apparatus further including an informing unit for informing the acceptability of the image quality determined by the determining unit to a user, and a selecting unit for making the user select whether the image data the acceptability of the image quality of which is informed is stored to the memory, wherein the control portion stores the image data selected by the selecting unit to the memory.

According thereto, the acceptability of the image quality determined by the determining unit is informed to the user. The user can select whether the image data is stored to the memory by the selecting unit after confirming the informed acceptability of the image quality. The image data selected to be permitted to store by the selecting unit is stored to the memory. Therefore, after the user confirms the result of determining the acceptability of the image quality, the user can determine whether the image data is to be stored to the memory and therefore, the image provided with the acceptable image quality can be stored to the memory and further, the image to be stored can be selected by also adding the determination of the user.

The invention constitutes a gist thereof by an image forming apparatus including an image taking unit for taking an image, a memory for storing image data formed by the image taken by the image taking unit, and a transmitting portion for transmitting at least one sheet of the image data selected from the image data stored to the memory to an image outputting apparatus, the image forming apparatus including a transmission operating portion operated to instruct to transmit at least one sheet of the selected image data from the transmitting portion to the image outputting apparatus, an image analyzing unit for analyzing at least one sheet of the selected image data when the transmission operating portion is operated, a determining unit for determining a suitability of whether the image data is provided with an image quality suitable for outputting based on a result of analyzing at least one sheet of the selected image data by the image analyzing unit, an informing unit for informing a result of determining the suitability by the determining unit, an operating portion operated for instructing whether the image data may be transmitted to the image outputting apparatus after informing the result of determining the suitability by the informing unit, and a control portion for transmitting the image data instructed to be permitted to transmit by the operating portion from the transmitting portion to the image outputting apparatus.

According thereto, when at least one sheet of the selected image data is transmitted from the transmitting portion to the image outputting apparatus, the transmission operating portion is operated by the user. When the image data is instructed to transmit by operating the transmission operating portion, the image quality of at least one sheet of the selected image data is analyzed. The suitability of whether the image data is provided with the image quality suitable for outputting is determined based on the result of analyzing the image data by the image analyzing unit and the result of determining the suitability is informed to the user by the informing unit. After informing the result of determining the suitability of the imager quality, the operating portion is operated to instruct whether the image data may be transmitted to the image outputting apparatus and when the instruction that the image data may be permitted to transmit thereto is provided by operating the operating portion, the image data is transmitted from the transmitting portion to the image outputting apparatus and the image based on the image data is outputted to the image outputting apparatus. The user can confirm to determine whether the image may be outputted for each time of transmitting operation in reference to the result of determining the suitability and therefore, wasteful output of the image can be reduced.

The invention constitutes a gist thereof by an image forming apparatus including an image taking unit for taking an image, and a memory for storing image data formed by taking the image by the image taking unit, the image forming apparatus including an image analyzing unit for analyzing the image data formed by taking the image by the image taking unit by operating an image taking operating portion, a determining unit for determining an acceptability of an image quality of the image data based on a result of analyzing the image data by the image analyzing unit, an informing unit for informing a result of determining the acceptability by the determining unit to a user, an operating portion operated for instructing whether the image data may be stored to the memory to the user after informing the result by the informing unit, a control portion for storing the image data to the memory when the control portion is instructed to be permitted to store by the operating portion.

According thereto, in taking the image, the image taking operating portion is operated by the user. When the image is instructed to take by operating the image taking operating portion, the image taking unit takes the image to form the image data and the image quality of the formed image data is analyzed by the image analyzing unit. The acceptability of the image quality of the image data is determined based on the result of analyzing the image data by the image analyzing unit and the result of determining the acceptability of the image quality is informed to the user by the informing unit. After informing the result of determining the acceptability of the image quality, the operating portion is operated for instructing whether the image data may be stored to the memory and the image data instructed to be permitted to store in the memory is stored to the memory by operating the operating portion. The user can confirm to determine whether the image data may be stored to the memory at each time of taking the image in reference to the result of determining the acceptability of the image quality and therefore, wasteful image data can be reduced to store to the memory.

The invention constitutes a gist thereof by an image forming apparatus including an image taking unit for taking an image, a memory for storing image data formed by taking the image by the image taking unit, and a displaying unit for displaying the image based on the image data read from the memory on a screen, the image forming apparatus including an image analyzing unit for reading the image data from the memory when an operating portion is operated for displaying the image on the screen of the displaying unit and subjecting the read image data to an image analysis, a determining unit for determining an acceptability of an image quality of the image data based on a result of analyzing the image data by the analyzing unit, and an informing unit for informing a result of determining the acceptability by the determining unit to a user.

According thereto, when the operating portion is operated to display the image on the screen of the displaying unit, the image data is read from the memory and the read image data is subjected to the image analysis. The acceptability of the image quality of the image data is determined based on the result of analyzing the image data and the result of determining the acceptability of the image quality is informed to the user. Therefore, the user can erase the image data provided with the image quality which is not suitable for outputting or stops to output the image.

The invention constitutes a gist thereof by the image forming apparatus including the transmitting portion for transmitting at least one sheet of the image data selected from the image data stored to the memory to output to the image outputting apparatus, the acceptability of the image quality determined based on the result of analyzing the image quality of the image analyzing unit is for determining the suitability of whether the image quality is an image quality suitable for outputting by the image outputting unit, wherein in the image forming apparatus including the transmitting portion for transmitting at least one sheet of the image data selected from the image data stored to the memory to the image outputting apparatus, the image forming apparatus including the transmission operating portion operated for instructing to transmit at least one sheet of the selected image data from the transmitting portion to the image outputting apparatus, the operating portion operated for making the image analyzing unit analyze at least one sheet of the selected image data when the transmission operating portion is operated, making the determining unit determine the suitability of whether the image data is provided with the image quality suitable for outputting based on the result of analyzing at least one sheet of the selected image data by the image analyzing unit, making the informing unit inform the result of determining the suitability of the image quality by the determining unit to the user and instructing whether the image data may be transmitted to the image outputting apparatus after informing the result of the suitability of the image quality by the informing unit, and the control portion for transmitting the image data instructed to be permitted to transmit by the operating portion from the transmitting portion to the image outputting apparatus.

According thereto, in taking the image, the image quality of the image data is analyzed, the suitability of whether the image quality is the image quality suitable for outputting is determined, the result of determining the suitability of the image quality is informed to the user and therefore, the user can select the image provided with the image quality suitable for outputting to store to the memory by the selecting unit. On the other hand, when the transmission operating portion is operated for transmitting at least one sheet of the image data selected from the image data stored to the memory from the transmitting portion to the image outputting portion, the image quality of the image is analyzed and the result of determining whether the image quality is the image suitable for outputting is informed to the user. The user selects the image to be outputted by the selecting unit in reference to the informed result of determining the suitability by the selecting unit. Further, the selected image data is transmitted from the transmitting portion to the image outputting apparatus and the image based on the image data is outputted from the image outputting apparatus. Therefore, at timings of both in taking the image and transmitting the image, it is determined whether the image data is provided with the image quality suitable for outputting and the user can select whether the image data is stored or transmitted. It is not necessary to store wasteful image data to the memory and further, wasteful image can be reduced to output to the image outputting apparatus.

The invention constitutes a gist thereof by the image forming apparatus, wherein the informing unit includes a displaying unit for displaying the result of determining the acceptability of the image quality on a screen. According thereto, the result of determining the acceptability or the suitability is informed to the user by being displayed on the screen of the displaying unit.

The invention constitutes a gist thereof by the image forming apparatus, wherein the informing unit displays a plurality of the images on the screen of the displaying unit and displaying the result of determining the acceptability of the image in correspondence with the image. According thereto, the result of determining the acceptability or the suitability is informed to the user by being displayed in correspondence with the plurality of images displayed on the screen of the displaying unit. Therefore, the image and the result of determining the suitability or the acceptability can be seen to compare and the image data of the image suitable for outputting or storing is made to be easy to pertinently determine.

The invention constitutes a gist thereof by an image processing system including the image forming apparatus and the image outputting apparatus for receiving the image data transmitted from the transmitting portion of the image forming apparatus and outputting the image based on the received image data. According thereto, operation and effect similar to those of the invention of the respective image forming apparatus can be achieved.

The invention constitutes a gist thereof by an image processing system including an image forming apparatus having a transmitting portion for transmitting image data formed by taking an image by image taking unit for taking the image to an image outputting apparatus, and the image outputting apparatus for outputting the image based on the image data received from the transmitting portion of the image forming apparatus, wherein the image apparatus including a transmission operating portion operated for instructing to transmit the selected image data from the transmitting portion to the image outputting apparatus, the transmitting portion for transmitting the image to the image outputting apparatus, a receiving portion for receiving a determination result determined based on analyzing the image from the image outputting apparatus, an informing unit for informing the determination result to a user, a selecting unit for making the user select whether the image may be outputted to the image outputting apparatus, and the image outputting apparatus including a receiving portion for receiving the image data selected by the image forming apparatus, an image analyzing unit for analyzing the image data, a determining unit for determining an acceptability of an image quality of the image data, and a transmitting portion for transmitting a result of determining the acceptability of the image quality by the determining unit to the image forming apparatus.

According thereto, when the transmission operating portion is operated, the image data selected at the occasion is transmitted to the image outputting apparatus. In the image outputting apparatus, the image quality of the image data is analyzed by the image quality analyzing unit and the result of determining the acceptability of the image quality is transmitted from the transmitting portion to the image forming apparatus. In the image forming apparatus, the determination result received at the receiving portion is informed to the user. The user selects whether the image based on the image data is to be outputted to the image outputting apparatus by the selecting unit in reference to the informed determination result.

The invention constitutes a gist therefore by being characterized in the image forming apparatus constituting the image processing system, the image forming apparatus including a transmission operating portion operated for instructing to transmit the selected image data from the transmitting portion to the image outputting apparatus, the transmitting portion for transmitting the image to the image outputting apparatus, the receiving portion for receiving the result of determining the acceptability of the image quality determined based on analyzing the image from the image outputting apparatus, an informing unit for informing a result of determining the acceptability of the image quality to a user. According thereto, operation and effect similar to those of the image processing system are achieved.

The invention constitutes a gist thereof by being characterized in the image forming apparatus constituting the image processing system including the receiving portion for receiving the image data selected by the image forming apparatus, the image analyzing unit for analyzing the image data, the determining unit for determining the acceptability of the image quality of the image data, and the transmitting portion for transmitting the result of determining the acceptability of the image quality by a determining unit to the image forming apparatus. According thereto, operation and effect similar to those of the above-described image processing system are achieved.

The invention constitutes a gist thereof by an image processing system including an image forming apparatus having a transmitting portion for transmitting image data formed by taking an image by an image taking unit for taking the image to an image outputting apparatus, and an image outputting apparatus for outputting the image based on the image data received from the transmitting portion of the image forming apparatus, wherein the image forming apparatus including a transmission operating portion operated for instructing to transmit the selected image data from the transmitting portion to the image outputting apparatus, an image analyzing unit for analyzing the image data instructed to transmit by operating the transmission operating portion prior to transmitting the image data, a determining unit for determining an acceptability of an image quality of the image data based on a result of analyzing the image data by the image analyzing unit, a control portion for transmitting a result of determining the acceptability of the image quality by the determining unit from the transmitting portion to the image outputting apparatus, and the image outputting apparatus including a receiving portion for receiving the result of determining the acceptability of the image quality transmitted from the image forming apparatus, an informing unit for informing a result of determining the acceptability, and a selecting unit for selecting whether the image based on the image data is outputted after informing the result of determining the acceptability by the informing unit.

According thereto, when the transmission operating portion is operated for transmitting the selected image data from the transmitting portion to the image outputting apparatus, prior to transmitting the image data, the image quality of the image data is analyzed and the result of determining the acceptability of the image based on the result of analyzing the image quality is transmitted to the image outputting apparatus. In the image outputting apparatus, the result of determining the acceptability of the image quality received by the receiving portion is printed by the printing unit. Therefore, the user can know the image data provided with the image quality suitable for printing by taking a look at the result of determining the acceptability of the image quality suitable to be printed by the image outputting apparatus.

The invention constitutes a gist thereof by the image forming apparatus constituting the image processing system, the image forming apparatus including the transmission operating portion operated for instructing to transmit the selected image data from the transmitting portion to the image outputting apparatus, the image analyzing unit for analyzing the image data instructed to transmit by operating the transmission operating portion prior to transmitting the image data, the determining unit for determining the acceptability of the image quality of the image data based on the result of analyzing the image data by the image analyzing unit, and the control portion for transmitting the result of determining the acceptability of the image quality by the determining unit from the transmitting portion to the image outputting apparatus. According thereto, operation and effect similar to those of the invention of the above-described image processing system can be achieved.

The invention constitutes a gist thereof by the image outputting apparatus constituting the image processing system, the image outputting apparatus including the receiving portion for receiving the result of determining the acceptability of the image quality transmitted from the image forming apparatus, and the printing unit for printing the result of determining the acceptability of the image quality received by the receiving portion. According thereto, operation and effect similar to those of the invention of the above-described image processing system can be achieved.

The invention constitutes a gist thereof by an image outputting apparatus including a slot for insertably and drawably inserting a memory medium, and a printing unit for reading image data from the memory medium inserted into the slot and printing an image based on the read image data, the image outputting apparatus including an image analyzing unit for analyzing the image data inserted into the slot, a determining unit for determining a suitability of whether an image quality of the image data is suitable for printing based on a result of analyzing the image data by the image analyzing unit, an informing unit for informing a result of determining the suitability by the determining unit to a user, a selecting unit for selecting an instruction of whether the image data may be printed after informing the result of determining the suitability by the informing unit, and a control portion for printing the image based on the image data by operating the printing unit when the control portion is instructed to be permitted to print by the selecting unit.

According thereto, the image quality of the image data read from the memory medium inserted into the slot is analyzed by the image analyzing unit, the suitability of whether the image quality is suitable for printing is determined and the result of determining the suitability is informed to the user by the informing unit. The user selects whether the image is printed by the selecting unit in reference to the informed result of determining the suitability. Therefore, the image can be printed by selecting the image data read from the memory medium and provided with the image quality suitable for printing.

The invention constitutes a gist thereof by a program executed by a computer in an image forming apparatus including an image taking unit for taking an image and a memory for storing image data formed by taking the image by the image taking unit, the program including a stage of analyzing an image quality of the image data by the computer when the image data is formed by taking the image by the image taking unit by operating an image taking operating portion, a stage of determining an acceptability of the image quality of the image data based on a result of analyzing the image quality provided at the stage of analyzing the image quality by the computer, a stage of displaying a result of determining the acceptability of the image quality determined at the stage of determining the acceptability of the image quality by the computer on a screen of a displaying unit, and a stage of awaiting for an instruction of whether the image data may be stored to the memory by operating an operating portion after displaying the result of determining the acceptability of the image quality on the screen by the computer, storing the image data to the memory when the memory is instructed to be permitted to store the image data and erasing the image data when the memory is not instructed to be permitted to store the image data on the other hand.

The invention constitutes a gist thereof by a program executed by a computer in an image forming apparatus including an image taking unit for taking an image, a memory for storing image data formed by taking the image by the image taking unit, and a transmitting portion for transmitting at least one sheet of the image data selected from the image data stored to the memory to an image outputting apparatus, the program including a stage of analyzing an image quality of at least one sheet of the selected image data by the computer when the computer is instructed to transmit at least one sheet of the selected image data from the transmitting portion to the image outputting apparatus by operating a transmission operating portion, a stage of determining a suitability of whether the image data is provided with the image quality suitable for outputting based on a result of analyzing the image data in the above-described stage by the computer, a stage of displaying a result of determining the suitability provided at the above-described stage of determining the suitability on a screen of an displaying unit by the computer, and a stage of awaiting for an instruction of whether the image data may be permitted to transmit to the image outputting apparatus after displaying the result of determining the suitability, transmitting the image data from the transmitting portion to the image outputting apparatus when the image data is instructed to be permitted to transmit, and stopping to transmit the image data from the transmitting portion to the image outputting apparatus when the image outputting apparatus is not instructed to transmit the image data on the other hand by the computer.

The invention constitutes a gist thereof by a program executed by a computer in an image forming apparatus including an image taking unit for taking an image, a memory for storing the image data formed by taking the image by the image taking unit, and a displaying unit for displaying the image based on the image data read from the memory on a screen, the program including a stage of reading the image data from the memory by the computer when the computer is instructed to display the image on the screen of the displaying unit by operating an operating portion and subjecting the read image data to an image analysis, a stage of determining an acceptability of an image quality of the image data based on a result of analyzing the image by analyzing the image by the computer, and a stage of displaying a result of determining the acceptability of the image quality provided at the above-described stage of determining the acceptability of the image quality by the computer on the screen of the displaying unit along with the image based on the image data.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 shows a digital still camera, FIG. 3A is a front view, FIG. 3B is a rear view, and FIG. 3C is a side view;

FIG. 4 is an electric constitution block diagram of the digital still camera;

FIG. 14A and FIG. 14B are explanative views for explaining a processing of determining an output object and FIG. 14C is an explanative view of a determining method;

DETAILED DESCRIPTION OF THE PREFERRED EMBODIMENTS

First Embodiment

An explanation will be given of a first embodiment according to the invention in reference to FIG. 1 through FIG. 16 as follows.

Figure 2:
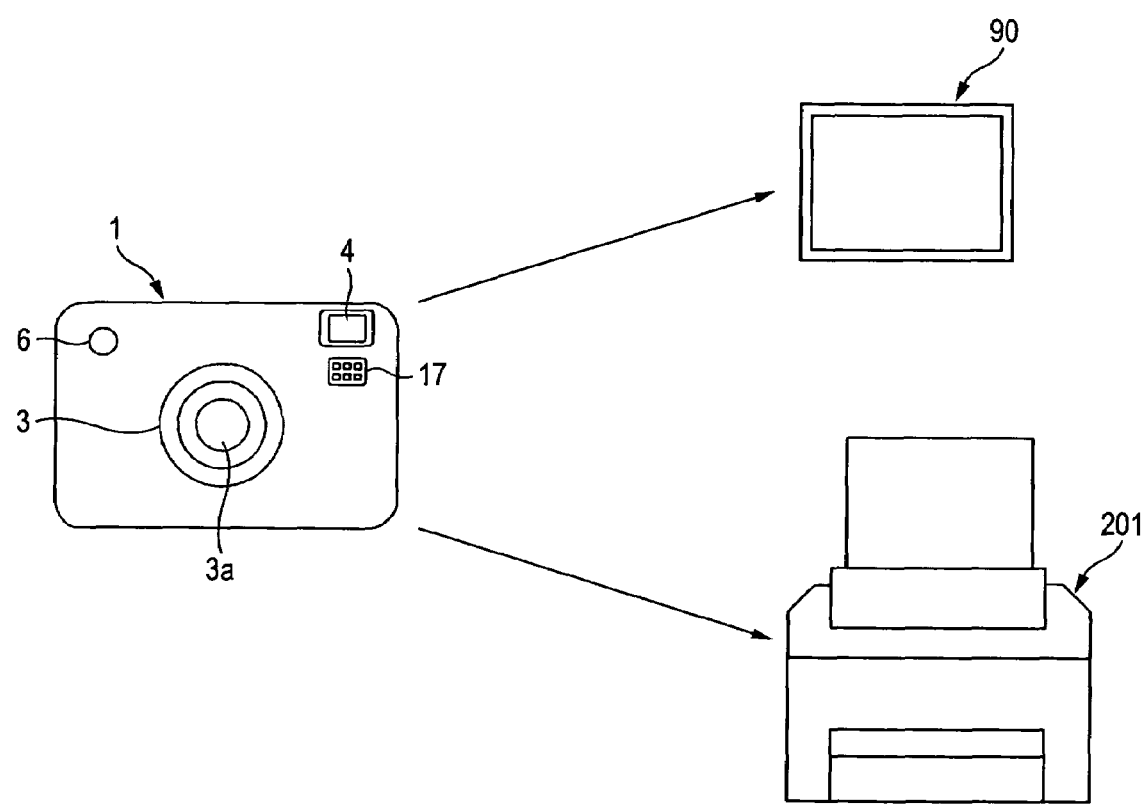
FIG. 2 is a schematic view of an image processing system.

FIG. 2 is an outline view of an image processing system. A digital still camera 1 as an image forming apparatus shown on a left side of FIG. 2 is connected to a display apparatus 90 as an image outputting apparatus shown on a right upper side of the drawing, or an ink jet type printer 201 (hereafter, simply referred to as printer) as an image outputting apparatus shown on a right lower side of the drawing by a cable or the like in conformity with, for example, IEEE 1394 standards. The digital still camera 1 is provided with an image analyzing function, a searching function, a determining function, an informing function and a selecting function, and a user transmits image data which needs to output to display or print an image to the display apparatus 90 or the printer 201. Further, as the display apparatus 90, there is pointed out, for example, a liquid crystal display apparatus, a television set or the like having a wireless communication port, and image input terminal or the like capable of receiving data.

FIG. 3 shows the digital still camera 1, FIG. 3A is a front view, FIG. 3B is a rear view, and FIG. 3C is a side view, respectively.

As shown in FIG. 3A, a barrel member 3 having a focus lens 3a for taking an image of an object is provided at the center of a front face of a main body 2 of the digital still camera 1. The barrel member 3 is contained at inside of the main body 2 and is protected by a lens cover (not illustrated) when a power source is not switched on. When the power source is switched on, the lens cover is automatically opened, and the barrel member 3 having the focus lens 3a is projected from inside of the main body 2. Further, a finder 4 is provided on a right upper side of a front face of the main body 2. Further, a microphone 17 as search key inputting unit and voice inputting unit is provided on a lower side of the finder 4. Further, a shutter button 5 is provided at an upper portion on a left side of the front face of the main body 2. An automatically focusing sensor 6 is provided on a left upper side of the front face of the main body 2.

As shown in FIG. 3B, a function selecting switch 7 is provided on a right upper side of a rear face of the main body 2. The function selecting switch 7 is made to be able to select various function modes of an automatic mode, a manual mode, a continuously taking mode and the like. A display screen 12 is provided on a left side of the rear face of the main body 2. The display screen 12 is displayed with a taken image and various set menu screens. Further, in an image taking mode, an object in taking an image thereof can be displayed on the display screen 12 via the focus lens 3a. Therefore, a trouble of peeping the finder 4 to take the object is alleviated. A power source button 8, a select/determine button 9, a return button 10 and a direction button 11 are provided on a side proximate to a right side of the rear face of the main body. The select/determine button 9 selects an image, selects display of an image, selects a menu of selecting a print mode or the like and determines the menu, and determines an image in the menu. The return button 10 cancels a menu selected by the select/determine button 9 or selection of the image to return to a one stage past state. The direction button 11 is used in selecting an image from an image selecting screen displayed on the display screen 12, that is, a plurality of images or selecting various set menus. First, by depressing the select/determine button 9, image data or various set menus are displayed on the display screen 12. By operating the direction button 11 successively, for example, a selected image or set mode is devised to be colored and the select/determine button 9 is depressed when the desired image data or set mode is selected. The desired image data or set mode is selected by the operation and displayed on the display screen 12.

As shown in FIG. 3C, one side face of the main body 2 is provided with a memory slot 13, an audio output terminal (A/V output terminal) 14, a PC/printer connecting terminal (digital terminal) 15, and a power source plug terminal (DCIN terminal) 16. According to the embodiment, the printer 201 and the digital still camera 1 are connected communicatably by a communication cable in correspondence with IEEE 1394.

FIG. 4 shows an electric constitution block diagram of the digital still camera 1.

The digital still camera 1 is provided with a control circuit 20 and CPU 21, ROM 22, and RAM 23 disposed at inside thereof, an operating portion 24, a flash 25, an image processing circuit 26, an outside interface 27, a liquid crystal display 28, an optical circuit 29, an image acquiring circuit 30 and a memory card 31 as a memory.

The operating portion 24 is constituted by the various buttons 5 and 7 through 11 provided at the rear face of the main body 2 of the digital still camera 1 (refer to FIG. 3B) and when the buttons are operated, the operations are converted into electric signals and the electric signals are outputted to the control circuit 20.

The voice input portion 32 is constituted by the microphone 17 provided at the front face of the main body 2 of the digital still camera 1 (refer to FIG. 3A). When voice is inputted to the microphone 17, the voice input portion 32 converts the voice into an electric signal to output to the control circuit 20. The control circuit 20 converts the electric signal into voice data, for example, PCM data (normally, WAV format) to output to the memory card 31 and the memory card 31 is stored therewith as a search key 65, mentioned later.

The control circuit 20 generally controls the flash 25, the image processing circuit 26, the outside interface 27, the liquid crystal display 28, the optical circuit 29 and the image acquiring circuit 30 of the digital still camera 1. ROM 22 provided at inside of the control circuit 20 is stored with programs and various data. RAM 23 is temporarily stored with image data, image acquiring and forming history data and the like.

CPU 21 controls circuits of a total of the digital still camera 1 other than controlling ROM 22 and RAM 23. The flash 25 is an auxiliary light source and is controlled by operating the operating portion 24 in accordance with a selected mode of forced light emittance, automatic light emittance in cooperation with the optical circuit 29, prohibition of light emittance or the like.

The image processing circuit 26 carries out a digital image processing of image data at inside of the digital still camera 1 to convert into a predetermined image file style. The outside interface 27 connects the digital still camera 1 and the image outputting apparatus of the printer 50 or the like to govern communication therebetween. The outside interface 27 is in conformity with, for example, IEEE 1394 standards to carry out communication via the communication cable in correspondence with IEEE 1394. Further, according to the embodiment, a transmitting portion for transmitting image data to the image outputting apparatus (printer 201) is constituted by the PC/printer connecting terminal 15 and the outside interface 27.

The liquid crystal display (LCD) 28 displays image data or an image searching result or an image determining result, mentioned later, at inside of the digital still camera 1 along with the image. In displaying the image, there is (are) displayed a single number (hereafter, referred to as single) or a plural number (hereafter, referred to as multi) of an image (images) based on image data temporarily held in RAM 23 at inside of the control circuit 20, or image data held in the memory card 31. The optical circuit 29 controls the focus lens 3a (barrel member 3) and the automatically focusing sensor 6 or the like. The image acquiring circuit 30 acquires a taken image as data by controlling the optical circuit 29. The memory card 31 stores the acquired image data file (image file).

Figure 5:
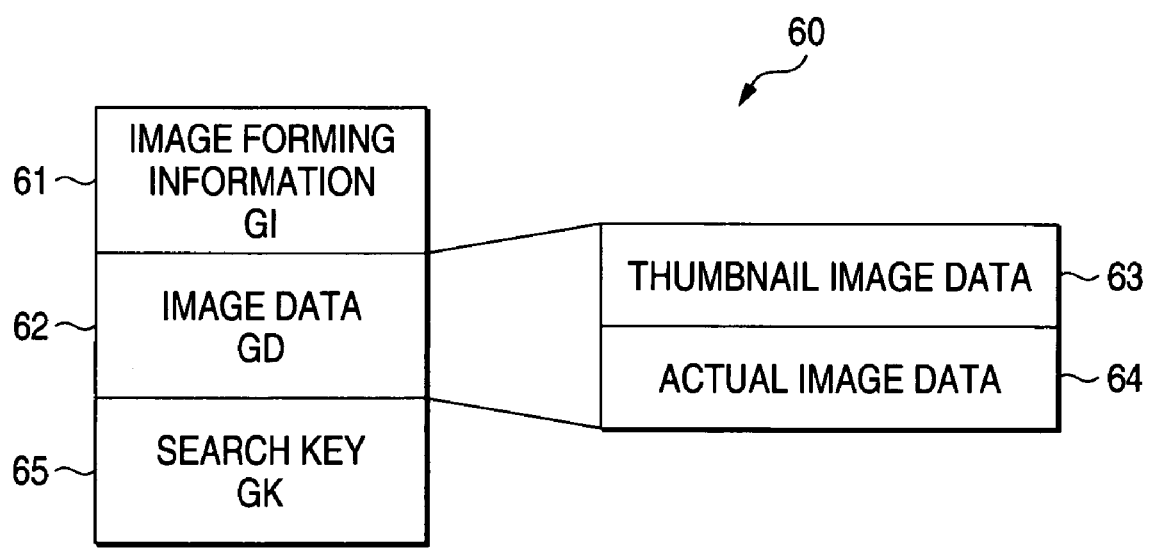
FIG. 5 is a data structure diagram of image data.

FIG. 5 shows a data structure of an image file 60. The image file 60 is provided with image forming history information 61, image data 62 and the search key 65. All of taken images are made to constitute the image file 60 to store to the memory card 31.

The image forming history information 61 comprises information with regard to time of forming image data by the digital still camera 1, that is, an image acquiring condition in taking an image. The image forming history information 61 includes time and date of taking an image, name of camera, a diaphragm value, an exposure time, a shutter speed, a lens focal distance, flash, object region, exposure adjusting mode, image taking mode, white balance and gamma value or the like.

The image data 62 further includes thumbnail image data 63 and actual image data 64. While thumbnail image is an image data file constituted by thinning image data or the like of the actual image to achieve an advantage that display speed is faster than that of the actual image although a resolution of the image is low. The thumbnail image can swiftly display a plurality of images on the single display screen 12 owing to the advantage. Therefore, the thumbnail image data 63 is used in multi-image display for displaying a plurality of images on one screen. Further, in the case of single image display for displaying one sheet of the image on the display screen, the actual image data 64 is used such that the selected image can be displayed with a high resolution.

The search key 65 is stored relatedly to the above-described image data 62. The search key 65 is identifying information for identifying a taken image and is formed based on voice of "person" or "scenery" inputted to the microphone 17 by the user.

The image file 60 is formed, for example, as follows. First, the function selecting switch 7 of the digital still camera 1 is set to an image taking mode. Successively, an image taking screen is determined by the user and the shutter button 5 is depressed to take an image. At this occasion, the image forming history information 61 is formed as data in taking the image. Further, the taken image is acquired by the image acquiring circuit 30 and transmitted to the control circuit 20 and transmitted from the control circuit 20 to the image processing circuit 60. Further, the image is converted into the actual image data 64 by the image processing circuit 26 and the actual image data 64 is processed into the thumbnail image data 63. Further, the image data 62 including the actual image data 64 and thumbnail image data 63 is stored to the memory card 31 along with the above-described image forming history information 61.

Thereafter, when voice is inputted to the microphone 17 by the user and the select/determine button 9 is depressed, the search key 65 is formed based on the voice and stored to the memory card 31. In this way, the image file 60 including the image forming history information 61 and the image data 62 and the search key 65 is formed. Further, a timing of providing the search key 65 to the image data 62 is not limited to a timing of taking an image and the provision may be carried out when a taken image is reproduced on the display screen 12. In that case, the function selecting switch 7 is set to a reproducing mode, voice is inputted to the microphone 17 while displaying the taken image on the display screen 12 and the select/determine button 9 is depressed. Then, voice inputted to the microphone 17 is converted into voice data and is stored as the search key 65 related to the image displayed on the display screen 12 (image data 62). Further, by inputting voice in reproducing the image, the search key 65 can be rewritten. Therefore, when the search key 65 is erroneously inputted in taking the image, the search key 65 can be rewritten by reproducing the image.

As described above, all of the taken images are made to constitute the image file 60 to store to the memory card 31. Further, only an image in correspondence with a specific one of the search key 65 can be sampled from a plurality of the image files 60 stored to the memory card 31 and displayed on the display screen 12. At this occasion, CPU 21 searches the image file 60 having the above-described search key 65 from the plurality of image files 60 stored to the memory card 31 and displays the image data 62 provided to the image file 60.

Operation of displaying the image in correspondence with the search key 65 on the display screen 12 is carried out as follows. First, the function selecting switch 7 of the digital still camera 1 is set to an image searching mode. Further, voice related to a desired image is inputted to the microphone 17 by the user. The voice is converted into an electric signal by the voice inputting portion 32 shown in FIG. 4 to output to the control circuit 20 and is converted into voice data (search data) by the control circuit. Further, CPU 21 searches the search key 65 substantially coinciding with the voice data, and reads the image data 62 in correspondence with the searched search key 65 from the memory card 31 to display the image on the display screen 12.

Figure 1:
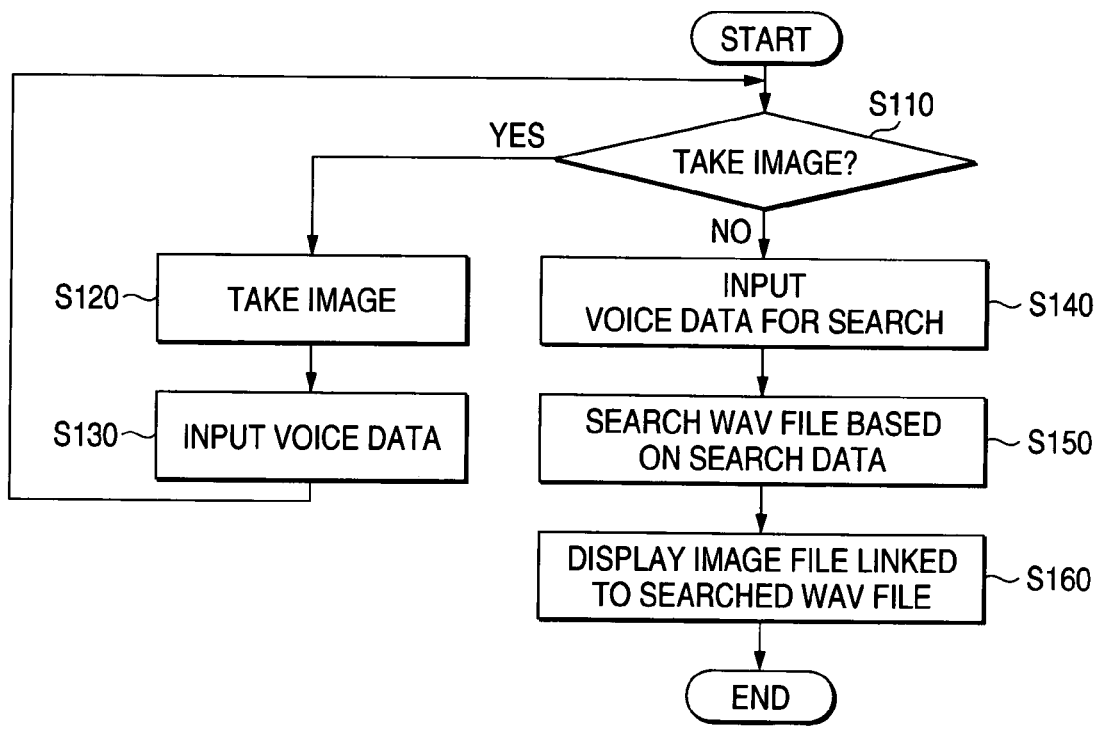
FIG. 1 is a flowchart of an image searching processing according to a first embodiment.

FIG. 1 is a flowchart showing a content of a processing for providing the search key 65 to an image taken in taking the image by the digital still camera 1 and a processing of searching only an image in correspondence with the specific one of the search key 65 from a plurality of the image files 60 stored to the memory card 31 and displaying a search result on the display screen 12. Program data for processing shown in the flowchart is stored to ROM 22. Further, ROM 22 is stored with data of a screen template for displaying a text TX of the search key 65 in correspondence with the image in displaying the image, and character information prepared for integrating to the screen template as a display of a search result, for example, text data of "person", "scenery" or the like.

Figure 6A:
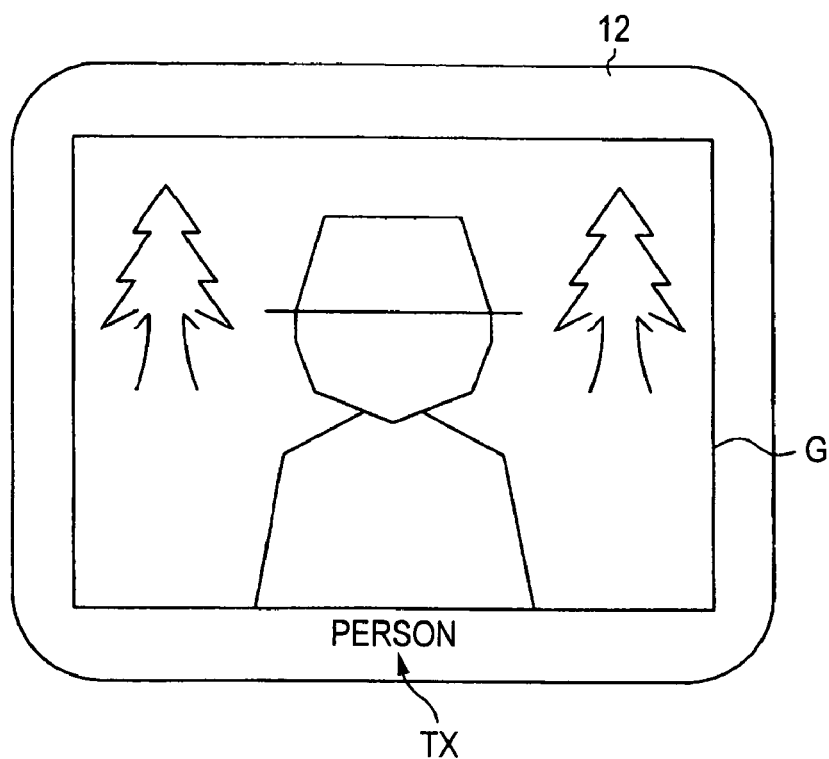
FIG. 6A is an explanative view of single display and FIG. 6B is an explanative view of a multi display of a display screen of the digital still camera showing an example of displaying a result of searching an image.
Figure 6B:
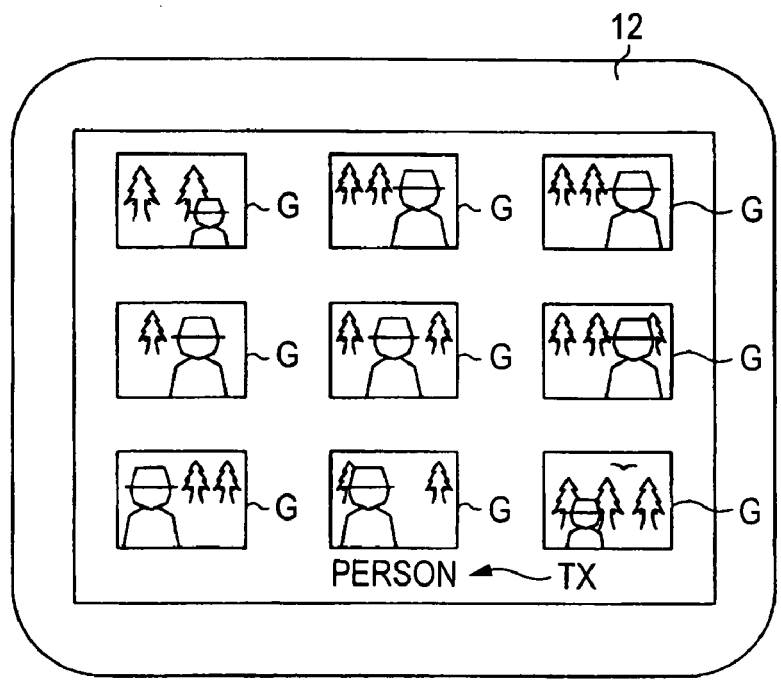

Further, the user can select single display or multi display in displaying the image. When single display is selected, as shown in FIG. 6A, CPU 21 reads the actual image data 64 of the image data 62 from the memory card 31 and reads the template stored to ROM 22 and allocates the image G and the text TX (for example, "person") to a corresponding positional relationship by using the template. When the multi display is selected, as shown in FIG. 6B, CPU 21 reads the thumbnail image data 63 of the image data 62 from the memory card 31 and reads the template stored to ROM 22 and allocates the image G and the test TX (for example, "person") to a corresponding positional relationship by using the template.

Further, in setting default, the image is displayed by single. When the image is intended to confirm by multi image, the select/determine button 9 is depressed. Then, an image display switch mode is displayed on the liquid crystal display 28. It is selected whether image is single or multi by the direction button 11 and is determined by the select/determine button 9. When display of the image is a single mode, the images to be displayed are switched sheet by sheet by depressing the direction button 11. On the other hand, in the case in which display of the image is a multi mode, when the images displayed in the liquid crystal display 28 are selected by the direction button 11 and the direction button 11 is operated in a direction capable for proceeding successively from a first image or a final image displayed, a successive multi image is displayed.

Figure 7:
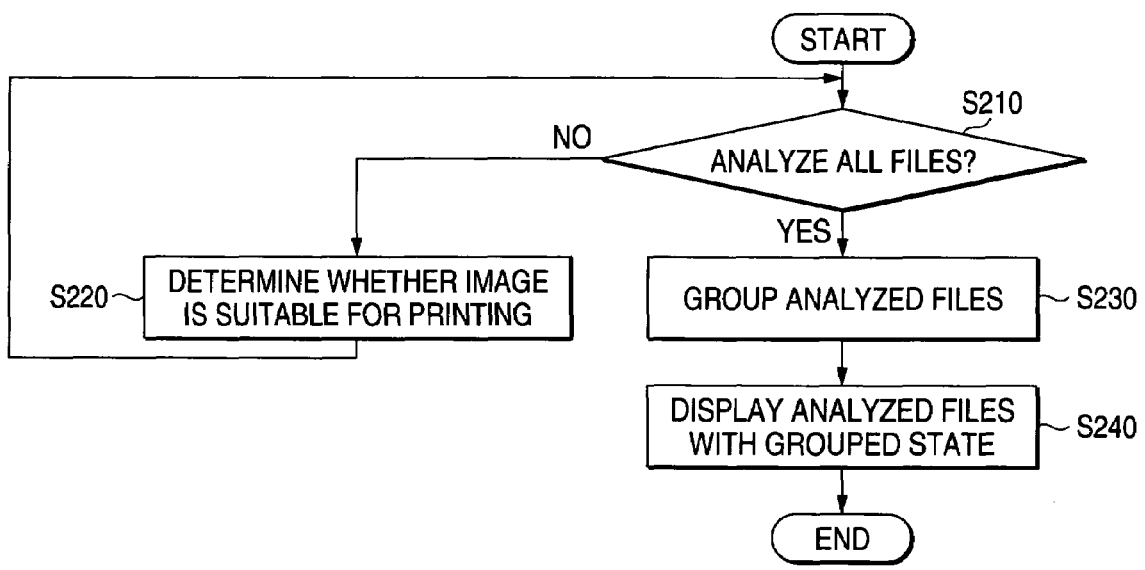
FIG. 7 is a flowchart of an image analyzing processing.

Meanwhile, FIG. 7 is a flowchart showing a content of a processing of determining whether the image is provided with an image quality suitable for printing by analyzing the image after searching the image by the processing shown in FIG. 1 (image analyzing processing) and grouping a result of determination on the display screen 12. Program data for processing shown in the flowchart is stored to ROM 22. Further, ROM 22 is stored with data of a screen template for displaying a result of analysis in correspondence with the image in displaying the image and character information prepared for integrating to the screen template as display of the result of analysis, for example, text data of, for example, "OK", "NG" or the like.

According to the embodiment, after searching the image file 60 in correspondence with a desired one of the search key 65 from the image file 60 stored to the memory card 31 by the processing shown in FIG. 1, the image of the image data 62 (actual image data 64) included in the image file 60 is analyzed. According to the image analyzing processing, it is analyzed whether out of focus, single color and movement of the hand are brought about in the image. Further, a determination result of determining whether the image quality is suitable for printing from a result of analyzing the image is grouped for each determination result to display on the display screen 12. In this way, according to the embodiment, the user is informed with a desired image as well as a suitability of printing of the image quality of the desired image.

Figure 8A:
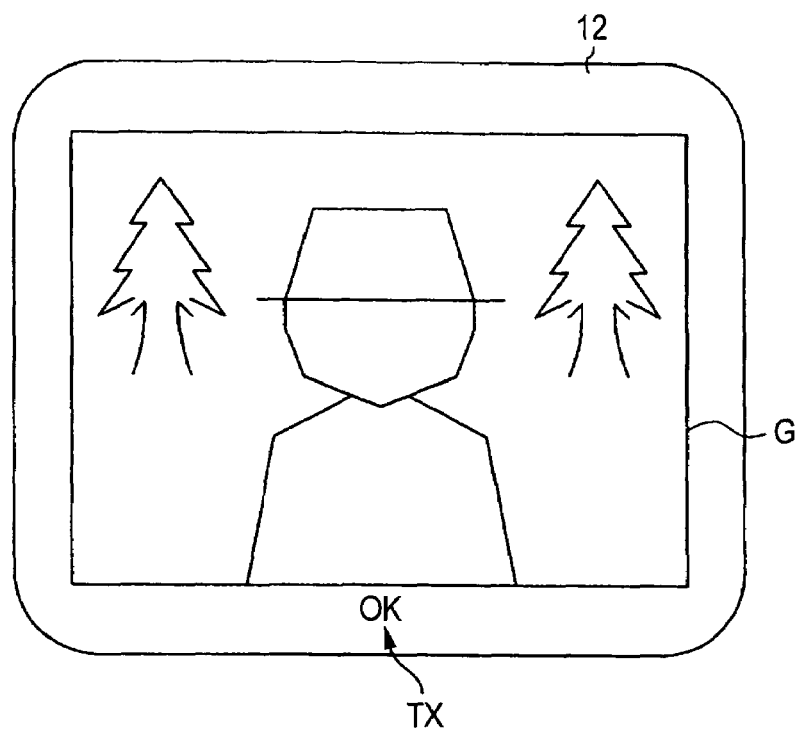
FIG. 8A is an explanative view of single display and FIG. 8B is an explanative view of multi display of the digital still camera showing an example of displaying a result of searching an image.

In displaying the determination result, when the single display is selected, as shown in FIG. 8A, for example, when the image is an image suitable for printing, the image G is displayed on the display screen 12 and text TX of the determination result of, for example, "OK" showing that the image quality is suitable for printing is displayed on a lower side of the screen. Naturally, for example, when the image corresponds to out of focus, single color or movement of the hand, the image G is displayed on the display screen 12 and text TX of the determination result of, for example, "NG" showing that the image quality is not suitable for printing is displayed on the lower side of the screen. Naturally, in displaying the determination, a content of the determination of "out of focus", "single color" or "movement of the hand" or the like determined by analyzing the image may be displayed by character information in place of "NG". In that case, it is determined how the image is not suitable for printing in the image which is not suitable for printing.

Figure 8B:
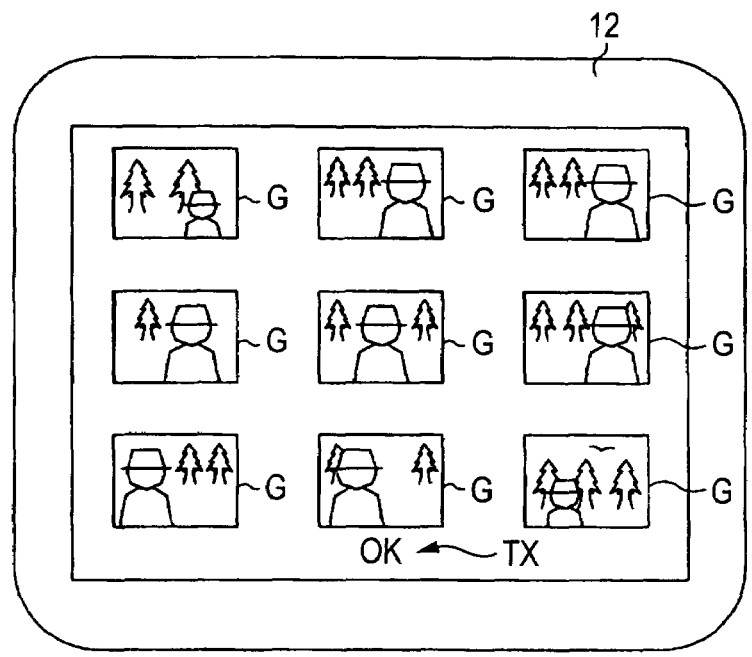

When the multi display is selected, as shown in FIG. 8B, a plurality of the images G suitable for printing are grouped to display and text TX of the determination result of, for example, "OK" is displayed showing that the image is suitable for printing on the lower side. Naturally, for example, when the plurality images which are not suitable for printing are grouped to display on the display screen 12, text TX of the determination result of, for example, "NG" showing that the images are provided with the quality which is not suitable for printing on the lower side. Further, similar to the case of the single display, in displaying the determination, in place of "NG", a content of determination of "out of focus", "single color" or "movement of the hand" or the like determined by analyzing the image may be displayed by character information.

As described above, a user can determine whether the image is to be printed in reference to the search result and the determination result of the displayed image. Further, also when the plurality images are operated to transmit to the printer 201 to print, prior to the transmission, a processing similar to the flowchart is executed and when the image data 62 having the image quality which is not suitable for printing is determined to include, an alarm is issued to the user by showing determination information of whether the image data 62 is to be printed on the display screen 12.

A text of urging the user to instruct whether the data is to be printed by operating the button is displayed on the screen displaying the determination result. For example, "printing is to be executed?" is displayed. The user depresses the select/determine button 9 when printing is executed and depresses the return button 10 when printing is not executed.

Thereafter, printing is executed. That is, the selected image data is transmitted to the printer 201. As a result, when the image data is received, the printer 201 subjects the image data to a predetermined processing to convert into print data and controls to drive a printing mechanism based on the print data to thereby print the image based on the image data received from the digital still camera 1 on a sheet.

Meanwhile, the digital still camera 1 according to the embodiment is provided with a function of searching the search key 65 with respect to a plurality of the image files 60 constituting an object of printing when index printing is instructed to the printer 201 and making the printer 201 print a search result in correspondence with the image. The index printing may be executed after processing the flowchart shown in FIG. 1 or after processing the flowchart shown in FIG. 7.

Figures 9A, 9B:
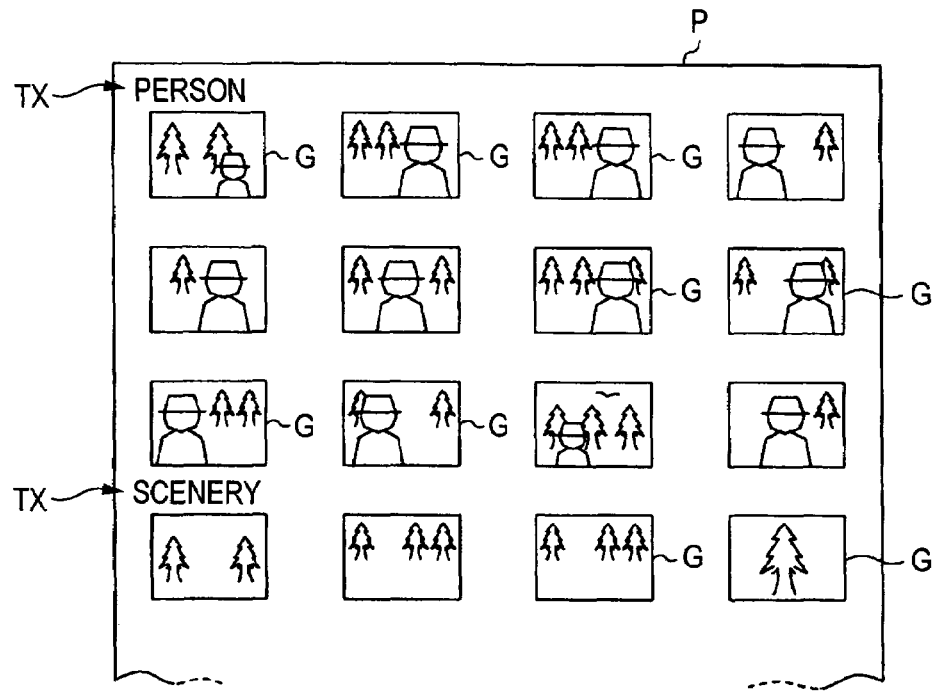
FIG. 9A is an explanative view when image data is used and FIG. 9B is an explanative view when text data is used in printing a result of searching an image by index printing.

When the image is operated to transmit by designating the index printing, the processing of the flowchart shown in FIG. 1 is executed and the search result is transmitted to the printer 201 along with the image data 62. At this occasion, also layout information is transmitted along therewith and as shown in FIG. 9A, the printer 201 prints the sheet P by allocating the plurality of image G sampled by the search key 65 to layout of the index printing and prints text TX of the search key 65 of, for example, "person" on a front upper side of the image G in correspondence with the search key 65. Naturally, display of the search key may be any voice inputted to the microphone 17 in taking the image in place of "person", for example, date or event ("athletic meeting" etc.).

Further, as shown in FIG. 9B, only text data of search result of the image can be printed out. By switching the mode, only classification GP and bibliographic information K of the search result can be outputted to the sheet P as shown in the drawing. The images are aligned for respective classification GP to constitute a list style, information of the image forming history information 61 (refer to FIG. 5) of the image file 60 is read to form the bibliographic information K and the data is transmitted to the printer 201. In comparison with the index printing of FIG. 9A, the processing of printing is simplified and the function is used when the result is intended to be informed swiftly. There is a picture number PN in the bibliographic information K and therefore, the image in correspondence with the designated search key 65 can readily be known from the picture number.

Figures 10A, 10B:
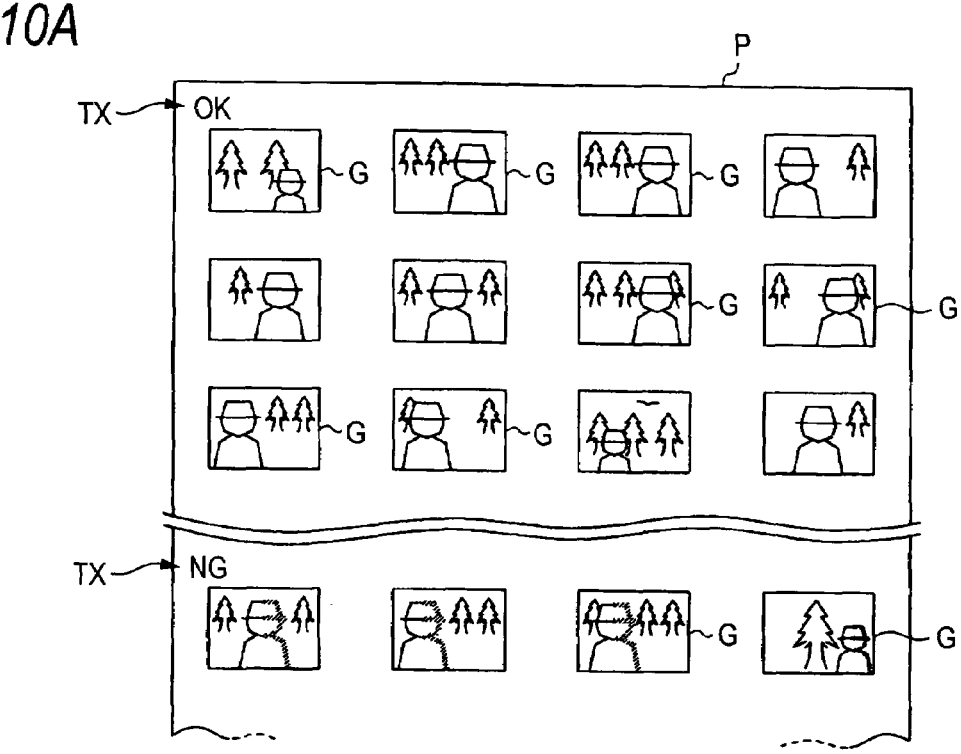
FIG. 10A is an explanative view when image data is used and FIG. 10B is an explanative view when text data is used in printing a result of analyzing an image by index printing.

Similarly, the index printing can be executed after processing the flowchart shown in FIG. 7. In this case, when the image is operated to transmit by designating the index printing, the processing of the flowchart shown in FIG. 7 is executed, and determination information data thereof is transmitted to the printer 201 along with image data. At this occasion, also layout information is transmitted along therewith and as shown in FIG. 10A, the printer 201 prints the sheet P by allocating the plurality of images G to the layout of the index printing and prints text TX of determination information of, for example, "NG" at a front position of the respective images G to correspond therewith. Naturally, in displaying the determination, in place of "NG", the content of determination of "out of focus", "single color" or "movement of the hand" determined by analyzing the image may be displayed by character information.

Further, only text data of a result of determining the image can be printed out as shown in FIG. 10B. By switching the mode, the classification GP and the bibliographic information K can be printed out as shown in the drawing. The images are aligned for each classification GP to constitute a list style, the bibliographic information K is formed by reading information of the image forming history information 61 (refer to FIG. 5) of the image file 60, and the data are transmitted to the printer 201. The processing of printing is more simplified than that of the index printing of FIG. 10A, and the function is used when the result is intended to know swiftly. Since the picture number PN is present in the bibliographic information K, the image which is not suitable for printing can readily be known from the picture number.

Although the search result of the image and the determination result of analyzing the image can be confirmed also in the display screen 12 of the liquid crystal display 28 of the digital still camera 1, when all of the images are temporarily printed by the index printing and it is intended to confirm the images, and confirm presence or absence of the images which are not suitable for printing or, which image is not suitable for printing, the images are temporarily printed out. When a considerable number of sheets of the images are intended to confirm by the digital still camera 1, the liquid crystal display 28 needs to use for a long period of time and the battery of the digital still camera 1 is considerably consumed. In such a case, by temporarily printing out the images, the images can be confirmed on the battery can be saved.

In printing the image by transmitting the image data from the digital still camera 1 to the printer 201, prior to transmitting the image data, the image is selected by the user. Selection of the image by the user is executed after searching the image in correspondence with the search key 65, determining whether the searched image is provided with the image quality suitable for printing and informing the search result and the determination result to the user.

First, when the select/determine button 9 is depressed, various commands are displayed on the liquid crystal display 28. An image search command is selected by the direction button 11 from the respective display of commands and the select/determine button 9 is depressed. Thereafter, voice inputted as identifying information for identifying a desired image is inputted to the microphone 17. Then, the image in correspondence with the inputted voice is searched and displayed on the display screen 12. Further, the various commands are displayed on the liquid crystal display 28 by depressing the select/determine button 9 and the select/determine button 9 is depressed by selecting an image analyzing command by the direction button 11 from the respective displayed commands. Then, a processing of analyzing the image searched by the above-described image searching is executed to determine whether the image is an image suitable for printing and the determination result is displayed on the display screen 12. The user can select the image data to be printed from the image displayed on the display screen 12.

Explaining a flow of operation and selection in the digital still camera 1, first, when an image search mode is constituted, the inputted voice is converted into an electric signal to output from the voice input portion 32 to the control circuit 20. Further, the electric signal is converted into the voice data (search data) at the control circuit 20 and the image data 62 of the image file 60 having the search key 65 substantially coinciding with the voice data is read from the memory card 31 and is temporarily held at RAM 23 in the control circuit 20. Successively, the image data 62 is transmitted from RAM 23 to the liquid crystal display 28 to display the image.

When the image analyzing mode is selected successively, the image analyzing processing of the image data 64 of the image data 62 temporarily held in RAM 23 as described above is executed to determine whether the image quality of the image is suitable for printing and the determination result is temporarily held in RAM 23. Next, the image data 62 is transmitted from RAM 23 to the liquid crystal display 28 to display the image.

Further, in the case of the single image display, when the image intended to print is displayed, the select/determine button 9 is depressed to execute printing. In the case of the multi image display, the image intended to print is selected by the direction button 11 and the select/determine button 9 is depressed. Then, the selected image data is transmitted to the printer 201 to execute printing operation.

An explanation will be given of processings which are carried out by executing programs by CPU 21 in reference to FIG. 1 and FIG. 7 as follows.

First, a flowchart shown in FIG. 1 will be explained.

At step (hereafter, simply abbreviated as S) S110, it is determined whether the digital still camera 1 is brought into a state of taking an image, that is, whether the function selecting switch 7 is set to an image taking mode in the digital still camera 1. When the function selecting switch 7 is set to the image taking mode, the digital still camera 1 is brought into the state of taking an image and therefore, the operation proceeds to S120, and otherwise, proceeds to S140.

At S120, an image is taken. The taken image is converted into the image data 62 by the image processing circuit 26 and stored to the memory card 31. Describing in details, the thumbnail image data 63 having a low resolution is formed from the actual image data 64 and the image data 62 is formed by providing the actual image data 64 and the thumbnail image data 63. Further, in taking the image, the image forming history information 61 including data information in taking the image is formed. That is, in taking the image, the image data 62 including the actual image data 64 and thumbnail image data 63, and the image forming history information 61 related to the image data 62 are stored to the memory card 31.

Next, at S130, voice data is inputted. At this occasion, voice inputted by the user is converted into the voice data, that is, the search key 65 by the control circuit 20. Further, the voice data (the search key 65) is stored to be related to the actual image data 62 stored to the memory card 31 at S120. In this way, at each time of taking an image, the image file 60 including the image forming history information 61, the image data 62 and the search key 65 is formed (refer to FIG. 5).

Thereafter, again at S110, it is determined whether an image is taken. A flow of S110 to S130 is repeated until it is determined that an image is not taken at S110. That is, the flow is repeated so far as the function selecting switch 7 is set to the image taking mode. When it is determined that an image is not taken at S110, the operation proceeds to S140 and selection of an image for executing a predetermined operation (printing or the like) for the image is carried out by the user.

First, at S140, voice in correspondence with an image searched by the user is inputted. At this occasion, the voice inputted to the microphone 17 is converted into the voice data by the control circuit 20.

Further, at S150, by constituting search data by the voice data, a WAV file (search key 65) substantially coinciding with the search data is searched from a plurality of the image files 60 stored to the memory card 31 and the image file 60 linked to the WAV file (search key 65) is temporarily held to RAM 23 of the control circuit 20.

Thereafter, at S160, the image data 62 of the image file 60 held at RAM 23 is displayed on the display screen 12. At this occasion, the image may be displayed on the display screen 12 by single display (displaying the actual data 64) or multi display (displaying the thumb nail image data 63).

By the above-described processing, only the image in correspondence with the desired search key 65 can be displayed from an enormous amount of the image files 60 stored to the memory card 31.

Next, a flowchart shown in FIG. 7 will be explained.

At S210, it is determined whether all of the image files have been analyzed. That is, it is determined whether all the image data searched in the processing shown in FIG. 1 has been analyzed. When all the image data has not been analyzed, the operation proceeds to S220 and when all the image data has been analyzed, the operation proceeds to S260.

At S220, an image analyzing processing is executed. Specifically, CPU 21 outputs the actual image data 64 of the image data 62 stored to RAM 23 and analyzes a degree of an image quality by subjecting the acquired actual image data 64 to an image processing. The image analyzing processing is constituted by an analyzing content capable of determining an image quality of out of focus, single color, movement of the hand or the like. Further, a method of analyzing the image is to be described later in details.

At S230, the image determined at S220 is grouped. At this occasion, the image is classified for each search key 65 by the processing shown in FIG. 1 and further classified by each determination result.

Thereafter, at S240, the determination result is grouped and displayed on the display screen 12. CPU 21 displays the image of the determination result determined to be suitable for printing along with text TX (for example, "OK") in correspondence with the search key 65 by reading a template stored in ROM 22.

Next, the image analyzing processing will be explained. The image analyzing processing corresponds to the processing of S220 in the flowchart of FIG. 7 and executed by CPU 21. In the image analyzing processing, there is an image analyzing method based on a sharpness characteristic, an image analyzing method based on a brightness characteristic and an image analyzing method based on a hand movement characteristic. The image analyzing methods will successively be explained.

An explanation will be given of the image analyzing method based on the sharpness characteristic in reference to FIG. 11 through FIG. 16.

Figure 11A:
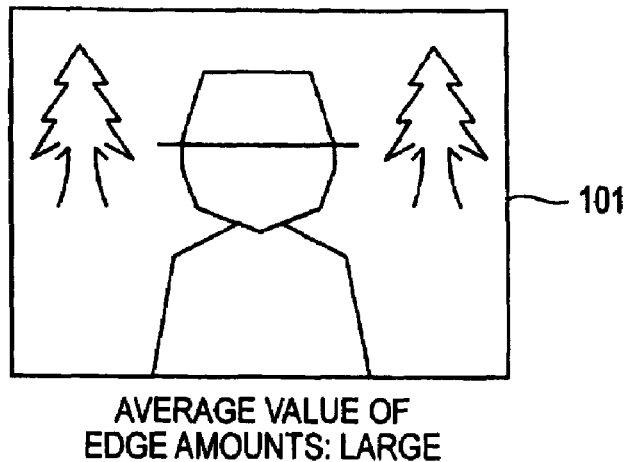
FIG. 11A and FIG. 11B are explanative views of an example of a display screen for explaining a method of analyzing an image based on a sharpness characteristic and FIG. 11C is an explanative view of a determining method.
Figure 11B:
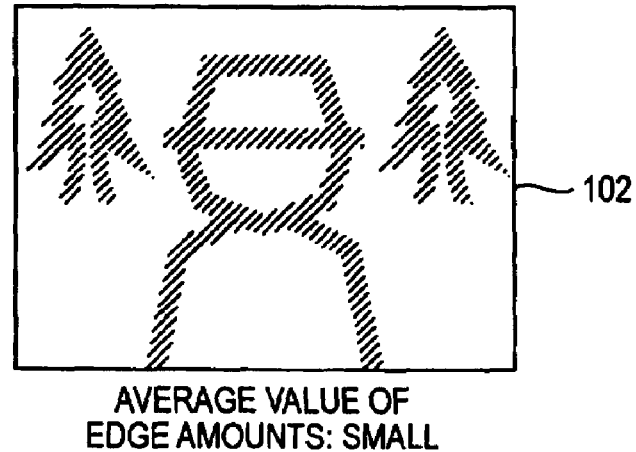

FIG. 11 illustrates explanative views for explaining a processing of determining an object of an output. An image 101 shown in FIG. 1A is an image showing a person at a center thereof and showing a tree at a background thereof. In an image 102 shown in FIG. 11B, although an object thereof is the same as that of the FIG. 11A, a contour of the object becomes unclear. There is a high possibility that the image data having the unclear contour in this way is formed in a case of out of focus and in a case of moving the hand in forming the image data. According to the image determining processing of the embodiment, CPU 21 selects a sharp image having a clear contour of an object as in the image 101 as an output range and removes an image which is not sharp and in which the contour of the object is unclear as in the image 102 from an object of an output. In order to execute such a determination, CPU 21 analyzes the image data, determines a value showing a characteristic with regard to sharpness of an image as an image quality parameter value by using an edge amount, (mentioned later) and executes a determination based on the characteristic value.

As the characteristic value with regard to the sharpness of the image, an average value of the edge amounts at respective pixel positions in the image can be used. The edge amount is a parameter showing a magnitude of a change in a brightness value at the pixel position. As the edge amount at a certain pixel position, a difference of the brightness values of the respective pixels at a vicinity of the pixel position can be used. Various calculating methods can be used as methods of calculating such a difference, for example, "Prewitt operator" can be used.

Figure 12:
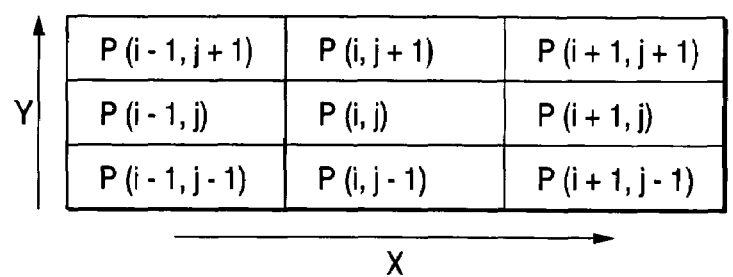
FIG. 12 is an explanative diagram of a method of calculating an edge amount.

As shown in FIG. 12, a plurality of pixels are arranged along X axis direction and Y axis direction orthogonal thereto and notation P (i,j) represents a brightness value of a pixel which is disposed at i-th position along X axis and j-th position along Y axis. In this case, an operational equation of an edge amount E (i,j) at the pixel position (i,j) by Prewitt operator is represented by an operational equation shown below.

$$\Delta fx = \{P(i+i, j+1) - P(i-1, j+1)\} +$$
$$\{P(i+i, j) - P(i-1, j)\} + \{P(i+i, j-1) - P(i-1, j-1)\}$$
$$\Delta fy = \{P(i-i, j-1) - P(i-1, j+1)\} +$$
$$\{P(i, j-1) - P(i, j+1)\} + \{P(i+i, j-1) - P(i+1, j+1)\}$$
$$E(i, j) = \sqrt{(\Delta f \times 2 + \Delta fy2)}$$

When the image data is expressed by a color space which does not include the brightness value as a parameter, for example, when the image data is expressed by using an RGB color space, the brightness value at each pixel position can be acquired by converting the color space into a color space including the brightness value as a parameter, for example, HSL color space, a YCbCr color space or the like.

Figure 11C:
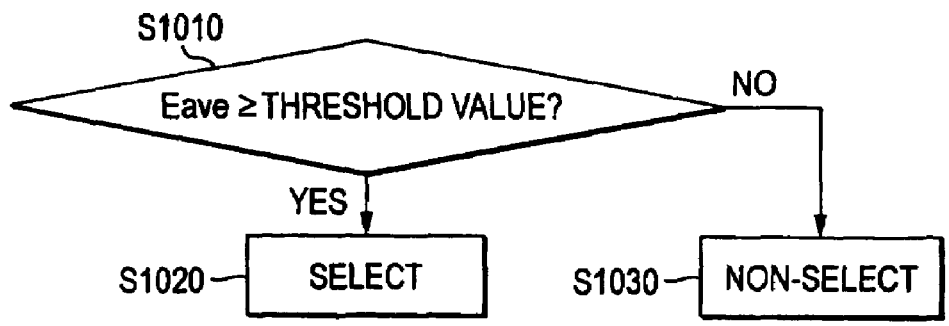

FIG. 11C shows a processing of determining an object of output of the embodiment. According to the embodiment, it is determined whether an average edge amount Eave provided by using the above-described operational equation is equal to or larger than a predetermined threshold (S1010). The image data at which the average edge amount Eave is equal to or larger than the predetermined threshold is selected as an object of an output (S1020). The image data in which the average amount Eave is less than the threshold is removed from the object of an output (S1030). In a sharp image having a clear contour, pixels having large edge amounts tend to increase. Meanwhile, in an image having an unclear contour, pixels having small edge amounts tend to increase. That is, in a sharp image, the average edge amount Eave tends to increase and in an unclear image, the average edge amount Eave tends to reduce. Therefore, by selecting an image having the average edge amount Eave equal to or larger than the threshold as the object of an output, the unclear image can be removed from the object of an output. As the predetermined threshold, a value determined based on organoleptic evaluation of a result of outputting the image can be used. For example, when a range which the brightness value can take is "0~255", "20" may be taken as the predetermined threshold. Further, according to the embodiment, the image forming history information 61 is not utilized and an image quality parameter value (average amount in this example) is determined by analyzing only the actual image data 64.

Figure 13A:
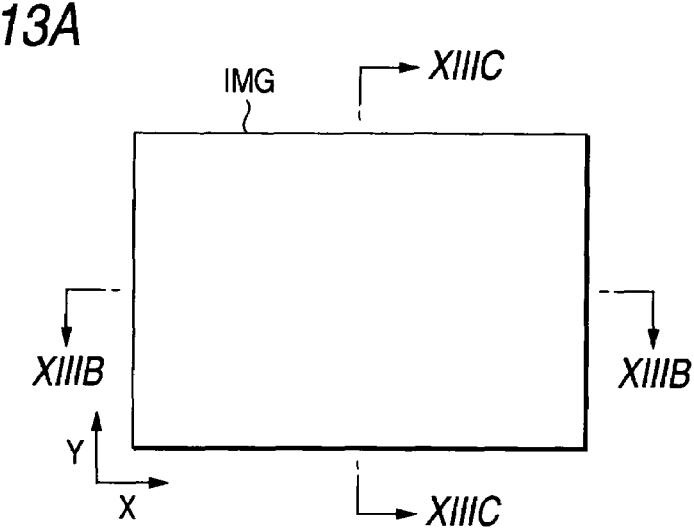
FIG. 13A is a plain view and FIG. 13B and FIG. 13C are side views of FIG. 13A for explaining a weight distribution of the edge amount.
Figure 13C:
Figure 13B:

FIG. 13 illustrates explanative views for explaining a distribution of a weight W used in calculating the average edge amount. FIG. 13B is an explanative view showing a distribution of the weight W on a straight line B-B in an image IMG of FIG. 13A (weight distribution in X direction) and FIG. 13C is an explanative view showing a weight distribution on a straight line C-C in the image IMG of FIG. 13A (weight distribution in Y direction). In this example, as shown in FIG. 13, a weighted average value of the edge amount is calculated by using the distribution of the weight W in which the more proximate is the pixel to a center of the image IMG, the larger the weight and the output object determining processing is executed by using the weighted average value.

FIG. 14 illustrates explanative views for explaining other output object determining processing. Two images of an image 103 shown in FIG. 14A and an image 104 shown in FIG. 14B are images showing a person, the person is shown at a center thereof and a tree is shown at a background thereof. Further, cross marks in the images signify centers of the images. In the image 104, a contour of the person taken at the center is shown unclearly and the tree of the background is shown sharply. The image data of the image 104 is formed when, for example, in forming the image data, the person is not focused but the background is focused.

A distribution of the weight W in X direction shown in FIG. 14B is illustrated on respective lower sides of the image 103 and the image 104. Further, illustration of a distribution in Y direction is omitted. The weighted average edge amount provided by using the weight W is increased in an image having a sharp object disposed at the center of the image as in the image 103 and is reduced in an image having an unclear contour of an object disposed at the center of the image as in the image 104.

FIG. 14C shows the output object determining processing of the example. According to the example, it is determined whether the weighted average edge amount Eave is equal to or larger than a predetermined threshold (S1110). The image data in which the weighted average edge amount Eave is equal to or larger than the predetermined threshold is selected as the output object (S1120). The image data in which the weighted average amount Eave is less than the threshold is removed from the output object (S1130). When the image data is formed, there is frequently a case in which a desired object is arranged to the center of an image. Therefore, according to the example, the image data in which the object proximate to the center of the image is sharply taken, for example, the image data focusing on the desired object can be selected as the output object and the image data in which the object is proximate to the center of the image is unclearly taken, for example, the image data which is not focused can be removed from the output object.

There is conceivable a method of calculating an edge amount in which a weight distribution is not distributed to a center of a total of the image but provided at the center of the object. For example, this is a method in which when the object in the image 103 or 104 is set to the person, a region for providing a weight distribution centering on the person is determined and the weight distribution is provided to a center in the region.

Further, there is also conceivable a method of determining to select an image by comparing an average edge amount calculated by the above-described weight distribution centering on the object and an average edge amount of a total of the image. That is, the image is selected by comparing with the average edge amount centering on the object by constituting a threshold by the average edge amount of a total of the image.

FIG. 15 illustrates explanative views for explaining the output object determining processing based on the brightness characteristic of an image. Three of an image 105 through an image 107 shown in FIG. 15A through FIG. 15C are images showing a person. Brightness of the three images differ from each other. The image 105 shows an image having a high brightness. The image 106 shows an image having a proper brightness and the image 107 shows an image having a lower brightness. In the image 105 having the high brightness, brightness values in respective pixels tend to be high and therefore, an average brightness value thereof is increased. In the image 107 having the low brightness, an average brightness of respective pixels tends to be low and therefore, the average brightness value is reduced. In forming the image data, exposure is adjusted such that a light amount received by an image forming apparatus becomes a proper amount. When exposure is deviated from a proper value, for example, when exposure becomes larger than the proper value, the light amount received by the image forming apparatus becomes larger than the proper amount and bright image data as shown in the image 105 is formed. On the other hand, when exposure becomes smaller than the proper value, the light amount received by the image forming apparatus becomes smaller than the proper amount and dark image data as shown in the image 107 is formed.

Figure 15A:
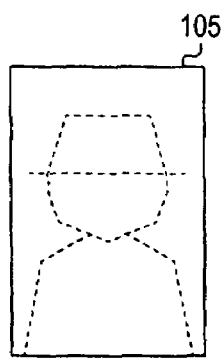
FIG. 15A through FIG. 15C are explanative views for explaining an image analyzing method based on a brightness characteristic of an image and FIG. 15D is an explanative view of a determining method.
Figure 15B:
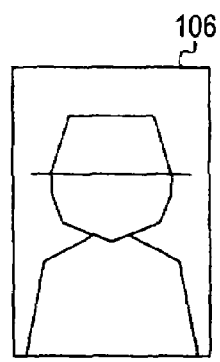
Figure 15C:
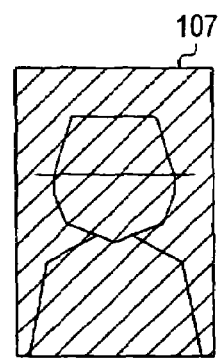
Figure 15D:
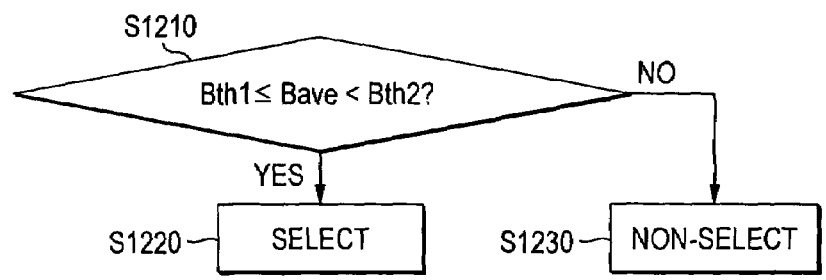

FIG. 15D shows the output object determining processing of the example. According to the example, an average brightness value Bave is used as the characteristic value with regard to a brightness of an image. It is determined whether the average brightness value Bave falls in a predetermined proper range (equal to or larger than a lower limit value Bth 1 and less than an upper limit value Bth 2 in this example) (S1210). The image data in which the average brightness value Bave falls in the proper range is selected as the output object (S1220). The image data in which the average brightness value Bave is out of the proper range is removed from the output object (S1230). Thereby, the image data which is successively bright or the image which is successively dark, for example, image data in which exposure is not set properly in forming the image can be removed from the output object. As the proper range, a range determined based on organoleptic evaluation of the image output result can be used. For example, when a range which the brightness can take is "0 through 255", "equal to or larger than 50 and less than 200" may constitute the predetermined proper range. Further, according to the example, the image forming history information is not utilized and an image quality parameter value (average brightness value in this example) is determined by analyzing only the image data.

As the average brightness value, a weighted average brightness value calculated by using a weight distribution in which a weight of a region intended to constitute a proper brightness is large can also be used similar to calculation of the weighted average edge amount in the above-described respective embodiments. Thereby, a determination further emphasizing a brightness of a desired region can also be executed. Further, an image quality parameter value (average brightness value in this example) can be determined by also analyzing object position information included in the image forming history information.

As a method of determining to select an image by constituting a parameter by a brightness value, the following is also conceivable.

A pixel in which a brightness value thereof is a maximum value or a minimum value is referred to as a clipping pixel. In an image having a high brightness, brightness values of respective pixels become high and therefore, a rate of a pixel in which a brightness value thereof is a maximum value of a range which can be taken by the brightness value tends to increase. On the other hand, in an image having a low brightness, a brightness value of each pixel is reduced and therefore, a rate of a pixel in which a brightness thereof is a minimum value of a range which the brightness value can take tends to increase. That is, when exposure in forming the image data is larger than a proper value, the image data in which a number of clipping pixels in which brightness values thereof are maximum values is liable to be formed and when exposure is smaller than the proper value, the image data in which a number of clipping pixels in which brightness value thereof are minimum values is liable to be formed.

When a rate of a number of clipping pixels relative to a number of total pixels is made to constitute a characteristic value with regard to a brightness, the image data in which the rate of the clipping pixels is equal to or smaller than a predetermined threshold is selected as the output object and the other image data is excluded. Thereby, the image data which is excessively bright and the image data which is excessively dark can be removed from the output range.

As the threshold, a value which is determined based on organoleptic evaluation of the output result of the image can be used. For example, a determination may be carried out by constituting the threshold by 10% of the total pixel number. Further, the rate of the clipping pixels in which the brightness values are the maximum values and the rate of the clipping pixels in which the brightness values are the minimum values may be evaluated separately from each other, further, thresholds for determining magnitudes of the respective rates may be constituted by values different from each other. Thereby, an output object determining processing in consideration of a difference between an influence effected to the image quality by the pixel in which the brightness value is the maximum value and an influence effected to the image quality by the pixel in which the brightness value is the minimum value can be executed. Further, in place of the rate of the clipping pixel, a number of the clipping pixels may be used as the characteristic value with regard to the brightness of the image. Thereby, an output object determining processing which does not depend on a size of the image can be executed.

Figure 16A:
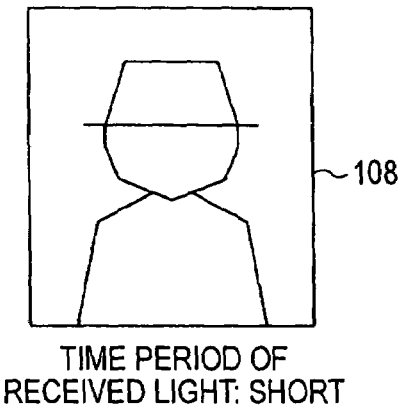
FIG. 16A and FIG. 16B are explanative views for explaining an image analyzing method based on a hand movement characteristic of an image and FIG. 16C is an explanative view of a determining method.
Figure 16B:
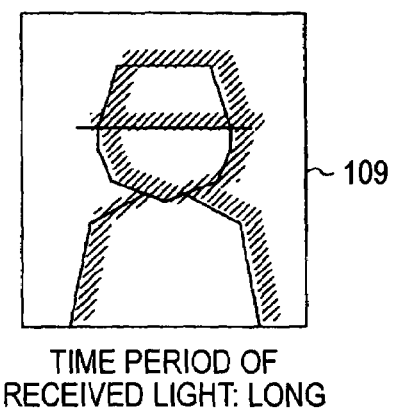

FIG. 16 illustrates explanative views for explaining an image analysis based on the hand movement characteristic. Two of the image 108 and the image 109 shown in FIGS. 16A and 16B are images showing a person. A difference between the two images resides in that a time period in which the image forming apparatus receives light in forming the image is comparatively short in the image 108 and a time period of receiving light is comparatively long in the image 109. Further, in the image 108, a person is shown sharply, on the other hand, in the image 109, the person is shown unclearly. When the direction of the image forming apparatus is changed in the midst in which the image forming apparatus receives light, a position of the object in the image is changed and therefore, the provided image becomes an unclear image. The longer the time period in which the image forming apparatus receives light, the more liable the unclear image is formed. Therefore, the longer the period of receiving light, the more liable the unclear image by moving the hand as in the image 109 is formed.

Figure 16C:
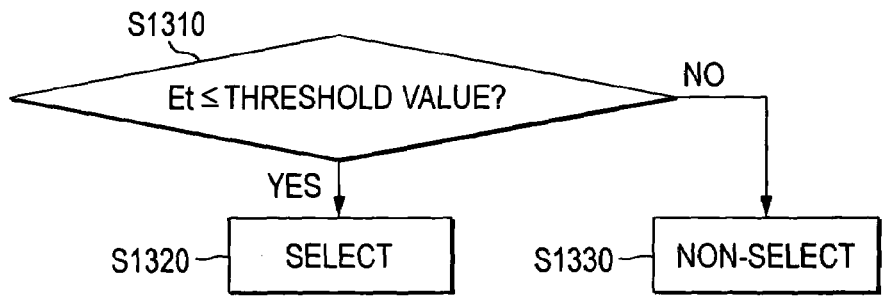

FIG. 16C shows an output determining processing of the example. According to the example, a time period Et in which the image forming apparatus receives light is used as a characteristic value with regard to hand moving. The time period Et of receiving light can be acquired by using exposure information included in the image forming history information 40 or an information parameter value of a shutter speed. It is determined whether the time period Et of receiving light is equal to or smaller than a predetermined threshold (S1310). The image data in which the time period Et of receiving light is equal to or smaller than the predetermined threshold is selected as the output object (S1320). The image data in which the time period Et of receiving light is longer than the predetermined threshold is excluded from the output object (S1330). The longer the time period Et of receiving light, the more liable the unclear image by moving the hand is formed. Therefore, by removing the image data in which the time period Et of receiving light is larger than the predetermined threshold from the output object, the unclear image can be restrained from being outputted by moving the hand. As the predetermined threshold, a value determined based on organoleptic evaluation of the output result of the image can be used. For example, the predetermined threshold may be constituted by 1/15 second. Further, according to the embodiment, the image data is not used and an image quality parameter value (a time period of receiving light in this example) is determined by analyzing only the image forming history information.

When the image is printed from the digital still camera constituted as described above, printing is carried out as follows. First, the user operates the function selecting switch 7 of the digital still camera 1 to set to the image searching mode.

Next, the power source button 8 is depressed. Further, the user inputs a search key in correspondence with a desired image to the microphone 17 by voice. Then, the image in correspondence with the search key 65 is displayed on the display screen 12 of the liquid crystal display 28 along with characters of the search key 65. Next, when the direction button 11 is operated, an image in the display screen 12 is switched in accordance with operation of the direction button 11. The desired image is selected while confirming the image. When the selected image is displayed, the select/determine button 9 is depressed. Then, the selected image is temporarily held in RAM 23. In this way, the user can select the image from the image in correspondence with the desired search key 65.

Further, it can be determined whether a selected image is an image suitable for printing. In that case, the function selecting switch 7 is set to the image analyzing mode. Then, analysis of the image selected by the user from the image in correspondence with the search key 65 is executed, and the analysis result is grouped to display. When the image suitable for printing is displayed, the user switches the image in the display screen in accordance with operation of the direction button 11 by operating the direction button 11. Further, the image intended to print is displayed while confirming the image and when the image intended to print is displayed, the select/determine button 9 is depressed. The image and the image determination result are displayed in the liquid crystal display 28 as shown in, for example, FIG. 8A. Then, printing of the image is executed.

Further, also when the image is displayed on the display apparatus 90, transmitting operation per se stays the same and also in this case, image search and image determination are executed prior to transmission and when a determination that there is the image which is not suitable to output (display) is executed, the user is alarmed (confirm) by displaying the determination information along with the image on the display screen 12. In this case, although a time period is required for transmitting a large amount of the image data to the display apparatus 90, wasteful image data which needs not to display is not be transmitted and therefore, not only a transmission time period can be shortened but also only the desired image having the suitable image quality can be displayed on the display apparatus 90.

Further, when the user determines whether the image which is not suitable for printing is printed and intends to print the selected image, the image analyzing result is grouped to display. Further, the image in the display screen 12 is switched in accordance with operation of the direction button 11 by operating the direction button 11 and when the image intended to print is displayed while confirming the image, the select/determine button 9 is depressed. Then, printing of the image is executed.

Effects of the first embodiment will be described as follows.

(1) According to the embodiment, the search key 65 is provided to be related to the taken image by inputting voice to the microphone 17. Further, the desired image can be selected by inputting voice in selecting the image and displaying only the image in correspondence with the voice on a small monitor (liquid crystal display 28) provided to the digital still camera 1. In this way, in selecting the image, only the image related to the image to be selected can be displayed to select from the images stored to the memory card 31 having a large capacity and therefore, the desired image can efficiently be selected.

(2) The user can select the desired image from the image in correspondence with the search key 65 and execute to print only the image. Therefore, wasteful printing may not be executed, consumption of paper can be restrained and a time period required for printing can be reduced.

(3) In multi image display or printing a plurality images, (for example, index printing) the image sampled in correspondence with the search key 6 is analyzed and the image quality is determined to display on the display screen 12. Therefore, the user can select the image from the image in correspondence with the search key 65 after referring to the determination result of the image analysis and therefore, the desired image can be selected efficiently in a short period of time.

(4) According to the embodiment, it is determined whether the image data 62 (actual image data) sampled in correspondence with the search key 65 is an image suitable for printing by further analyzing the image. By classifying the image data 62 in multi-stages in this way, selection of the image by the user can be facilitated.

Second Embodiment

Next, a second embodiment will be explained in reference to FIG. 17 and FIG. 18. Further, a constitution of the second embodiment is similar to that of the first embodiment.

According to the second embodiment, different from the first embodiment, an input by the search key 65 is not executed in taking an image by the digital still camera 1. According to the second embodiment, by subjecting the image data 62 to image analysis, the image constituting the object of search is searched.

First, it is selected whether the image forming history information 61 is analyzed or the image data 62 is analyzed in the image file 60. In the selection, a selection menu screen is displayed on the display screen 12 by depressing the select/determine button 9, selection is executed by operating the direction button 11 and the selection is executed by depressing the select/determine button 9.

Further, when the image forming history information 61 is selected to analyze, information of date and time of taking an image or the like constituting the image forming history information 61 stored to the memory card 31 is inputted as a search object. The search object can be constituted by, for example, inputting voice to the microphone 17 as the search object inputting unit.

Further, when the image data 62 is selected to analyze, the search object of classifying the image data 62 is inputted. A program for analyzing the image data 62 is previously stored to ROM 22 and CPU 21 searches the search object inputted by analyzing the image data 62 in accordance with the program. In this case, for example, "person" or "scenery" or the like is inputted as the search object. For example, when the search object is "person", a program capable of recognizing the object as a person by recognizing the person by eyes is integrated and stored to ROM 22. Further, various search objects can be searched by integrating a program for identifying color or shape. Further, in analyzing the image, the thumbnail image data 63 constituting the image data 62 may be analyzed or the actual image data 64 may be analyzed.

The digital still camera 1 is used as follows. The function selecting switch 7 of the digital still camera 1 is set to the image taking mode, the image of the object is taken by the user, and the image file 60 is formed for each image and stored to the memory card 31.

First, the power source button 8 is depressed. Next, the function selecting switch 7 of the camera is operated to set to the image searching mode. Further, when the select/determine button 9 is depressed, a screen for selecting whether the image forming history information 61 is analyzed or the image data 62 is analyzed is displayed on the liquid crystal display 28. A user selects either thereof by operating the direction button 11 and the select/determine button 9.

Further, when the image forming history information 61 is selected to analyze, the user inputs date and time of taking an image as the search object. Then, the image forming history information 61 in correspondence with the search object is searched and the image in correspondence with the search result is displayed on the liquid crystal display 28. In this way, the image can be searched by a condition stored to the image forming history information 61 of the image file 60. Further, after temporarily searching the image file 60 in correspondence with the search object, the search object of each image file 60 can be provided as the search key 65. Thereby, in searching the image at the successive time, the image file 60 can be searched by searching the search key 65 and it is not necessary to execute the image analyzing processing. Thereafter, the user can select the desired image from the image search result. In that case, selection can be carried out by depressing the select/determine button 9 as the image data selecting unit while displaying the image on the display screen 12.

Meanwhile, when the image data is selected to analyze, the user inputs identifying information for identifying the object of the image as the search object. Further, the image data 62 is analyzed, the image data 62 having the object in correspondence with the search object is searched and the image in correspondence with the search result is displayed on the liquid crystal display 28. At this occasion, the image data 62 is analyzed in accordance with a program previously stored to ROM 22. In this way, the image data 62 can be searched by analyzing the object the image of which is taken. Further, after temporarily searching the image file 60 in correspondence with the search object, the search object can be provided to each image file 60 as the search key 65. Thereby, in searching the image at the successive time, the image file 60 can be searched by searching the search key 65 and it is not necessary to execute the image analyzing processing. Thereafter, the user can select the desired image from the image of the search result. In that case, selection can be executed by depressing the select/determine button 9 as image data selecting unit while displaying the image on the display screen 12.

Figure 17:
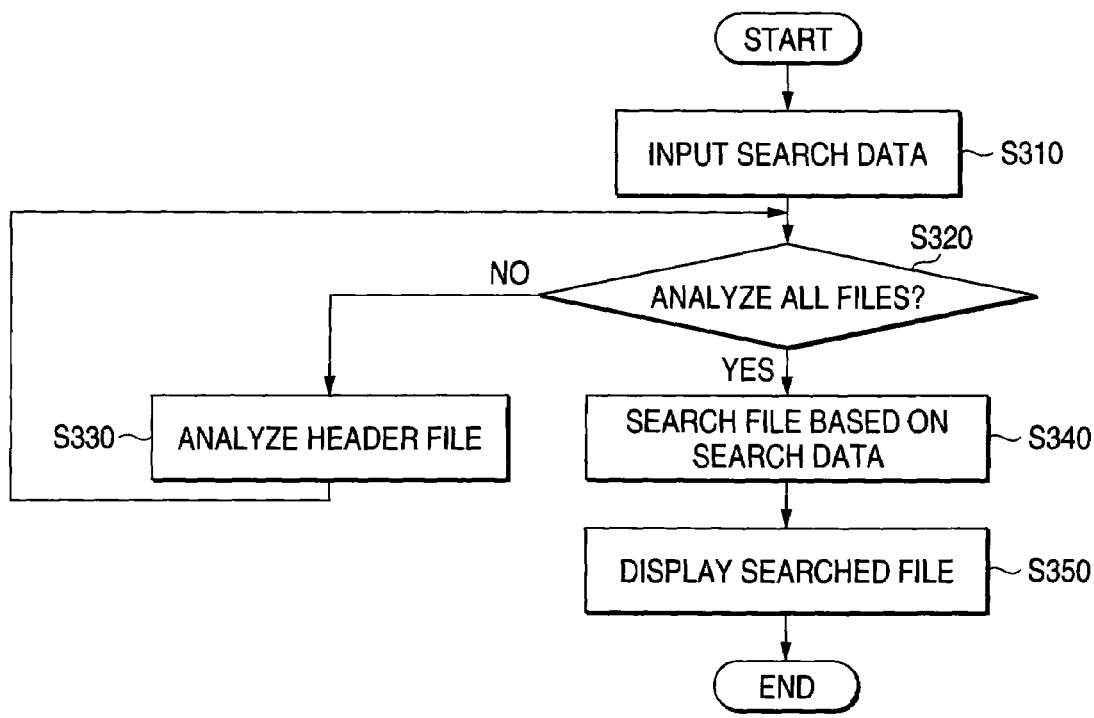
FIG. 17 is a flowchart of a processing according to the second embodiment.

FIG. 17 is a flowchart showing an image searching processing when the image forming history information 61 of the example is analyzed.

First, at S310, data of a search object to be searched is inputted. That is, in the image file 60 shown in FIG. 5, information in taking an image stored to the image forming history information 61, for example, information of date and time of taking an image, name of camera, focal length, diaphragm value, shutter speed, exposure correction value, white balance and the like is inputted.

At S320, CPU 21 determines whether all of the image files 60 stored to the memory card 31 have been analyzed. When all the image files 60 have not been analyzed, the operation proceeds to S330 and when all the image files 60 have been analyzed, the operation proceeds to S340.

At S330, CPU 21 analyzes the image forming history information 61 constituting the image file 60. Specifically, CPU 21 reads the image forming history information 61 of the image file 60 from the memory card 31 to analyze and searches information including information in correspondence with the search object. At this occasion, only the image forming history information 61 constituting the image file 60 is analyzed and the image data 62 is not analyzed. The image forming history information 61 is analyzed at S330 until all the image files 60 stored to the memory card 31 have been analyzed.

At S340, the image data 62 having information in correspondence with the search data of the image forming history information 61 analyzed at S330 is searched. At S350, CPU 21 displays an image in correspondence with a result of search searched at S340 on the display screen 12 of the liquid crystal display 28. Here, the flowchart is finished.

Figure 18:
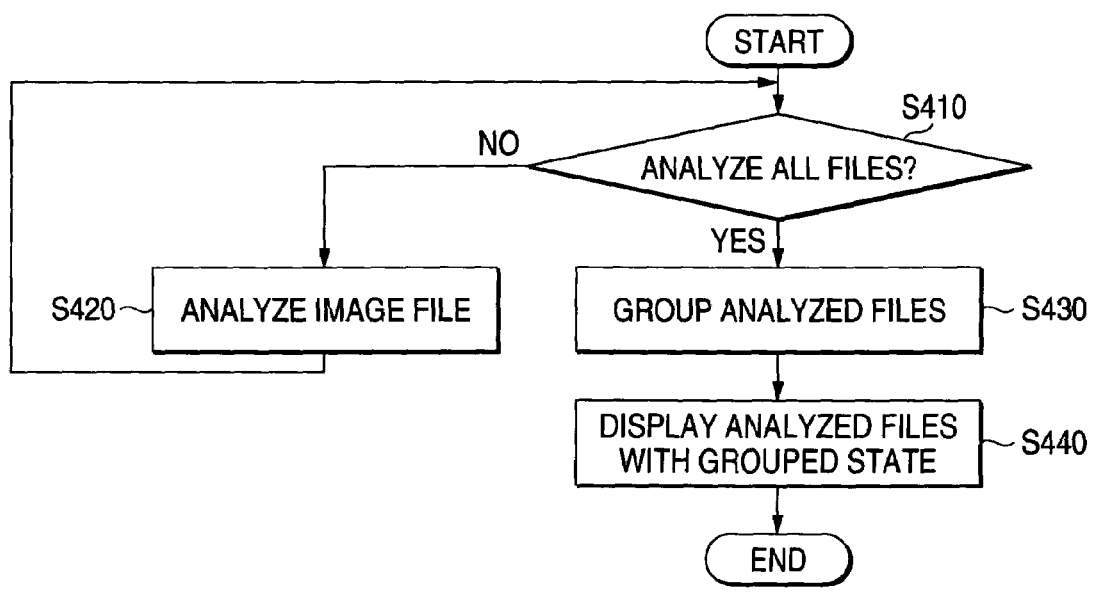
FIG. 18 is a flowchart of a processing according to a second embodiment.

FIG. 18 is a flowchart showing an image searching processing when the image data 62 of the example is analyzed.

First, at S410, CPU 21 determines whether all of the image files 60 stored to the memory card 31 have been analyzed. When all of the image files 60 have not been analyzed, the operation proceeds to S420 and when all the image files have been analyzed, the operation proceeds to S430.

At S420, CPU 21 analyzes the image data 62 constituting the image file 60. Further, either of the thumbnail image data 63 and the actual image data 64 constituting the image data 62 may be analyzed. The image data 62 is analyzed at S420 until all the image data 62 stored to the memory card 31 have been analyzed. CPU 21 analyzes the image data 62 and searches the inputted search object by the analysis result. At this occasion, the image data 62 is analyzed in accordance with a program stored to ROM 22 to determine whether the object of the image is a person or a scenery. The search object is determined by, for example, constituting a reference by the cross mark at the center of the image as shown in FIG. 14a and in accordance with how the edge amount appears centering on the cross mark. That is, the object is constituted to be able to recognize to some degree by how the edge appears in the display screen.

At S430, the image data 62 analyzes at S420 is grouped for each search object and temporarily held to RAM 23. Further, the search object is previously set by the user. Further, at S440, the image data 62 is classified for each search object and displayed on the display screen 12. In this way, the processing of the flowchart is finished.

In this embodiment, the image data is classified by analyzing the image data and the image forming history information of the image data. However, the image data may be classified based on an analyzing result obtained by analyzing voice data related to the image data.

Figure 31:
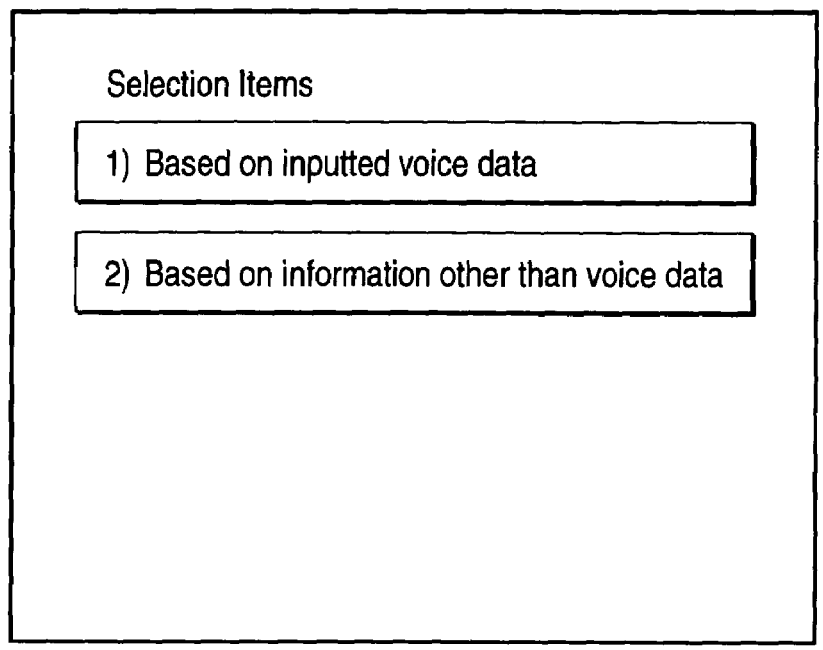
FIG. 31 is a view showing a selection item.
Figure 32:
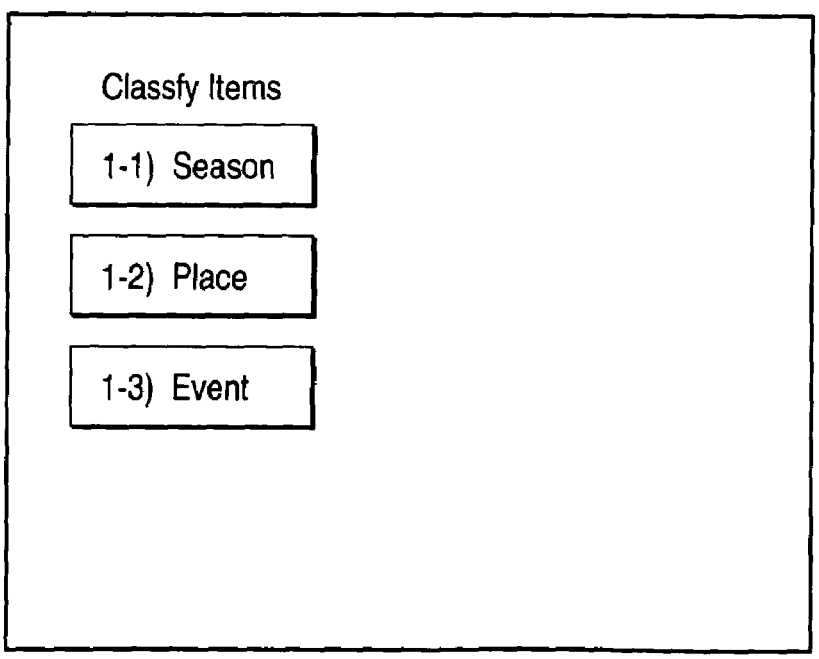
FIG. 32 is a view showing.

For example, in a selection screen shown in FIG. 31, it is configured to determine that whether the image data is searched in accordance with voice data (for example, data inputted by a user) related to the image data (selection item). A user selects at least one of items "season", "place" and "event" as shown in FIG. 32, for example. When the item "place" is selected, the voice data related to the image data is analyzed so that candidates (for example, New York, Los Angeles and so on) are listed on the selection screen. The candidates regarding the item "place" is, for example, information showing a detail of the voice data corresponding to the place, especially, a place name regarding the place.

When the place to be displayed or printed is selected from the candidates regarding the "place", a list of plurality of target image data are displayed. Furthermore, the voice data related to the image data may be searched by the items "season" and "event" so as to narrow the listed image data or information.

Even when the item "place" or the item "event" is selected, a list of the objected image data can be displayed similar to the case of the item "season". Further, in a case that the image data is searched based on the voice data in normal times, a determination of whether the image data is searched in accordance with the voice data may be omitted. Further, in a case that a selection item for selecting in normal times is set, a determining process of the selection item is omitted so that a list of image data which receives a displaying command or a printing command may be displayed.

Effects of the second embodiment will be described as follows.

(1) The search object can be searched by inputting data of the search object and analyzing the image forming history information 61 from the images stored to the memory card 31. That is, the image in correspondence with the search object can be displayed on the liquid crystal display 28 by analyzing only the image forming history information 61 of the image file 60 stored to the memory card 31 and searching information in correspondence with data of the search object. In this way, it is not necessary to execute the processing of analyzing the image data 62, the image can be searched by analyzing only the image forming history information 61 and the analyzing processing is simply executed. Further, the image can be selected after displaying the image in correspondence with the search data and even when a large amount of the image data is stored to the memory card 31, the image can be selected from the image data under a predetermined condition.

(2) The search object can be searched by analyzing the image data 62 from images stored to the memory card 31. That is, the object of the image data 62 is analyzed in accordance with a program previously stored to ROM 22 by analyzing the image data 62 of the image file 60 stored to the memory card 31. Further, the image data 62 can be grouped for each item of the search object and displayed on the liquid crystal display 28 by the analyzing result. Therefore, the image data 62 can be classified without inputting the search key 65 in taking the image. Further, thereafter, the user can select the desired image.

(3) The image forming history information 61 or the image data 62 of the image file 60 is analyzed, the image in correspondence with the search object is searched and the search object at this occasion is provided to the searched image file 60 as the search key 65. Therefore, in taking the image, even when the search key 65 is not inputted to the image file 60, the search key 65 can be provided by once analyzing the image.

Third Embodiment

Next, a third embodiment will be explained in reference to FIG. 19 through FIG. 22.

First, a constitution of a printer 201 will be explained. Further, portions of the embodiment having constitutions similar to those of the first and the second embodiments are attached with the same notations and an explanation thereof will be omitted.

Figure 21:
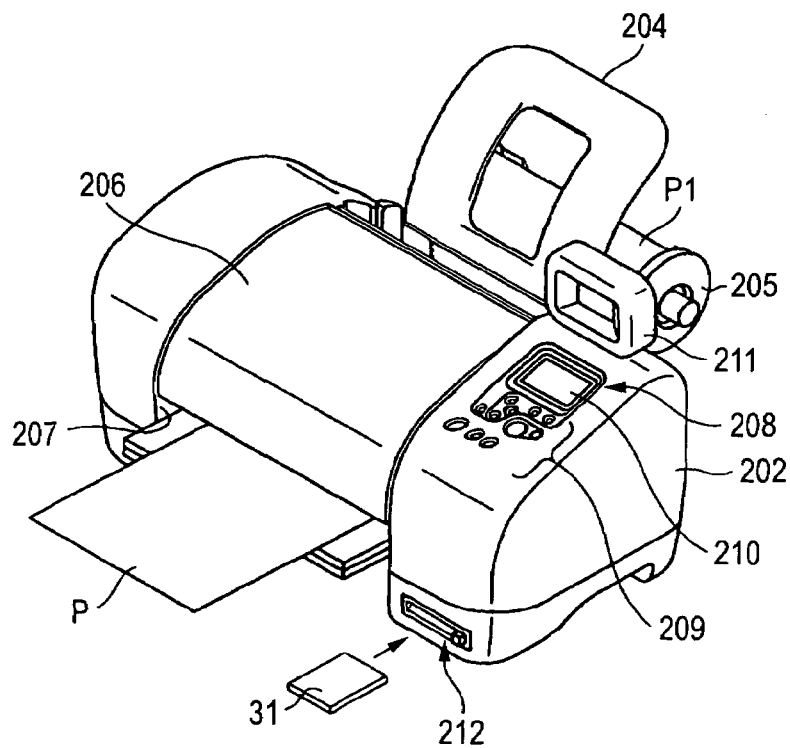
FIG. 21 is a perspective view of a printer.

FIG. 21 shows a perspective view of the printer 201 used in the embodiment. In FIG. 21, the printer 201 is an ink jet type printer, an automatic sheet feeding apparatus 203 is mounted to a rear face side of a main body 202 and the automatic sheet feeding apparatus 203 is provided with a sheet feeder 204 and a roll sheet support portion 205. The sheet feeder 204 is set with single leaf sheet (not illustrated) which is fed to inside of the main body 202. Further, the roll sheet support portion 205 is set with roll sheet P1 which is fed to inside of the main body 202. A cover 206 is provided to a center of the main body 202, a printing mechanism as printing unit is arranged at inside of the cover 206, and sheet P (single leaf sheet or roll sheet) as a print medium printed by operating the printing mechanism is discharged from a discharge port 207 at a lower portion of a front side thereof. An operation panel 208 is provided on a right side of an upper face of the main body 202. The operation panel 208 is provided with an operating portion 209 and a display screen 210. A display apparatus 211 is provided on a right upper side of the main body 202. Further, a slot 212 is provided at a lower portion on a right side of a front face of the main body 202, and by inserting the memory card 31 into the slot 212, an image based on the image data 62 read from the memory card 31 can be printed. For example, the image is printed by inserting the memory card 31 stored with the image data 62 taken by the digital still camera 1 into the slot 212. Further, the memory card 31 is stored with the image file 60 having the image forming history information 61 and the image data 62 and the search key 65 as shown in FIG. 5 for each taken image.

Figure 22:
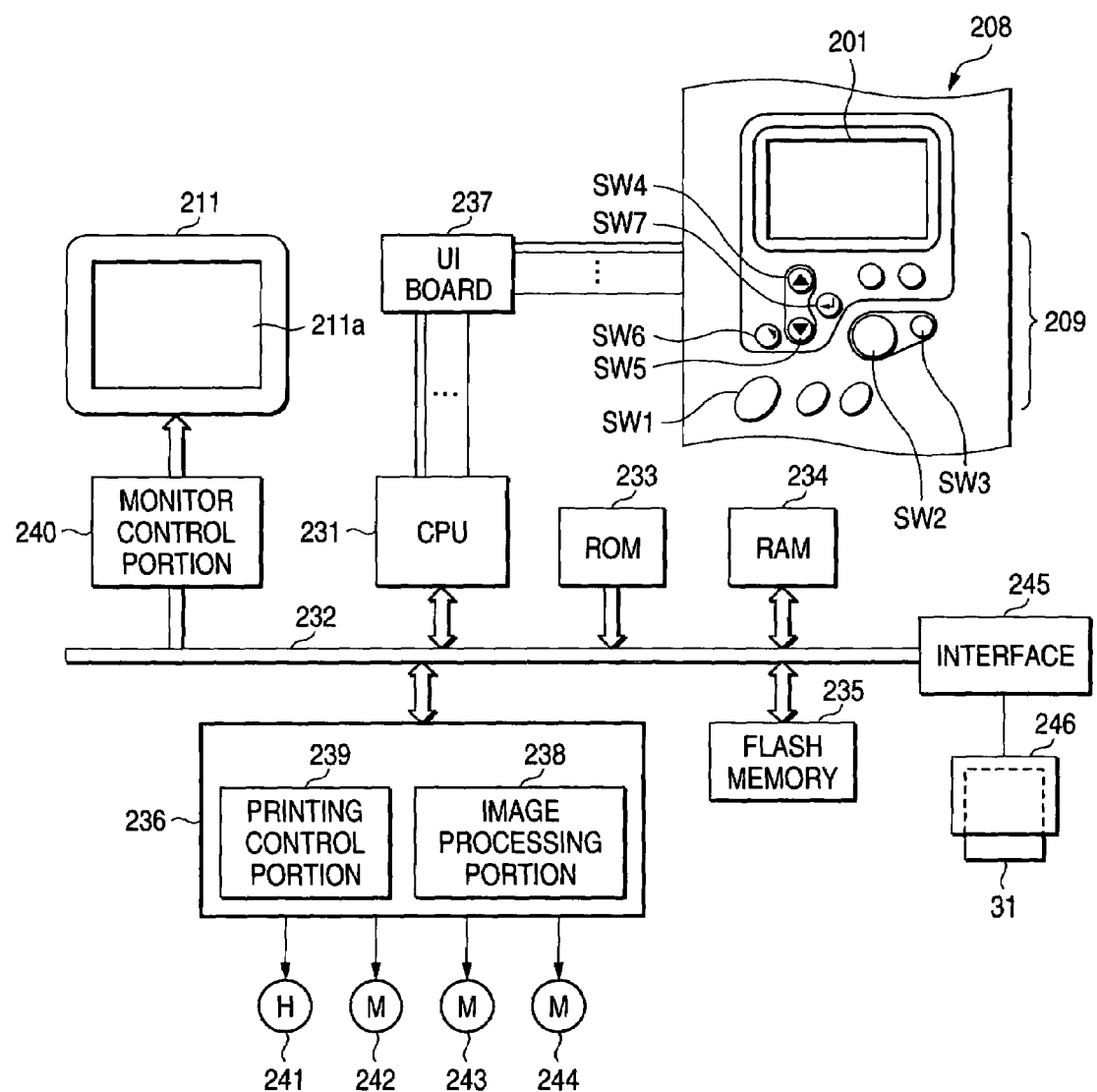
FIG. 22 is an electric constitution block diagram of the printer.

FIG. 22 shows an electric constitution block diagram of the printer 201.

The printer 201 is mounted with CPU 231, and ROM 233, RAM 234, a flash memory (EEPROM) 235, and ASIC 236 connected to CPU 231 via a bus 232. ROM 233 is stored with a control program executed by CPU 231, menu displaying data for displaying a menu screen on the display screen 210 and the like.

Here, the control program includes a program of searching a search object inputted to designate from the operation panel 208 by analyzing the image data 62. Further, the control program includes programs for an image analyzing processing and a determining processing shown in FIG. 11 through FIG. 16. Further, the printer 201 is also provided with a function of printing a search result or a determination result at a position in correspondence with an image in index printing and can execute printing shown in FIGS. 9A, 9B and FIGS. 10A, 10B even when the printer 201 is not provided with the function of forming data for printing the search result or the determination result on the side of the digital still camera 1. The flash memory 235 is stored with the image template and text data of the determination result ("person", "scenery", "OK", "NG" etc.) therefor.

RAM 234 is stored with various data formed in a printing processing procedure of converting the image data read from the memory card 31 into print data. Further, RAM 234 is temporarily stored with the image data 62 read from the memory card 31.

CPU 231 is connected to a user interface (UI) board 237 for controlling the operation panel 208 and executes a display control of the display screen 201 via the UI board 237 by executing a control program of ROM 233. Further, CPU 231 executes various processings (printing condition setting processing, maintain processing and the like) based on operating signals inputted from various operating switches, that is, a power source switch SW 1, a print start switch SW 2, a stop switch SW 3, an up switch SW 4, a down switch SW 5, a return switch SW 6 and a determine switch SW 7 and the like.

For example, CPU 231 sets various printing conditions of layout, a number of sheets of printing by connecting to determine a menu item or a lower item thereof by operating the various operating switches SW 4 through SW 7 in a menu screen of the display screen 201. For example, a plurality of sheets of preset print images can successively subjected to a preview display on a screen 211a of the display apparatus 211, and when the print start switch SW 2 is depressed after confirming the printing image on the preview screen, a printing processing based on set printing condition information is executed. Further, search data in correspondence with the search key 65 can be inputted as identifying information for identifying the image by operating the various operation switches SW 4 through SW 7 on a menu screen of the display screen 210. The search key 65 inputted from the operation panel 208 is searched from the image file 60 of the memory card 31 in accordance with a program stored to ROM 233, mentioned above.

ASIC 236 is for executing a printing control based on a control signal and print data from CPU 231 and is provided with an image processing portion 238 and a printing control portion 239 according to the example. The image processing portion 238 executes a processing of converting from RGB data to CMYK data for the image data 62 read from the memory card 31 in subjecting the image data 62 of the memory card 31 to the printing processing.

On the other hand, the printing control portion 239 executes a carriage control and a head control (ink injecting control) based on print data which the printer 201 receives from a host computer (PC), or print data converted from the image data 62 by the image processing portion 238. The printing control portion 239 is a processing circuit for controlling to drive a mechanical mechanism (printing mechanism in an ink jet printer) and is electrically connected to a record head (for example, a piezoelectric head) 241, a carriage motor 242, a sheet feeding motor 243, a roll sheet drive motor 244 and the like constituting the mechanical mechanism.

The printer 201 is provided with a monitor control portion 240 for governing a display control of the display apparatus 211 and the monitor control portion 240 is connected to the bus 232 at an input side thereof and connected to the display apparatus 211 on an output side thereof. Further, the bus 232 is connected with a reading apparatus 246 via an interface (I/F) 245.

As explained above, the image data stored to the memory card 31 can be read and the image based on the read image data 62 can be printed by inserting the memory card 31 into the slot 212. At the occasion, the user can select the image to print after designating to input the search data for searching the desired image and displaying only the image in correspondence with the search data by operating the operation panel 208.

Figure 19:
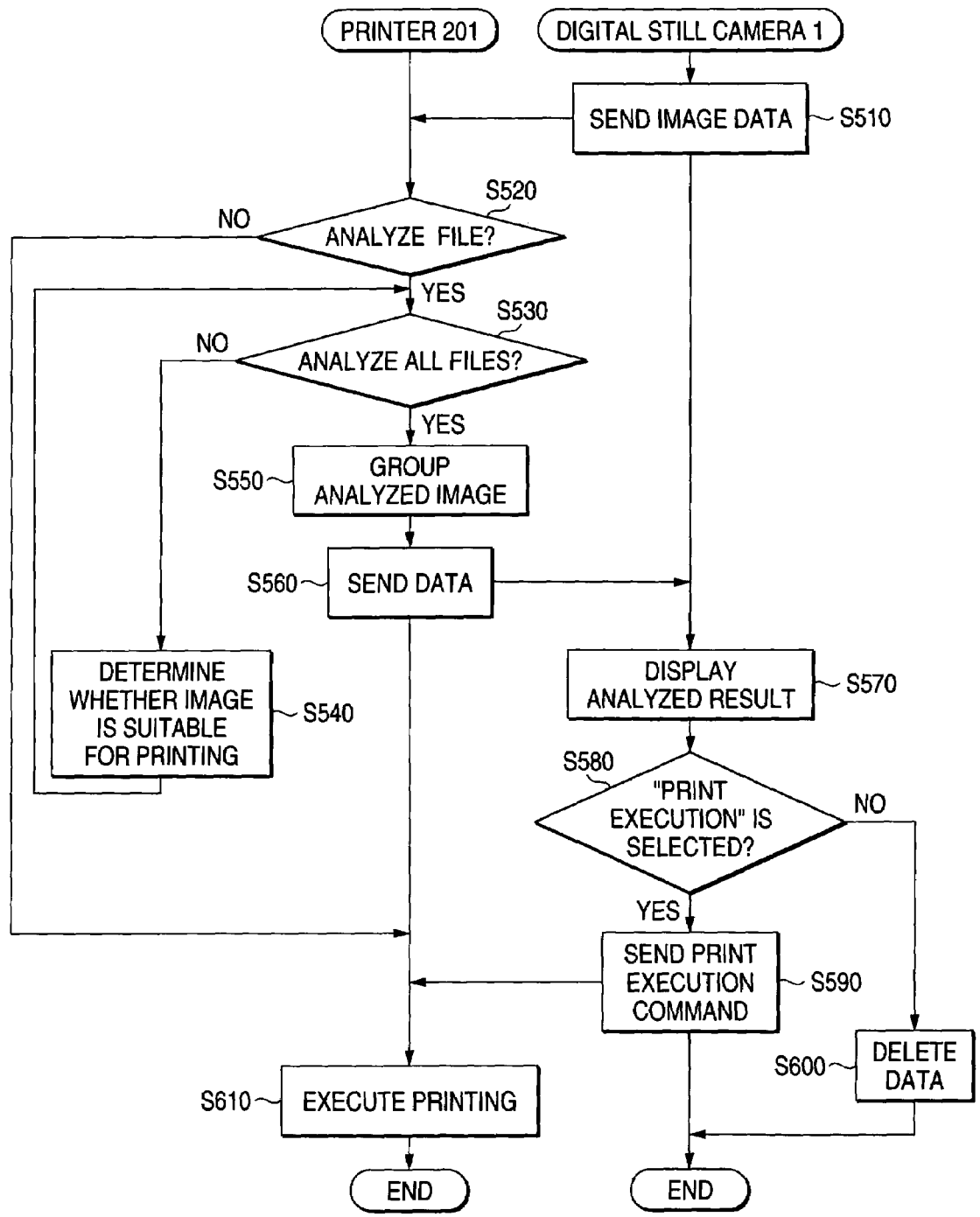
FIG. 19 is a flowchart of an image processing according to an image processing system of a third embodiment.

Next, an explanation will be given of the image processing executed by an image processing system constituted by including the printer 201 and the digital still camera 1 in reference to FIG. 19. According to the example, an explanation will be given of a case of determining whether the image is an image suitable for printing by the image processing.

According to the third embodiment, a side of the digital still camera 1 is provided with an image data holding function, an image displaying function and an image selecting function. On the other hand, a side of the printer 201 is provided with an image searching function, an image analyzing function and a print executing function.

First, at S510, CPU 21 of the digital still camera 1 reads image data 62 at inside of the memory card 31 to temporarily hold to RAM 23. Further, the data is transmitted to the printer 201 via the outside interface 27.

After transmitting the image data 62 from the digital still camera 1 to the printer 201 at S510, it is determined whether the image data 62 is subjected to image analysis on a side of the printer 201. Further, it is the actual image data 64 constituting the image data 62 which is subjected to the image analysis to determine an image quality thereof at this occasion. When the image is analyzed, the operation proceeds to S350 and when the image is not analyzed, the operation proceeds to S610.

At S530, it is determined whether all of the image data 62 transmitted from the digital still camera 1 have been analyzed. When all the image data 62 have been analyzed, the operation proceeds to S550. When all the image data 62 have not been analyzed, the operation proceeds to S540 to determine whether the image data 62 is an image which is not suitable for printing. A result of determining the image at this occasion is temporarily held to RAM 234. Thereafter, it is determined whether all the image data 62 have been analyzed again at S530. S530 and S540 are repeated until all the image data 62 have been analyzed. A determination at S540 is executed similar to the determination at S220 of the first embodiment (refer to FIG. 7).

Further, after analyzing and determining all the image data 62, the analyzed image is grouped at S550. At this occasion, the image is classified into an image suitable for printing and an image which is not suitable for printing by CPU 231. The processing is executed in accordance with a program stored to ROM 233.

Thereafter, at S560, the image data 62 classified for each determination result is transmitted from the printer 201 to the digital still camera 1. The image data 62 is received by the digital still camera 1 and an analyzing result is displayed at S570. At S570, the transmitted image data 62 is displayed on the liquid crystal display 28. Further, the operation proceeds to S580 and it is selected whether the image is to be printed by the user in a state of grouping the image data 62 to display. When "print execution" is not selected at S580, the operation proceeds to S600 and the image data 62 is erased. Further, when "print execution" is selected, the operation proceeds to S590 and print execution instruction with regard to the image data 62 is transmitted to the printer 201. Here, the processing of the flowchart on the side of the digital still camera is finished.

Further, printing is executed at S610 by the print execution instruction from the digital still camera 1. Thereby, printing of the image selected by the user is executed. Here, the processing of the flowchart on the side of the printer 201 is finished.

As has been explained above, when the image data is transmitted from the digital still camera 1 to the printer 201, the printer 201 receives the image data. Next, the image data 62 is analyzed to determine the image quality and determination information data is transmitted to the digital still camera 1. The digital still camera 1 receives information from the printer 201. Further, the result determined by the side of the printer 201 is displayed along with the analyzing result on the liquid crystal display 28 of the digital still camera 1. After confirming the analyzing result, the image is selected by the user and the print execution instruction of the selected image is transmitted from the digital still camera 1 to the printer 201. The printer 201 receives the print execution instruction to print out in accordance with the received information.

In this way, the functions of image analysis, image search, image selection, image determination and image output can be allotted to the side of the digital still camera 1 and the side of the printer 201.

The image processing system constituted as described above is used as follows.

The function selection switch 7 of the digital still camera 1 is set to the image confirming mode and the power source button 8 is depressed. Next, the select/determine button 9 is depressed to select to determine to transmit the image. Then, the image data 62 is transmitted to the side of the printer 201. The transmitted image data 62 is automatically analyzed on the side of the printer 201. Further, when all of the transmitted image data 62 have been finished to analyze, the image data 62 is grouped for each determination result and transmitted to the side of the digital still camera 1 as determination result data. When the determination result data is received, the image is displayed on the liquid crystal display 28 along with the determination result. Based on the result, the user selects the image to execute printing and transmits the image data 62 to the printer as the print execution instruction. The printer 201 receives the instruction to execute printing. In this way, the desired image can be printed.

Effects of the third embodiment will be described as follows.

(1) Even when the digital still camera 1 is not provided with the functions of image analysis and image determination, the functions are provided to the side of the printer 201, the image processing can be executed on the side of the printer 201 and the image data 62 classified for each determination result by analyzing the image can be informed to the side of the digital still camera 1. Therefore, a user can select whether the image is to be printed on the side of the digital still camera 1.

(2) Even when image processing unit are dispersed to the digital still camera 1 and the printer 201, by communicatably connecting the two apparatus, a series of image processings can be executed without being summarized to a single apparatus. Therefore, in comparison with the constitution of summarizing a number of the functions to the single apparatus, for example, cost of the digital still camera 1 or the printer 201 can be restrained inexpensively.

(3) According to the image processing system of the embodiment, it can be selected whether the image analysis is executed prior to printing. Since a load of the image analyzing processing is considerable, by dispensing with the image analysis when not needed, the printing processing can be accelerated.

Fourth Embodiment

Next, an explanation will be given of a fourth embodiment according to the invention in reference to FIG. 23 through FIG. 26 as follows. A configuration of the fourth embodiment is similar to that of the first embodiment.

In the fourth embodiment, the image analyzing explained in the first embodiment is further explain in detail by using an another example. The fourth embodiment is different from the first embodiment in that when an image is taken by the digital still camera 1, an input of the search key 65 is not carried out. In the fourth embodiment, when it is determined that the image has out of focus, single color or movement of the hand, user is inquired whether a correction of the image is carried out.

According to the embodiment, when a user displays an image selected by operating the operating portion 24 on the display screen 12, it is determined whether the image data constituting an object of the display is provided with an image quality suitable for printing by using an image analyzing technology. In an image analyzing processing, it is analyzed whether there is out of focus, single color or movement of the hand in the image. The image is displayed on the display screen 12 by attaching a determination result of determining whether the image quality is an image quality suitable for printing from a result of analyzing the image. The determination result is informed to the user by displaying the determination result on the display screen 12 along with the image in this way. In addition, the data construction of the image file 60 as shown in FIG. 5 may not include the search key 64.

Figure 23:
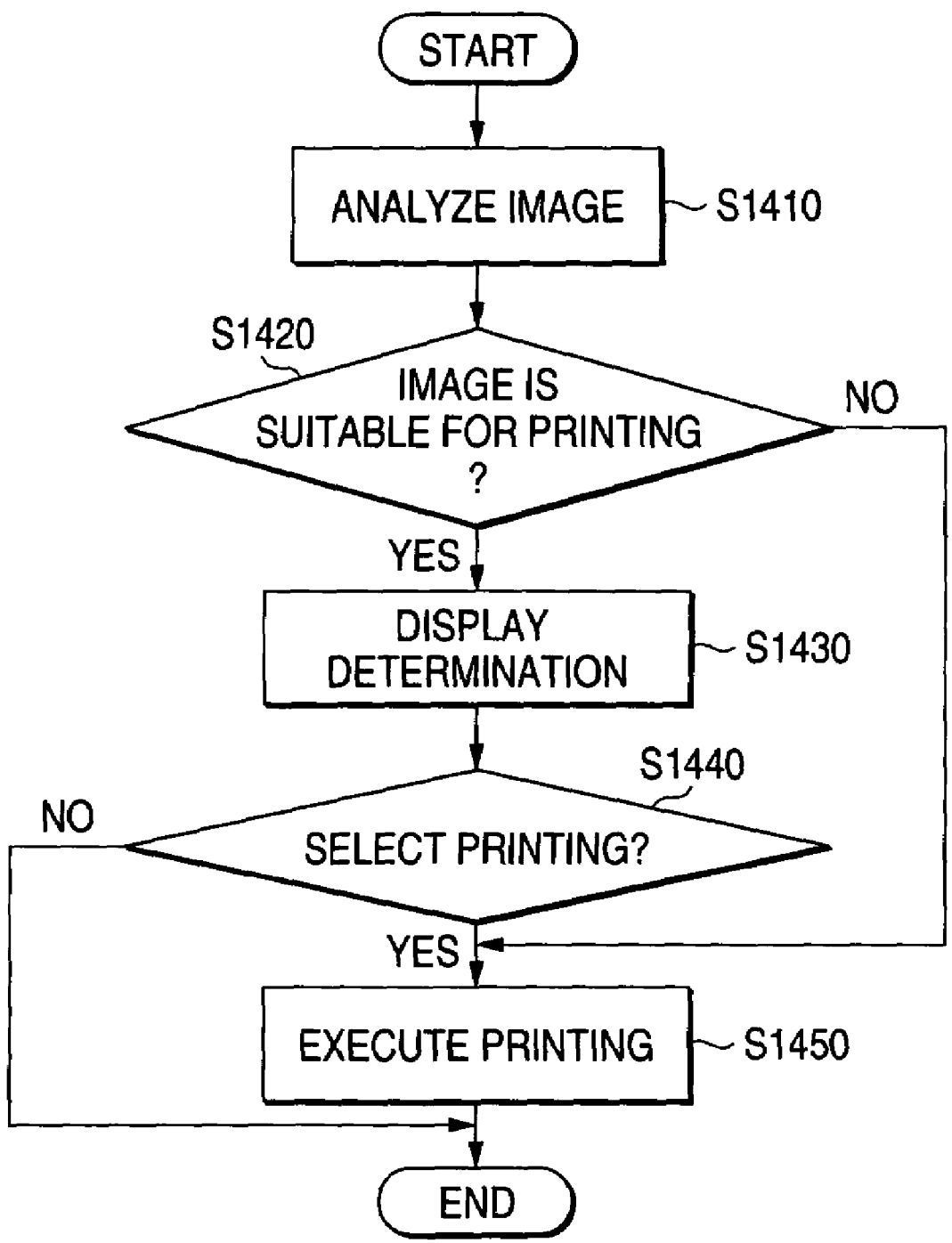
FIG. 23 is a flowchart of an image processing according to the first embodiment.
Figure 24:
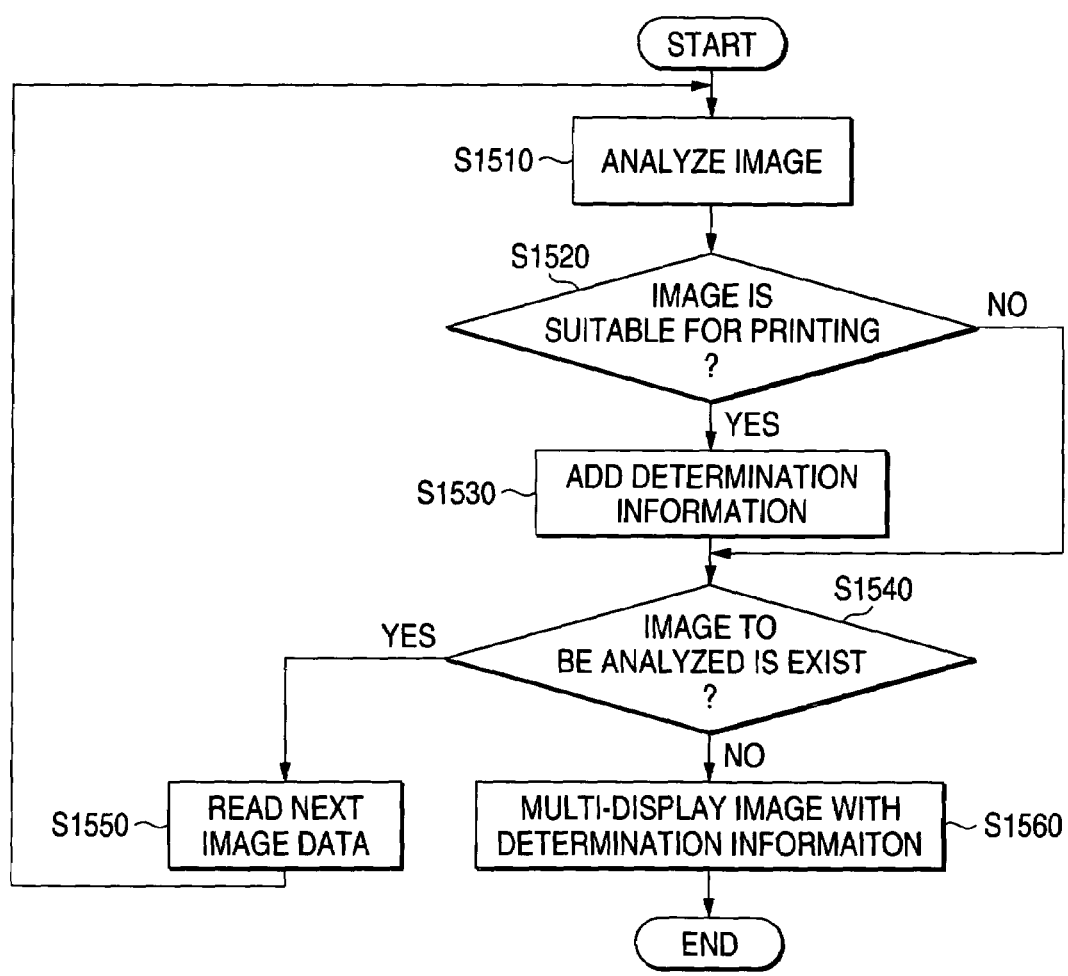
FIG. 24 is a flowchart of an image analyzing and determining processing in the case of multi image display.

FIG. 23 is a flowchart showing a processing content for analyzing and determining whether an image selected in "single image display" is provided with an image quality suitable for printing, and FIG. 24 is a flowchart showing a processing content of analyzing and determining whether the image is suitable for printing with regard to individuals of a plurality of images selected in "multi image display". Program data for processings of analyzing and determining the image shown in the flowcharts are stored to ROM 22. Further, ROM 22 is stored with data of a screen template for displaying a determination result in correspondence with the image in "single image display" and "multi image display", and character information prepared for integrating to the screen template as a display of the determination result, for example, text data of "out of focus", "single color", "movement of the hand", "OK", "NG" and the like.

When the image is displayed on the display screen 12, operation is executed as follows. First, an image confirming mode is set by the function selecting switch 7 of the digital still camera 1. Next, when the power source button 8 is depressed, the image is displayed on the liquid crystal display 28. At this occasion, in setting a default, as the image, an image taken most recently is displayed in single. When an image taken successively is intended to confirm by multi image, the select/determine button 9 is depressed. Then, an image display switch mode is displayed on the liquid crystal display 28. It is selected whether the image is in single or multi by the direction button 11 and is determined by the select/determine button 9. When the image is displayed by a single mode, images displayed are switched sheet by sheet by depressing the direction button 11.

Meanwhile, in the case in which the image is displayed in multi mode, when an image displayed in the liquid crystal display 28 is selected by the direction button 11 and the direction button 11 is operated in a direction of capable of proceeding successively from a first image or a final image displayed, a successive multi image is displayed.

When the image data is transmitted from the digital still camera 1 to the printer 201 and the image is printed, operation is executed as follows. When an image analyzing mode is set, in operating to transmit the image data, first, it can be determined whether the image is provided with the image quality suitable for printing by subjecting the image data to an image analyzing processing prior to transmitting the selected image data. In order to set the image analyzing mode, first, when the select/determine button 9 is depressed, various commands are displayed on the liquid crystal display 28. Next, an image analyzing command is selected by the direction button 11 and the select/determine button 9 is depressed. Further, in the case of single image display, when an image intended to print is displayed, the select/determine button 9 is depressed in order to execute printing. In the case of multi image display, an image intended to print is selected by the direction button 11 and the select/determine button 9 is depressed. Operation of transmitting and printing the image is executed in this way. Further, according to the embodiment, the select/determine button 9 operated in transmitting the image data constitutes a transmission operating portion.

Explaining a flow of operating to select at inside of the digital still camera 1, first, the image data is read from the memory card 31 and is temporarily held in RAM 23 at inside of the control circuit 20. Next, the image data is transmitted from RAM 23 to the liquid crystal display 28 to display the image. By reading to execute an application program previously recorded to ROM 22 at inside of the control circuit 20 by CPU 21 along with a display of the image, a command or the like of selecting presence or absence for execution of the image analyzing processing is displayed on the display screen 12. Input of an operating signal constituted by operating the operating portion 24 is awaited for and when the operating signal is inputted, it is determined whether an image analysis is to be executed by a kind of the signal. Further, when the operating signal is the signal of setting an image analyzing mode, the image analyzing mode is set. The series of flow is executed by CPU 21 at inside of the control circuit 20.

In a state of setting the image analyzing mode in this way, when the select/determine button 9 instructing to transmit the image data is operated by the user and the operated signal is inputted, CPU 21 executes a program for an image analyzing and determining processing shown in a flowchart of FIG. 23. An explanation will be given of a processing executed by executing the program by CPU 21 in reference to FIG. 23.

First, at S1410, an image analysis is executed. That is, in the case of single image display, the image data of the image displayed on the display screen 12 is inputted, meanwhile, in the case of multi image display, the actual image data 64 of the selected image is read from the memory card 31, and a degree of the image quality is analyzed by subjecting the acquired image data to the image analyzing processing. The image analyzing processing is provided with an analyzing content capable of determining an image quality of out of focus, single color, movement of the hand or the like. Further, details of a method of the image analysis will be described later.

At S1420, it is determined whether the image quality is an image quality which is not suitable for printing. In details, it is determined whether the image is out of focus, single color or movement of the hand. When the image is out of focus, single color or movement of the hand, the operation proceeds to S1430, and proceeds to S1450 otherwise. Further, a description will be given later of a determining processing method as S1420.

At S1430, the determination result at S1420 is displayed. CPU 21 temporarily holds data of the determination result to RAM 23, reads the template stored to inside of ROM 22 and allocates the image and text data (for example, "NG") of the determination result to display in corresponding positional relationship. Further, CPU 21 displays the image and the determination result on the display screen 12 of the liquid crystal display 28 by layout allocated to the respectively corresponding positional relationship based on the display data allocated with the image and text of the determination result on the template.

Figure 25A:
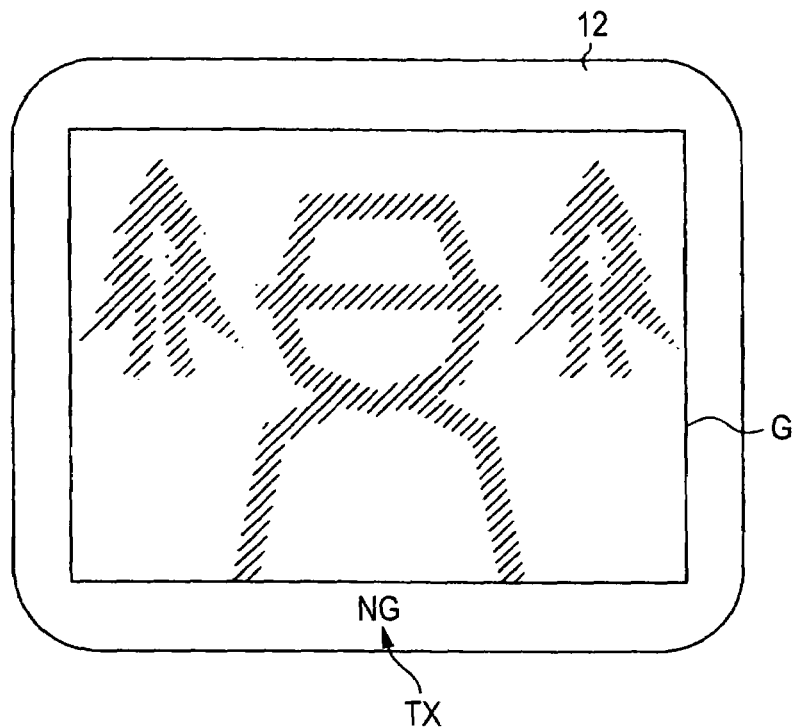
FIGS. 25A and 25B are views of display screens of the digital still camera showing an example of displaying an image determination.

When, for example, the image corresponds to out of focus, single color or movement of the hand as shown in FIG. 25A, the image G is displayed on the display screen 12 and text of the determination result of, for example, "NG" showing an image quality which is not suitable for printing is displayed on a lower side thereof. Naturally, in displaying the determination, in place of "NG", a determination content of "out of focus", "single color" or "movement of the hand" determined by analyzing the image may be displayed by character information. In the screen of displaying the determination result, text of urging the user to instruct whether the image is to be printed by operating the button is displayed. For example, "printing is to be executed?" is displayed. The user depresses the select/determine button 9 when printing is executed and depresses the return button 10 when printing is not executed.

At S1440, it is determined whether printing is executed. That is, when the select/determine button 9 is depressed, the operation proceeds to S1450, on the other hand, when the return button 10 is depressed, the processing of the flowchart is finished.

At S1450, printing is executed. That is, the selected image data is transmitted to the printer 201. As a result, the printer 201 receives the image data, subjects the image data to the predetermined processing to convert into print data and drives to control a printing mechanism based on the print data to thereby print the image based on the image data received from the digital still camera 1 on a sheet.

Further, the digital still camera 1 is also provided with the function of determining whether a plurality of images displayed on the display screen 12 are provided with an image quality suitable for printing when a plurality of images are displayed on the display screen 12 by multi image display. As one method, an image analyzing mode is previously set by operating the operating portion 24 and a plurality of images are displayed by multi display by operating the operating portion 24 in the state of the image analyzing mode. As other method, a plurality of images are displayed by multi display by operating the operating portion 24. At this occasion, at the same time, a selecting screen of asking whether the image is to be analyzed is displayed and therefore, execution of the image analysis is selected by operating the select/determine button 9. In the case of multi image display, thumbnail image data of respective images are read from the memory card 31 to display on the display screen 12 of the liquid crystal display 28 by multi display. When instruction of displaying multi image is received in the former method, or when instruction of executing the image analysis is received in the latter method, CPU 21 executes the program for analyzing and determining the image shown in the flowchart of FIG. 24 is executed by a chance of inputting the instructed operating signal in either of the methods.

At S1510, an image analysis is executed. Owing to a multi image display, the actual image data 64 of the selected image is read from the memory card 31 and a degree of an image quality in analyzed by subjecting the acquired image data to an image analyzing processing. The image analyzing processing is constituted by an analyzing content capable of determining the image quality of out of focus, single color, movement of the hand or the like and details of a method of analyzing the image will be described later.

At S1520, it is determined whether the image quality is an image quality which is not suitable for printing. In details, it is determined whether the image quality is an image quality of out of focus, single color or movement of the hand. When the image quality is the image quality of out of focus, single color or movement of the hand, the operation proceeds to S230, otherwise, the operation proceeds to S1540.

At S1530, determination information is added. Here, CPU 21 temporarily holds determination information that the image quality is an image quality which is not suitable for printing to RAM 23 similar to the processing of S1530 in FIG. 23. A series of flow heretofore is substantially similar to that of processings of S1410 through S1430 in the flowchart of FIG. 23.

At S1540, it is determined whether there is the image to be analyzed successively. When there is image data to be analyzed, the operation proceeds to S1550 and when there is not the image to be analyzed, the operation proceeds to S1560.

At S1550, the successive image data is read. After reading the successive image data, the operation returns to S210 to proceed to the image analyzing processing of the successive image. The processings of S1510 through S1540 are repeatedly executed until finishing to analyze all the images of the plurality of image data in this way, and the operation proceeds to S1560 when it is determined that there is not the image to be analyzed successively at S1540.

At S1560, the plurality of images are displayed by multi display by adding determination information. Here, the plurality of image data (thumbnail image data) are read from the memory card 31 and the determination result (determination information data) from RAM 23. Further, the template is read from ROM 22 and the image and the text data (for example, "NG") of the determination information are allocated to display in the corresponding positional relationship by using the template. Further, CPU 21 displays the plurality of images and the determination result on the display screen 12 of the liquid crystal display 28 by a layout allocating the plurality of images and the determination result in the respectively corresponding positional relationship based on the display data allocated to the respective images and the text of determination result on the template.

Figure 25B:
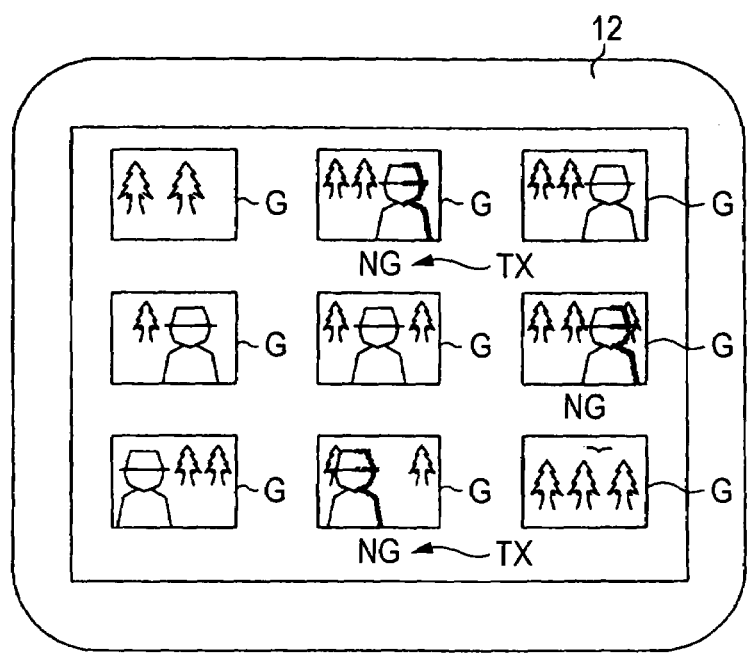

As shown in FIG. 25B, the plurality of images are displayed on, for example, the display screen 12 by multi display and the images in correspondence with, for example, out of focus, single color or movement of the hand are displayed with text TX of the determination result of, for example, "NG" showing that the image quality is an image quality which is not suitable for printing on the lower side. Naturally, in displaying the determination, in place of "NG", a determination content of "out of focus", "single color" or "movement of the hand" or the like determined by analyzing the image may be displayed by character information. The processing of the flowchart is finished in this way. A user can determine whether the plurality of images is to be printed in reference to the determination result of the images displayed in multi display. Further, also when a plurality of images are operated to transmit to the printer 201 to print, prior to transmission, processings similar to those of the flowchart are executed and when it is determined to include the image data which is constituted by the image quality which is not suitable for printing, the user is alarmed with regard to whether the plurality of images are to be printed by showing the determination information on the display screen 12.

Figures 26A, 26B:
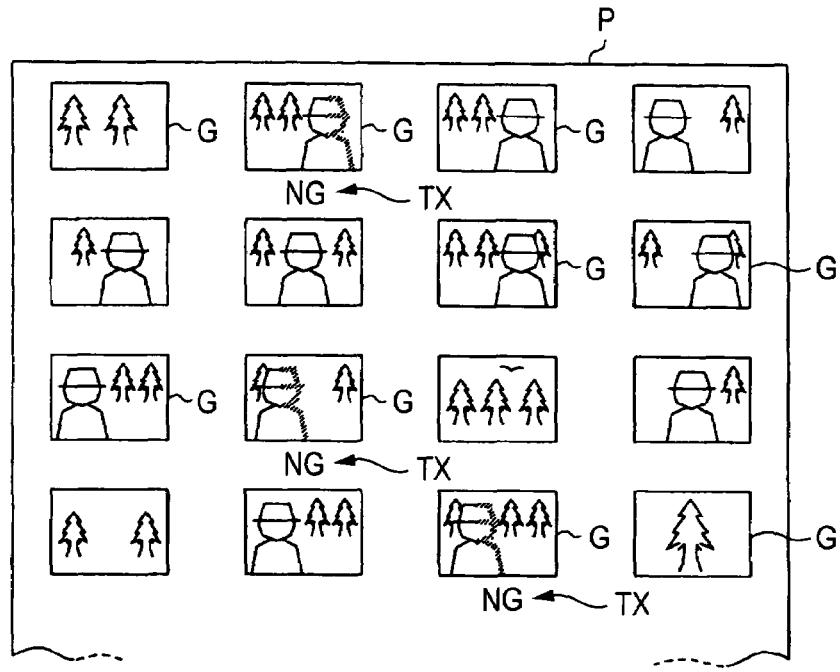
FIGS. 26A and 26B are views of display screens of the digital still camera showing the result of outputting image determination information.

Further, the digital still camera 1 of the embodiment is provided with a function of subjecting a plurality of image data constituting an object of printing to the image analysis when index printing is instructed to the printer 201 and printing the determination result in correspondence with the images. When the index printing is designated and operated to transmit, the processing of the flowchart shown in FIG. 24 is executed and the determination information data is transmitted to the printer 201 along with the image data. At this occasion, also the layout information is transmitted along therewith and as shown in FIG. 26A, the printer 201 allocates the plurality of images G to the layout of index printing to print and prints text TX of determination information of, for example, "NG" to the lower sides to correspond to the respective image G. Naturally, in displaying the determination, in place of "NG", a determination content of "out of focus", "single color" or "movement of the hand" determined by analyzing the image may be displayed by character information.

Although the result of analyzing the image can be confirmed also in the display screen 12 of the liquid crystal display 28 of the digital still camera 1, when it is intended to confirm presence or absence of the image which is not suitable for printing and which image is not suitable for printing after temporarily printing all the images by the index printing, the result is temporarily printed out. When it is intended to confirm a large number of sheets of the images at the digital still camera, the liquid crystal display 28 needs to use for a long period of time and a battery of the digital still camera 1 is considerably consumed. In that case, the image can be confirmed and the battery can be saved by temporarily printing out the image.

Further, only the image determination result can be printed out as shown in FIG. 26B. By switching the mode, as shown in the drawing, only bibliographic information K and the text TX of the determination result are outputted to the sheet P. The bibliographic information K is formed by reading information of a header of the image file 60, the determination information is added thereto and the data is transmitted to the printer 201 along with layout information of a list style. In comparison with the index printing of FIG. 26A, processings of printing are simplified and the function is used when the result is intended to know swiftly. There is a picture number PN in the bibliographic information and therefore, the image which is not suitable for printing can readily be known from the picture number.

Figure 30:
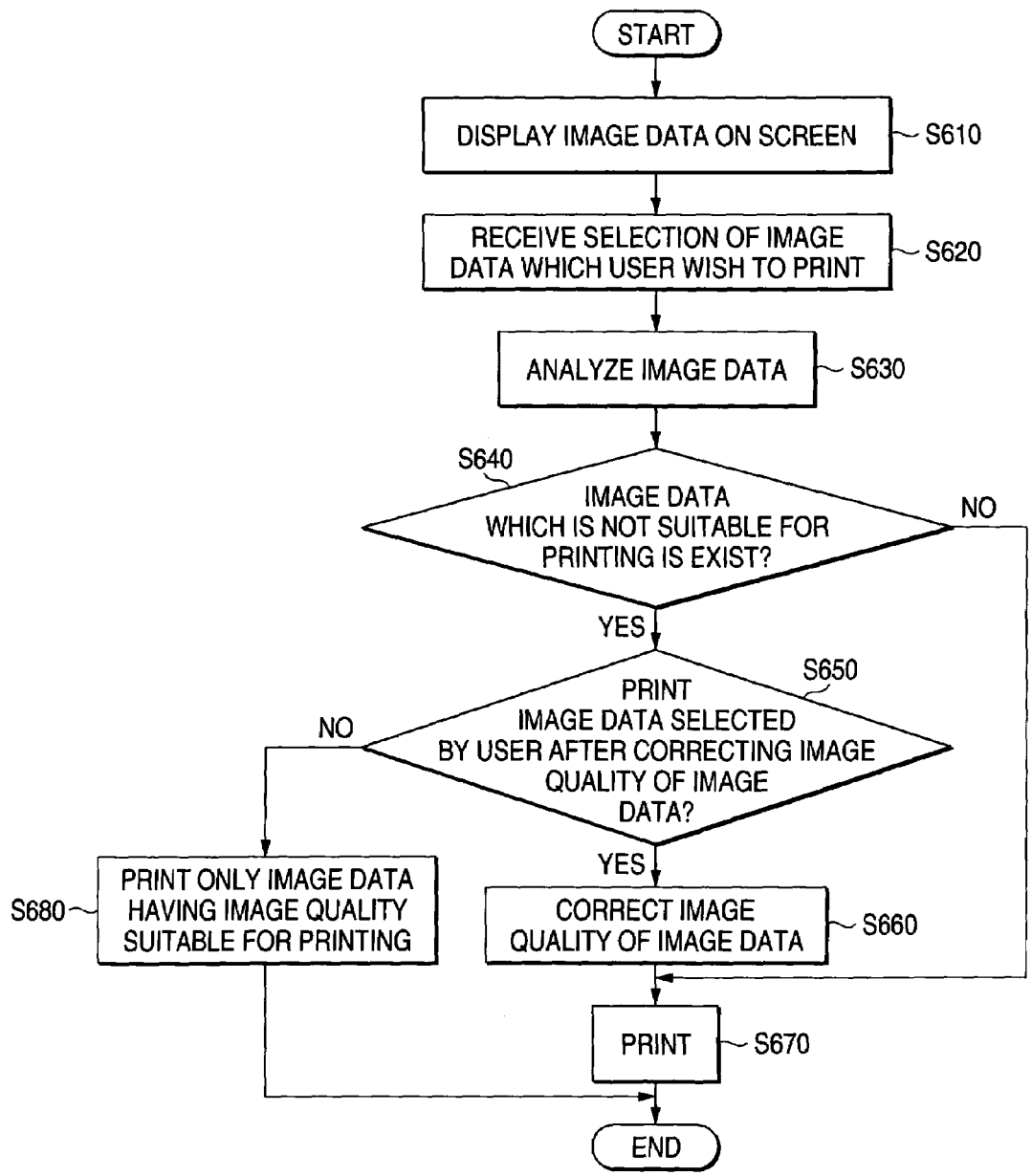
FIG. 30 is a flowchart showing a correction processing of an image.

Further, when it is determined that the image data is not suitable for printing at S1420 of FIG. 23 and S1520 of FIG. 24, the image data may be corrected by using a known correction technique, for example, level correction, tone curve, hue, chromaticness. For example, when it is determined that the image data is not suitable for printing, the image data may be printed after correcting the image quality of the image data. Also, when it is determined that the image data is not suitable for printing, it is inquired to user that whether the user wish to correct the image data which is determined as image data having an image quality being not suitable for printing. Here, one example of a correcting processing of the image quality of the image data will be explained with reference to FIG. 30.

First, an image selected by the user through the operation portion 24 is displayed on the display screen 12 (the display screen is not limited to a multi image display or a single image display) at S610. At S620, a selection of image data by user is received. At S630, an image analyze regarding the selected image data is curried out to determine that whether the selected image data is suitable for printing. In this image analyze processing, the image quality such as out of focus, single color or movement of the hand is determined. At S640, it is determined that whether the image data which is not suitable for printing is exist. When the image data having a low image quality by out of focus, single color or movement of the hand is exist, the process proceeds to S650, otherwise, it proceeds to S670.

At S670, the image data is printed. On the other hand, at S650, it is inquired to user to print the image data selected by the user after correcting the image quality of the imaged data. When the user select to print the image after correcting the image quality of the imaged data, the process proceeds to S670, otherwise, it proceeds to S680.

At S680, only the image data suitable for printing is printed.

Since image analyzing proceedings at S1410 and S1420 of the flowchart shown in FIG. 23 and S1510 and S1520 of the flowchart shown in FIG. 24 are similar to the image analyzing proceedings at S220 of the flowchart shown in FIG. 7 in the first embodiment, the explanation of the proceedings is omitted. The image analyzing proceeding has an image analyzing method based on sharpness characteristic, an image analyzing method based on brightness characteristic, and an image analyzing method based on hand movement characteristic.

Further, when a plurality of images are analyzed simultaneously, the mode is switched to a mode of displaying images on the liquid crystal display 28 by multi display. Next, when the select/determine button 9 is depressed, all of the images displayed on the liquid crystal display 28 are subjected to image analysis. When the image analysis and image determination are finished, as shown in FIG. 25B, the determination result is shown along with the images in the images. A user can select an image intended to print based on the result.

Effects of the fourth embodiment will be described as follows.

(1) The image analyzing function and the image determining function are also provided to a small monitor (liquid crystal display 28) provided to the digital still camera 1 and the user can further accurately determine whether outputting of printing or the like is to be executed.

(2) By enabling the user to select whether the determined image is to be executed to print, only a desired image can be executed to print. Therefore, by dispensing with wasteful printing, consumption of sheet can be restrained and a time period required for printing can be reduced.

(3) In displaying multi images or printing a plurality of images (for example, index printing), the respective images are analyzed and determined and displayed by adding a determination result and therefore, by continuously analyzing and determining a plurality of images, the images can be determined in a short period of time. Further, the determination result is displayed in correspondence with the plurality of images displayed on the display screen 12 and therefore, operation of confirming the determination result and selection of the image can be executed in a short period of time.

(4) When a plurality of images are printed, the determination result is printed in correspondence with the printed images and therefore, it is not necessary to confirm the determination result by the display screen 12 by taking time, and power consumed by the battery of the digital still camera 1 can be saved.

Fifth Embodiment

A fifth embodiment will be explained in reference to FIG. 27 as follows.

Further, a constitution of the fifth embodiment is similar to that of the first embodiment. According to the embodiment, when the shutter button 5 is depressed, the user is informed of a determination result of the image quality by subjecting taken image data thereof to image analysis such that it can be determined whether the taken image data is to be held.

Figure 27:
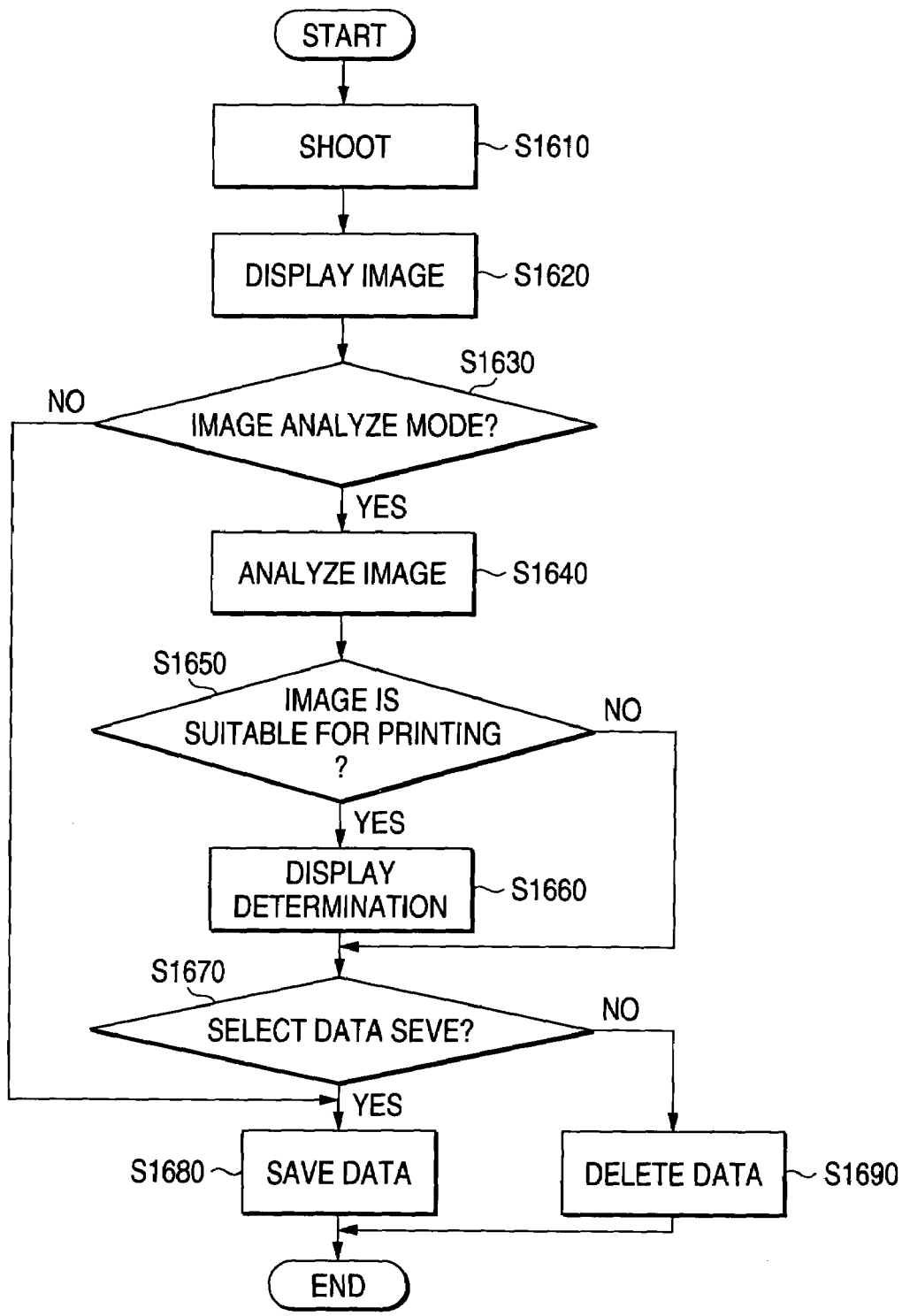
FIG. 27 is a flowchart of an image processing according to a second embodiment.

FIG. 27 is a flowchart showing a processing of determining and informing an image of the example.

First, at S1610, taking an image is executed when a depressing signal of depressing the shutter button 5 of the digital still camera 1 is inputted.

At S1620, the taken image is displayed on the liquid crystal display 28.

At S1630, it is determined whether an image analyzing mode is set. That is, when the image is analyzed, the user selects the image analyzing mode by previously operating the operating portion 24 and therefore, it is determined whether the mode is the image analyzing mode. When the mode is the image analyzing mode, the operation proceeds to S1640 and when the mode is other mode, the operation proceeds to S1680.

At S1640, the image analysis is executed for the image data provided by taking the image. A method of analyzing the image is similar to the content described in the first embodiment.

At S1650, it is determined whether the image quality is an image quality which is not suitable for printing. That is, it is determined whether the analyzed image is an image out of focus, a single color image or a hand movement image. In the case of out of focus, single color or movement of the hand, the operation proceeds to S1660 and proceeds to S1670 otherwise.

At, S1660, a determination result of determining image quality based on a result of analyzing the image is displayed on the display screen 12 of the liquid crystal display 28. At S1670, it is determined whether the image data is to be held by the result of determining the image at S1660. That is, the user instructs whether the image data is to be held by operating the operating portion 24 and therefore, it is determined whether the image data is to be held in accordance with the instruction. When the image data is to be held, the operation proceeds to S1680 and proceeds to S1690 otherwise.

At S1680, a taken image data is held in the memory card 31 and the processing of the flowchart is finished.

At S1690, the image data temporarily stored to RAM 23 is erased and processing of the flowchart is finished.

The digital still camera 1 constituted as described above is used as follows.

First, the power source button 8 is depressed. Next, the function selecting switch 7 of the camera is operated to set to an image taking/image analyzing mode. Next, a screen of selecting whether the image is to be analyzed is displayed on the liquid crystal display 28. "Yes" is selected by operating the direction button 11 and the select/determine button 9. The image analyzing mode is set in this way. Next, the user takes an image of the desired object by depressing the shutter button 5. The taken image is displayed on the liquid crystal display 28. Substantially simultaneously therewith, the image is started to analyze and when the image is finished to analyze and determine, the image and the determination result is displayed as shown in FIG. 25A. The user determines whether printing is to be executed based on the determination result.

Effects of the fifth embodiment will be described as follows.

(5) By immediately analyzing the taken image to determine to display, the user can determine whether the image is normal or abnormal immediately after taking the image. Further, by providing the function, when the image is abnormal, the image can immediately be retaken and therefore, a failure in taking the image can be reduced. Further, also an image quality which cannot be determined by only taking a look at the image by, for example, the display screen 12 can also be determined and therefore, the second embodiment can also be used in taking an image when the user intends to absolutely hold a normal image. Further, a capacity of the memory card 31 can be saved by enabling to hold only an image which has been able to take normally at the memory card 31.

Sixth Embodiment

Next, a sixth embodiment will be explained in reference to FIG. 20 through FIG. 22, FIGS. 28 and 29.

According to the sixth embodiment, the ink jet type printer 201 is used similar to the third embodiment. Therefore, a constitution of the printer is same as that of the printer 201 explained in the third embodiment.

Figure 28:
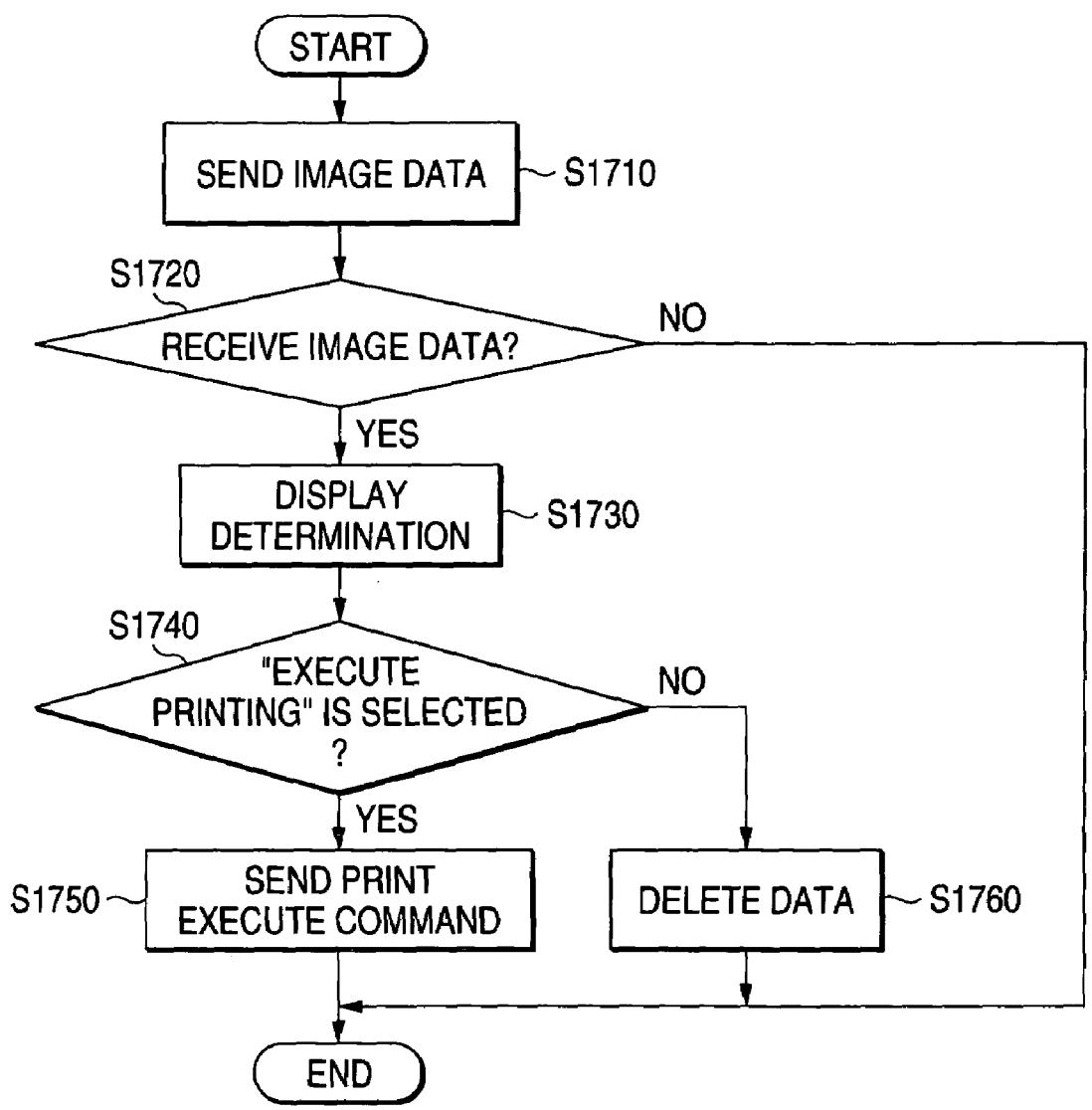
FIG. 28 is a flowchart showing an image processing on a side of a digital still camera according to a third embodiment.

FIG. 28 shows a flowchart on a side of the digital still camera 1 according to the embodiment.

First, at S1710, the image data at inside of the memory card 31 of the digital still camera 1 is read to temporarily hold to RAM 23. The data is transmitted to the printer 201 via the outside interface 27.

At S1720, it is determined whether the image data analyzed and determined by the printer 201 is received. When the image data is received, the operation proceeds to S1730 and otherwise, the processing of the flowchart is finished.

At S1730, a result of determining the image is displayed on the liquid crystal display 28.

At S1740, it is determined whether the image is executed to print based on a result of determining and displaying the image at S1730. When printing is executed, the operation proceeds to S1750 and otherwise, the operation proceeds to S1760.

At S1750, the image data determined to execute to print is transmitted to the printer 201.

At S1760, the data which is not executed to print is erased.

Figure 29:
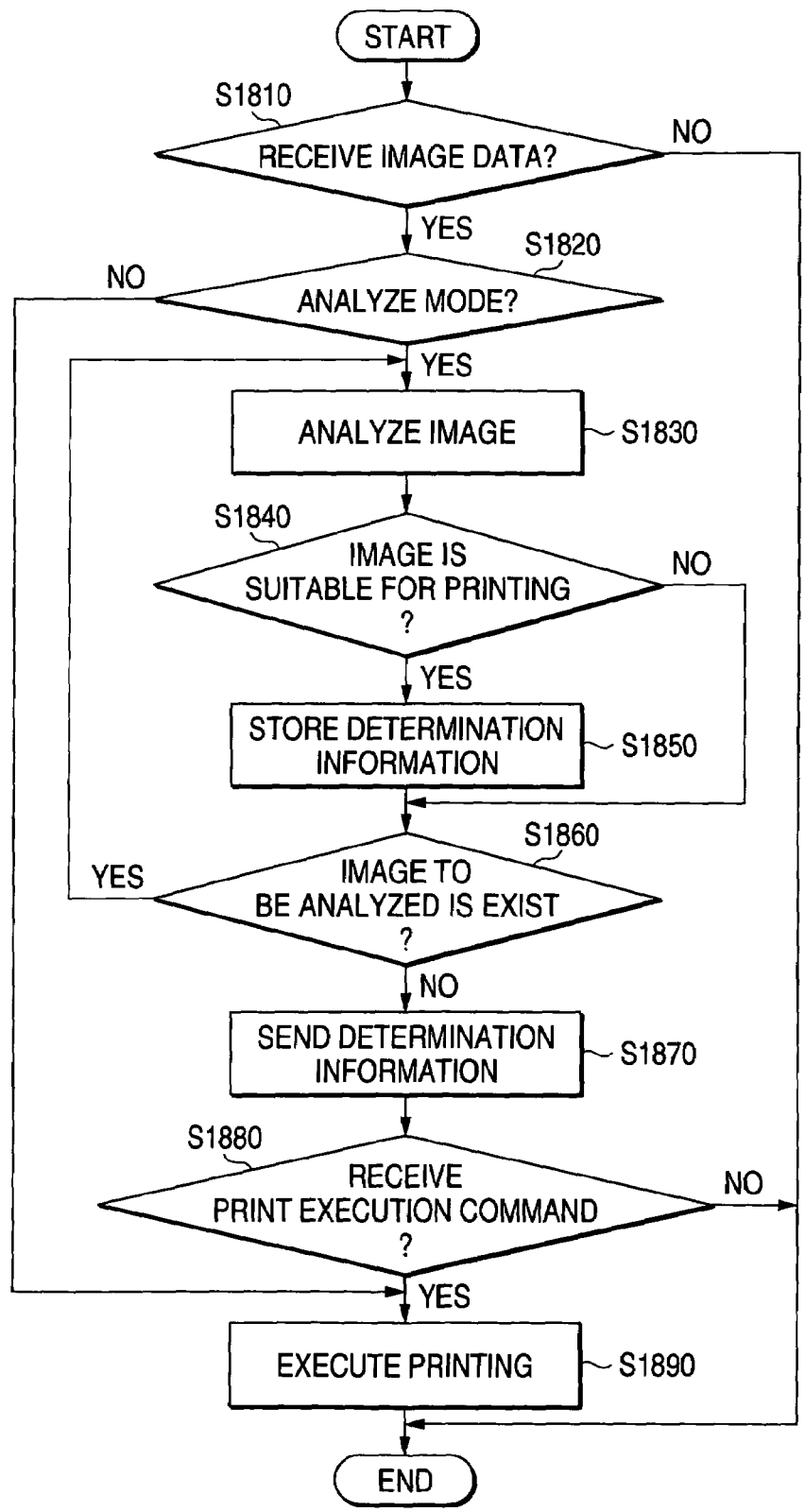
FIG. 29 is a flowchart showing an image analyzing and determining processing on a side of a printer.

FIG. 29 shows a flowchart on a side of the printer 201 according to the embodiment.

At S1810, it is determined whether the image data is received from the digital still camera 1. When the image data is received, the operation proceeds to S1820 and otherwise, the processing of the flowchart is finished.

At S1820, it is determined whether the received image is to be analyzed. When the image is analyzed, the operation proceeds to S1830 and otherwise, the operation proceeds to S1890.

At S1830, the image data is analyzed. A method of analyzing the image is similar to that in the case of the first embodiment.

At S1840, it is determined whether the image is an image out of focus or of a single color. When a problem is posed in an image quality such as out of focus or single color, the operation proceeds to S550 and otherwise, the operation proceeds to S1860.

At S1850, information of determining the image is held in a memory of the printer.

At S1860, it is determined whether there is an image to be analyzed other than the analyzed image. When there is the image to be analyzed, the operation returns to S1830 and otherwise, the operation proceeds to S1870. At S1870, a data processed to determine the image is transmitted to the digital still camera 1.

At S1880, it is determined whether the image data is transmitted along with an instruction of executing to print from the digital still camera 1. When the print executing instruction is received, the operation proceeds to S1890 and otherwise, the processing of the flowchart is finished.

At S1890, the image data is executed to print and the processing of the flowchart is finished.

Figure 20:
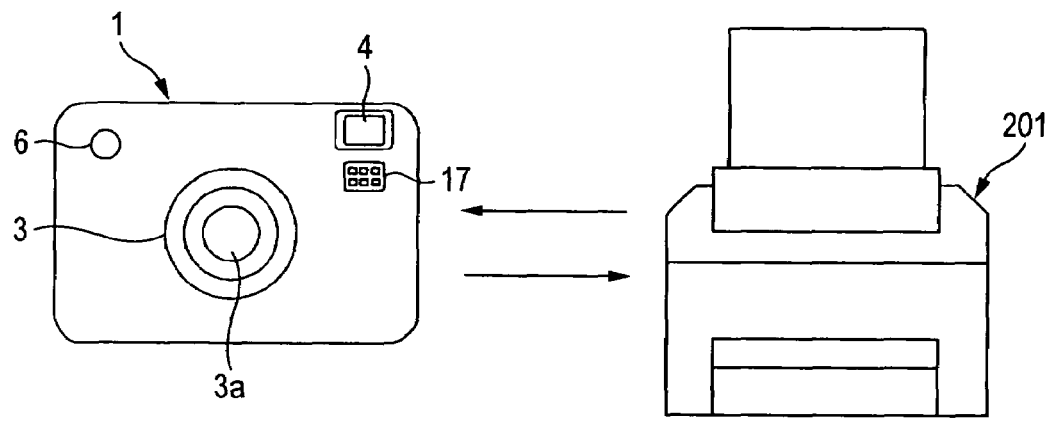
FIG. 20 is a schematic view showing an image processing system.

FIG. 20 is a schematic view of an image processing system according to the sixth embodiment.

According to the sixth embodiment, a side of the digital still camera 1 is provided with an image data holding function, an image displaying function and an image selecting function. Meanwhile, a side of the printer 201 is provided with an image analyzing function, an image determining function and a print executing function.

As a specific example, an explanation will be given in reference to the flowcharts of FIG. 28 and FIG. 29. When the image data is transmitted from the digital still camera 1 to the printer 201, the printer 201 receives the image data. Next, the image data is analyzed and determined and determination information data is transmitted to the digital still camera 1. The digital still camera 1 receives information from the printer 201. A result determined on the side of the printer 201 is displayed to the liquid crystal display 28 of the digital still camera 1 along with the determination result. By confirming the determination result, an image is selected and a print execution instruction is transmitted from the digital still camera 1 to the printer 201. The printer 201 receives the print executing instruction to print out in accordance with the received information.

In this way, the functions of analyzing an image, selecting an image, determining an image and outputting an image can be allotted to the side of digital still camera 1 and the side of the printer 201.

The image processing system constituted as described above is used as follows.

The function selecting switch 7 of the digital still camera 1 is set to an image confirming mode and the power source button 8 is depressed. Next, the select/determine button 9 is depressed and the image is selected and determined to transmit. Then, the image data is transmitted to the side of the printer 201. The transmitted image data is automatically analyzed and determined on the side of the printer and when all of the transmitted images are finished to determine, the determination information is added to the image data and transmitted to the side of the digital still camera. When the determination data is received, the image is displayed on the liquid crystal display along with the determination result. Based on the result, the user selects an image to be executed to print and transmits the data to the printer as the print executing instruction. The printer 201 receives the instruction to execute to print. The desired image can be printed in this way.

Effects of the sixth embodiment will be described as follows.

(6) Although the digital still camera 1 is not provided with the functions of analyzing the image and determining the image, the functions are provided to the side of the printer 201 and the user can determine and select the image on the side of the digital still camera 1 by executing to process the image on the side of printer and informing the determination result to the side of the digital still camera 1.

(7) Even when the image processing unit is dispersed to the digital still camera 1 and the printer 201, by connecting the image processing unit communicatably between the two apparatus, a series of image processings can be executed without being summarized to a single apparatus. Therefore, in comparison with the constitution of summarizing a number of functions to the single apparatus, cost of, for example, the digital still camera 1 or the printer 201 can be restrained inexpensively.

The embodiments are not limited to the above-described but can be changed as follows.

Although according to the above-described first embodiment, after searching the image in correspondence with the search key 65 from the image file 60 stored to the memory card 31, it is further determined whether the image data 62 (actual image data 64) is an image suitable for printing, a method of classifying the image file 60 is not limited thereto at all. That is, the image file 60 may be searched in any way, and after searching the image file 60 in correspondence with the search key 65, the image file 60 may be searched by information stored to the image forming history information 61. The method of searching the image may be selected by an object of the user in selecting the image.

Although according to the above-described first embodiment, voice in correspondence with the search key 65 is inputted to the microphone 17 and the search data is formed based on the voice, a method of inputting the search data for searching the search key 65 is not limited thereto at all. For example, the display screen 12 may constitute an input operating portion and the search key may be inputted on the screen by operating the display screen 12.

Although according to the above-described first embodiment, the image in correspondence with the search key 65 is searched, further, the image quality of the searched image is determined and the image is classified for each determination result to display on the display screen 12, the image may not be classified by only displaying the determination result whether the image is an image suitable for printing for each image. That is, in displaying the determination result, the determination results may respectively be displayed on lower sides of the respective images G on the screen displayed in correspondence with the search key 65.

Although according to the above-described first embodiment, it is determined whether the image is an image suitable for printing and both of the image suitable for printing and the image which is not suitable for printing are informed to the user as the determination result, only either one thereof may be displayed. That is, the image which is not suitable for printing may be determined as outside of selecting the object and only the image suitable for printing may be displayed on the display screen 12. Further, only the image which is not suitable for printing may be displayed on the display screen 12 and the image to be printed may be selected therefrom.

Although according to the above-described second embodiment, in taking the image by the digital still camera 1, the search key 65 is not inputted and in searching the image, the image is analyzed by inputting identifying information of a search object and the image in correspondence with the identifying information is searched. However, the second embodiment may be constituted to input the search key 65 to be related to the image in taking the image and search the image in correspondence with the search key 65 by analyzing the image file.

Although according to the above-described third embodiment, by analyzing the image data 62 of the image file 60, the image is determined and classified, the image data 62 may be classified in any way at this occasion. In place of the classification of "person", "scenery" or the like, a further detailed classification may be constituted. In that case, a program therefor may be stored to ROM 233.

MODIFIED EXAMPLE 1

Although according to the above-described fourth to sixth embodiments, the determination result of determining an image quality is informed based on the result of analyzing the image, there can also be adopted an automatic selecting function in which CPU 21 selects only image data having an excellent image quality based on the determination result to transmit to an image outputting apparatus or to store to the memory card 31. In this case, an informing unit is dispensed with.

MODIFIED EXAMPLE 2

Although the image is analyzed for determining whether image data is subjected to the predetermined processing, the predetermined processing in this case is not limited to a transmitting processing for transmitting the image data to an image outputting apparatus of the printer 201, the display apparatus 90 or the like, or a storing processing for storing the image data to the memory card 31. For example, the predetermined processing may be a processing of selecting the image data having the excellent image quality based on the determination result and subjecting the image data to a predetermined processing (image processing). In this case, it is not necessary to wastefully process the image data which is not needed to process. Otherwise, the predetermined processing may be any processing so far as the processing is a processing which needs to select the image data having the excellent image quality.

MODIFIED EXAMPLE 3

A modified example of the first, the second, the fourth and the fifth embodiments can be constituted as follows. As a method of analyzing the image executed by the digital still camera 1, (1) a determination of outputting the image by the sharpness characteristic, (2) a determination of outputting the image by the brightness characteristic, (3) a determination of outputting the image by the hand movement characteristic are pointed out. Among them, the determinations, for example, an image analysis by the sharpness characteristic can be set to execute by the digital still camera 1 and image analysis by (2) the brightness characteristic and (3) the hand movement characteristic can be set to execute by the printer 201. Further, conversely, the image analysis by (2) the brightness characteristic and (3) the hand movement characteristic can be executed by the digital still camera 1 and image analysis by (1) the sharpness characteristic can be executed on the side of the printer 201. According to the constitution, a load of the digital still camera 1 or CPU of the printer 201 by the image analysis can be alleviated and as a result, a speed of processing to analyze the image can be increased and the image determination result can swiftly be informed to the user.

MODIFIED EXAMPLE 4

Determination of an image, display of an image and outputting of an image of the respective embodiments can be modified as follows. After determining the image, in the respective embodiments, there is executed determination and display of determining whether the analyzed image is a normal image or an abnormal image. At this occasion, in determination and display, it is possible that the abnormal image is not displayed and only the normal image is displayed. Further, in this case, only the normal image is automatically selected and therefore, the image can be executed to print without executing determination and display. According to the constitution, an image desired by the user can swiftly be outputted by automatically selecting only the normal image data to execute to print.

MODIFIED EXAMPLE 5

As a modified example of the third and the sixth embodiments, the following constitution can also be adopted. First, the image analyzing mode is selected on the side of the digital still camera 1 to analyze the image data. The analyzed image is further determined to add image determining information to the data. When the image has been finished to analyze and the image has been finished to determine, the determination information data is transmitted to the printer 201. The side of the printer displays the determination information on the display screen 210 on the side of the printer 201 when the determination information data is received. A user selects the image intended to print to execute to print by looking at the display screen. At this occasion, the image which is not selected is erased.

MODIFIED EXAMPLE 6

Although according to the above-described respective embodiments, the image acquiring unit is the image taking unit, the image acquiring unit includes also acquisition of inputting the image data from an input port. That is, the embodiments are applicable to an image forming apparatus for temporarily storing image data read from the input port to the memory and executing image analysis, determination and notification with regard to the image data read from the memory as necessary in operating to transmit the image data.

MODIFIED EXAMPLE 7

Although according to the above-described respective embodiments, the determination result is informed to the user by displaying the determination result on the screen, the determination result can be informed by voice by providing a voice generating apparatus to the digital still camera 1.

The technical thought grasped from the above-described respective embodiments and modified examples will be described as follows.

(1) In the respective embodiments, the control portion for executing the predetermined processing to the image data selected to be able to execute the predetermined processing by the selecting portion is provided.

(2) In the respective embodiments, the predetermined processing is characterized to be the processing for storing the memory.

(3) In the respective embodiments, the predetermined processing is characterized to be the processing of transmitting to the image outputting apparatus.

(4) In the respective embodiments, the image data which is not selected to hold by the selecting device is characterized to be erased.

(5) In the image forming apparatus described in the respective embodiments, the image forming device is the image taking device.

(6) In the image forming apparatus described in the respective embodiments, the image acquiring device is the image taking device.

(7) In the image forming apparatus described in the respective embodiments, the informing device is characterized to include the displaying device for displaying the determination result on the screen.

(8) In the image forming apparatus described in the above-described technical thought (7), the informing device is characterized to display the plurality of images on the screen of the displaying device and display the determination result in correspondence with the image.

(9) In the respective embodiments, the image analyzing device analyzes at least one of an image out of focus, a hand movement image and a single color image by analyzing the image with regard to the image data.

(10) In the image processing system described in the embodiments, the plurality of image data are analyzed and determined, the determination result is transmitted from the transmitting portion to the image outputting portion by designating to display the list and in the image outputting apparatus, the printing device prints the determination result by displaying the list.

(11) In the image forming apparatus described in the embodiments, the control portion transmits the determination result from the transmitting portion by displaying the list.

(12) In the image outputting apparatus described in the embodiments, printing device prints the determination result by displaying the list.

What is claimed is:

1. An image outputting apparatus for outputting image data previously recorded in a recording medium, the image outputting apparatus comprising:
    a searching portion which is configured to search the image data including identification information by using a search key;
    a display portion which is configured to display the image data including the identification information in correspondence with the search key;
    a determining portion which is configured to determine whether an image quality of the image data is suitable for outputting,
        wherein a determination result is grouped into a plurality of groups and displayed on the display portion together with the image data including the identification information in correspondence with the search key;
    a correcting portion which is configured to correct the image quality of the image data which is determined as invalid;
    an outputting portion which is configured to output the image data to a printer which is connectable to the image outputting apparatus; and
    a selection portion which is configured to select one of a single display mode for displaying one of the image data on the display portion and a multi-display mode for displaying a plurality of the image data on the display portion,
    wherein the display portion displays a group of the image data which is determined as valid and a group of the image data which is determined as invalid as the determination results when the multi-display mode is selected,
    wherein when index printing is instructed to the printer, the searching portion searches the image data to be subjected to the index printing by using a search key and the outputting portion outputs the image data searched by the searching portion together with layout information for the index printing to the printer, and
    wherein the image data to be subjected to the index printing are allocated to a layout of the layout information for the index printing and printed together with the search key in each of the groups.

* * * * *